(12) United States Patent
Edwards et al.

(10) Patent No.: US 6,695,757 B2
(45) Date of Patent: Feb. 24, 2004

(54) METHOD OF MANUFACTURING A STANDUP BAG

(75) Inventors: Simon P. Edwards, Irvine, CA (US); Benjamin A. Gianneschi, Irvine, CA (US); Nancy Lu, Irvine, CA (US); Joe Hsu, Irvine, CA (US)

(73) Assignee: Scholle Corporation, Irvine, CA (US)

( * ) Notice: Subject to any disclaimer, the term of this patent is extended or adjusted under 35 U.S.C. 154(b) by 0 days.

(21) Appl. No.: 10/029,695

(22) Filed: Dec. 20, 2001

(65) Prior Publication Data

US 2002/0094922 A1 Jul. 18, 2002

Related U.S. Application Data

(60) Provisional application No. 60/261,597, filed on Jan. 12, 2001, provisional application No. 60/300,623, filed on Jun. 25, 2001, provisional application No. 60/305,788, filed on Jul. 16, 2001, and provisional application No. 60/311,774, filed on Aug. 10, 2001.

(51) Int. Cl.[7] .............................................. B31B 49/00
(52) U.S. Cl. ........................ 493/51; 493/218; 493/226
(58) Field of Search ............................... 493/218, 186, 493/189, 210, 213, 267, 922, 929, 933, 936, 214, 934, 51, 221, 226; 383/120

(56) References Cited

U.S. PATENT DOCUMENTS

| 3,437,258 A | * | 4/1969 | Kugler ........................ 383/104 |
| 3,502,521 A | * | 3/1970 | Doyen et al. .................. 156/69 |
| 4,450,581 A |   | 5/1984 | Hirata |
| 4,542,530 A | * | 9/1985 | Thomas et al. ............... 383/66 |
| 4,669,124 A | * | 5/1987 | Kimura ........................ 383/80 |
| 4,721,396 A | * | 1/1988 | Sengewald .................... 383/8 |
| 4,840,017 A | * | 6/1989 | Miller et al. .................. 53/468 |
| 4,887,912 A | * | 12/1989 | Stumpf ........................ 383/66 |
| 5,062,717 A | * | 11/1991 | Shockley ..................... 383/20 |
| 5,195,829 A |   | 3/1993 | Watkins et al. |
| 5,219,220 A |   | 6/1993 | Kucera et al. |
| 5,307,955 A | * | 5/1994 | Viegas ........................ 222/107 |
| 5,350,240 A |   | 9/1994 | Billman et al. |
| 5,452,844 A |   | 9/1995 | Bochet et al. |
| 5,547,284 A | * | 8/1996 | Imer .......................... 383/104 |
| 5,755,514 A |   | 5/1998 | Baar-Bartelt |
| 5,788,121 A |   | 8/1998 | Sasaki et al. |
| 5,836,696 A |   | 11/1998 | Schnell |
| 6,036,365 A |   | 3/2000 | Imer |
| 6,076,968 A | * | 6/2000 | Smith et al. ................. 383/202 |
| 6,092,933 A |   | 7/2000 | Treu |
| 6,095,688 A |   | 8/2000 | Nittel et al. |
| 6,116,781 A | * | 9/2000 | Skeens ....................... 383/100 |
| 6,126,315 A |   | 10/2000 | Ichikawa et al. |
| 6,213,645 B1 |   | 4/2001 | Beer |
| 6,220,702 B1 | * | 4/2001 | Nakamura et al. ............ 347/86 |

* cited by examiner

*Primary Examiner*—Rinaldi I. Rada
*Assistant Examiner*—Paul R Durand
(74) *Attorney, Agent, or Firm*—King & Jovanovic, PLC

(57) ABSTRACT

A standup bags made of a flexible material and methods of producing these standup bags. In particular, the standup bags have at least one substantially flat surface which is free of seams and folds. When the bag is filled with a flowable substance, the pressure exerted by the fluid upon the flat surfaces allows the bag to be self-standing. Additionally, the standup includes at least one contour structure that defines the geometry of the bag and also contributes to the standup bag's ability to be self-standing when even partially filled with a flowable substance.

10 Claims, 70 Drawing Sheets

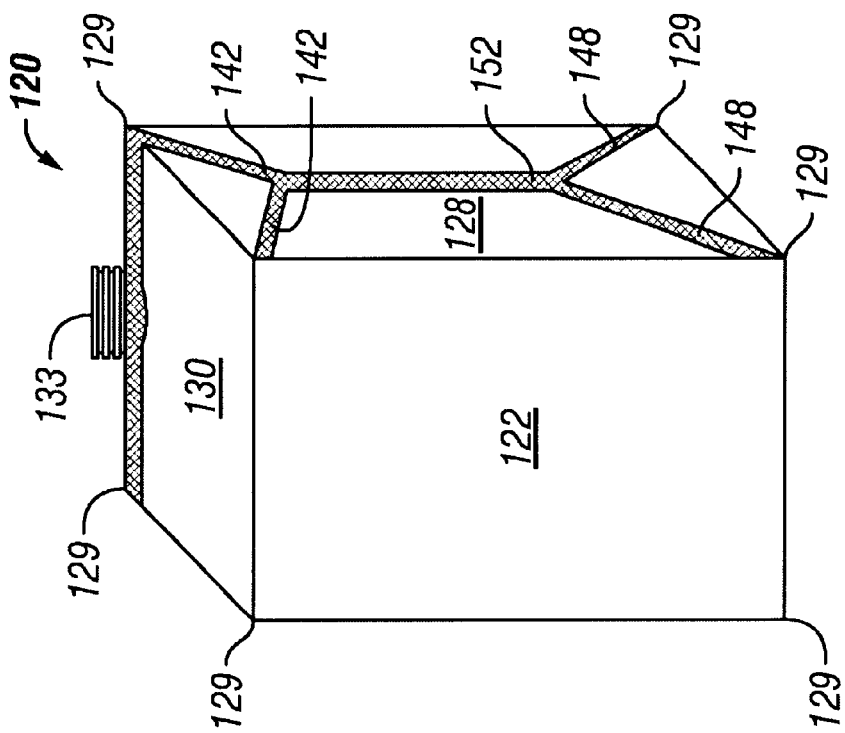
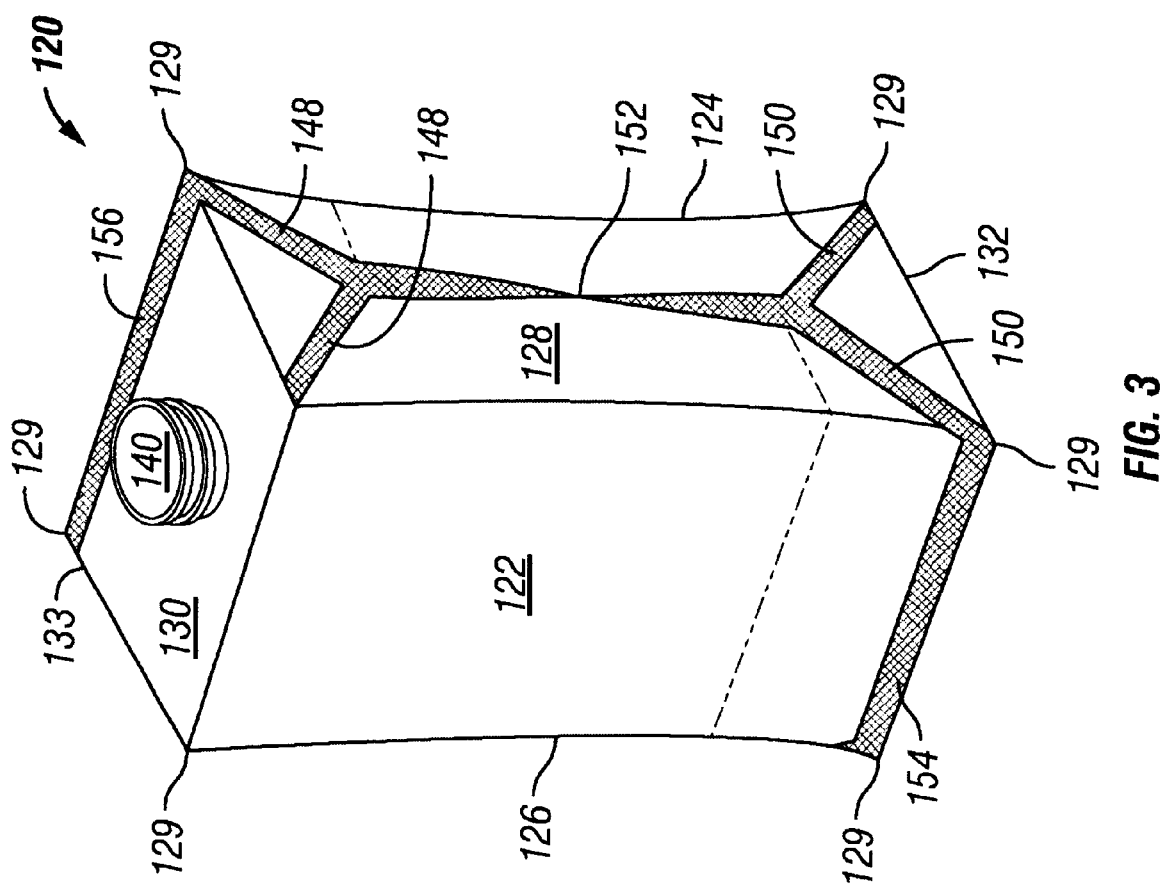

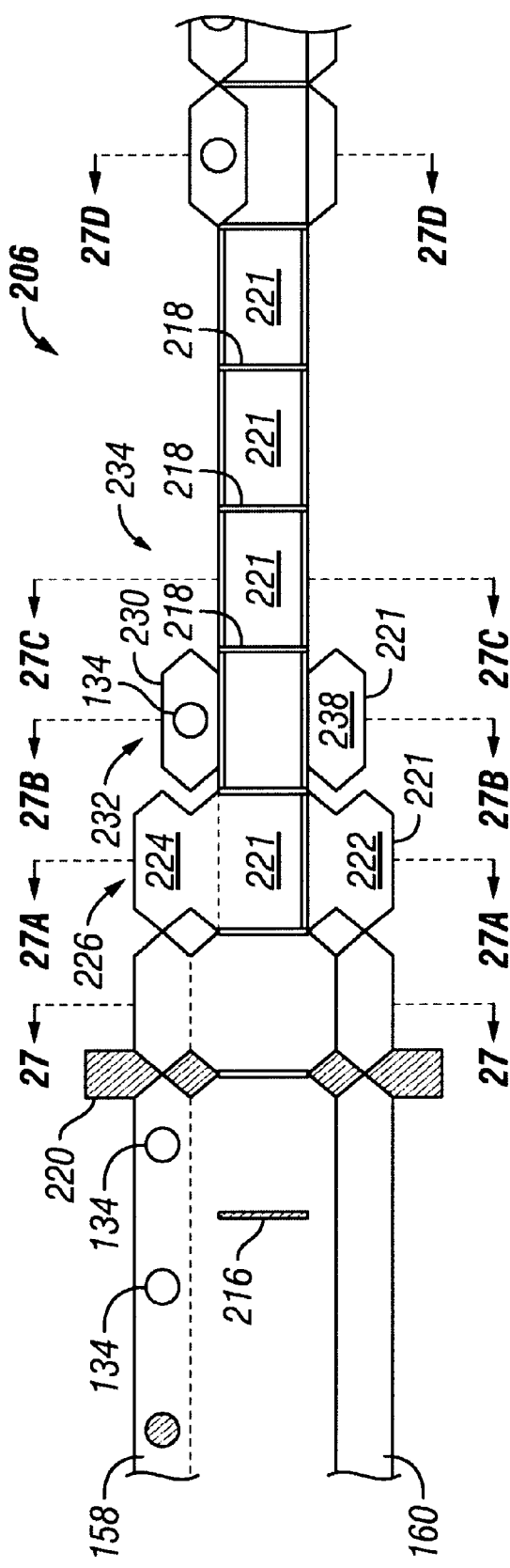
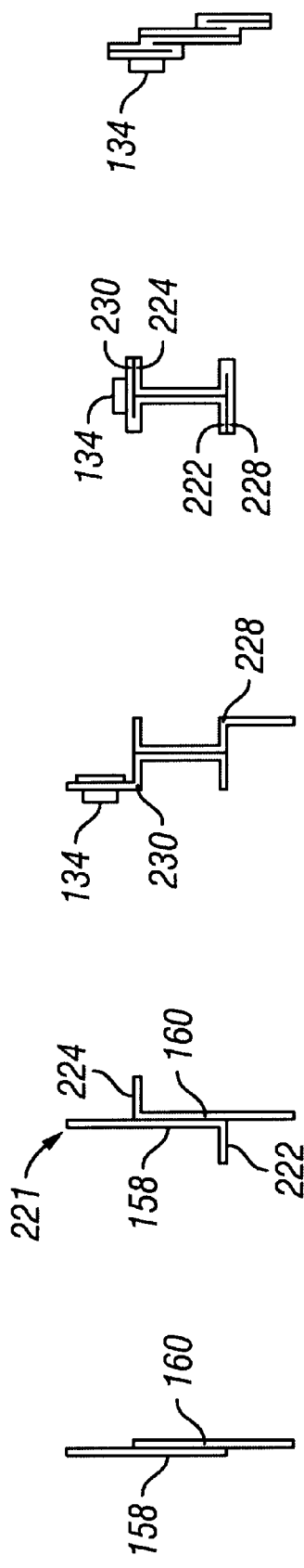
FIG. 26
FIG. 27D
FIG. 27C
FIG. 27BC
FIG. 27A
FIG. 27

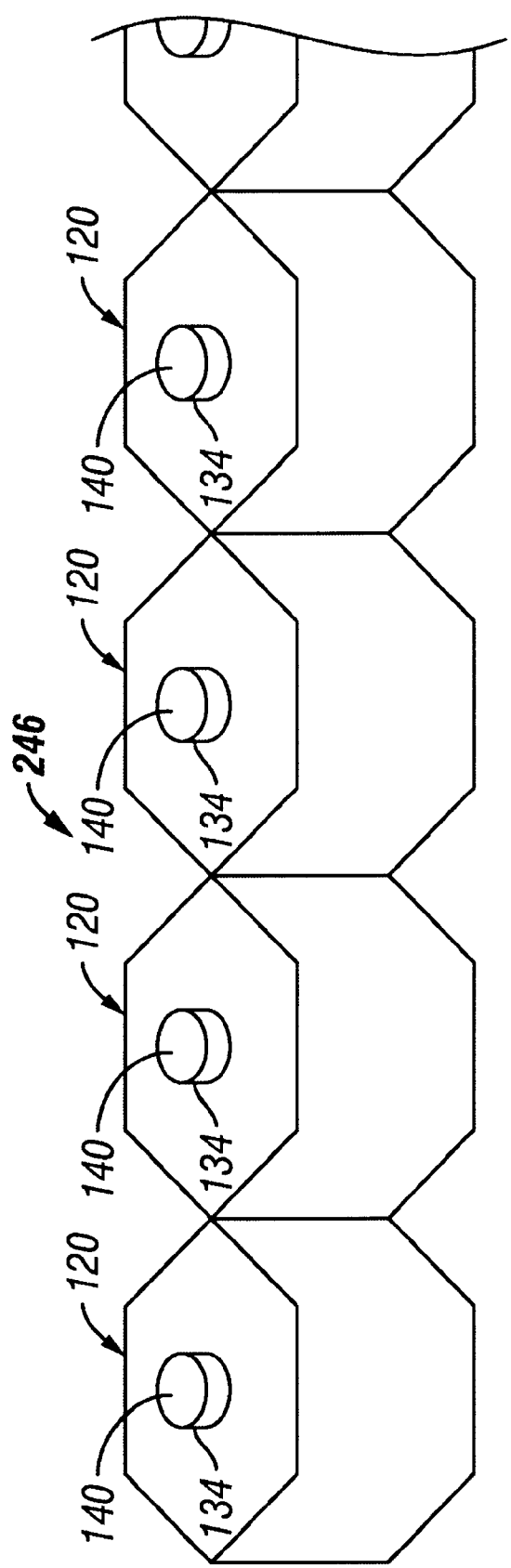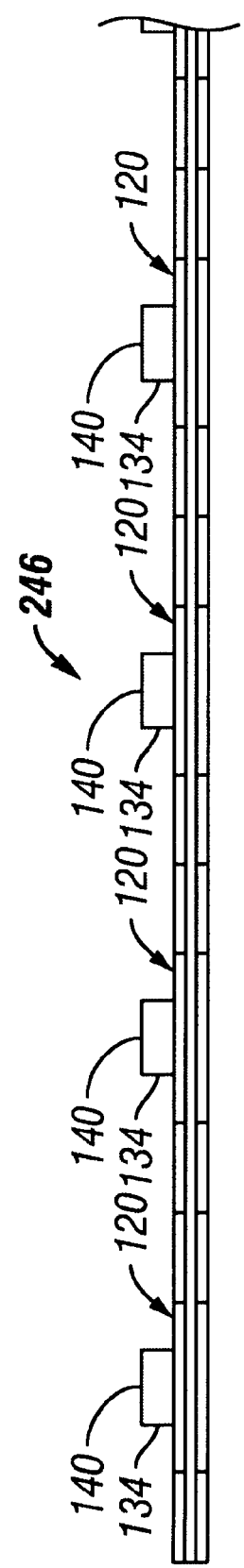
FIG. 28A
FIG. 28B

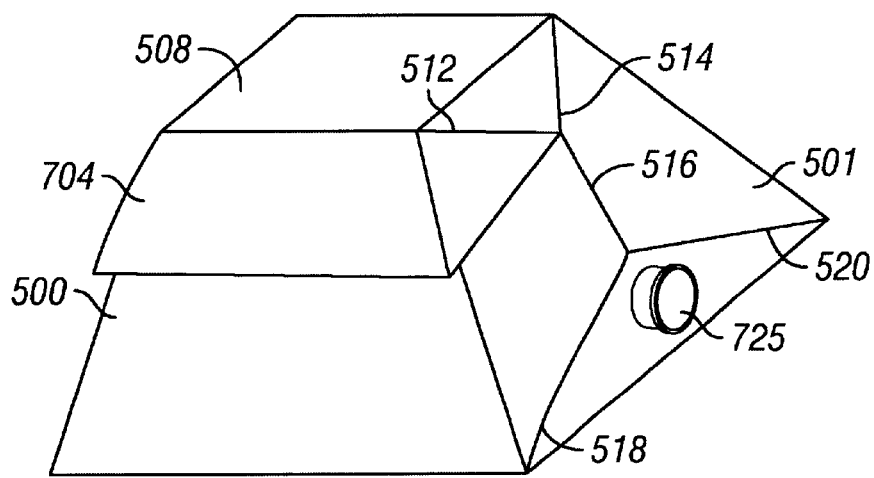
FIG. 77
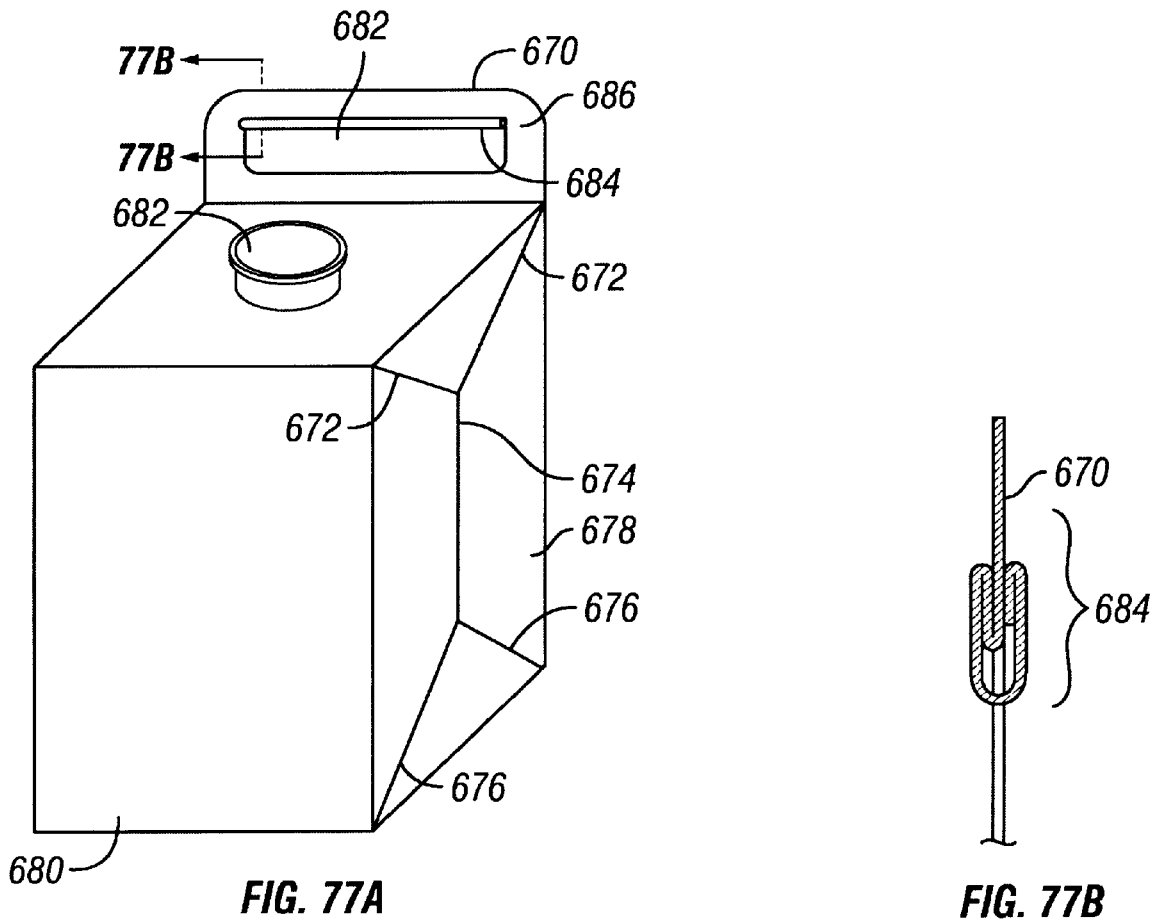
FIG. 77A
FIG. 77B

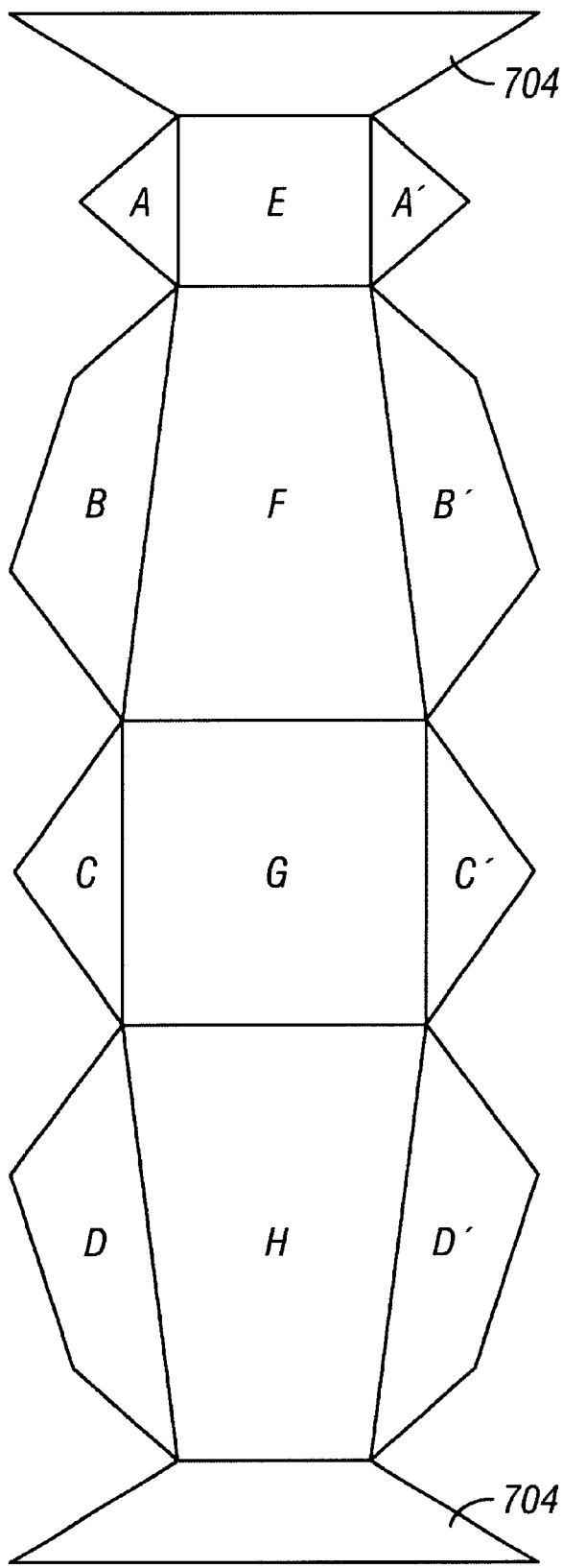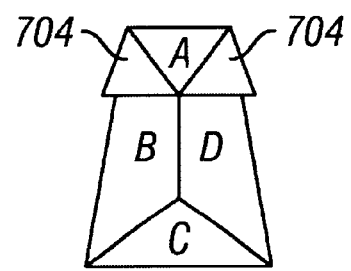
FIG. 78A
FIG. 78

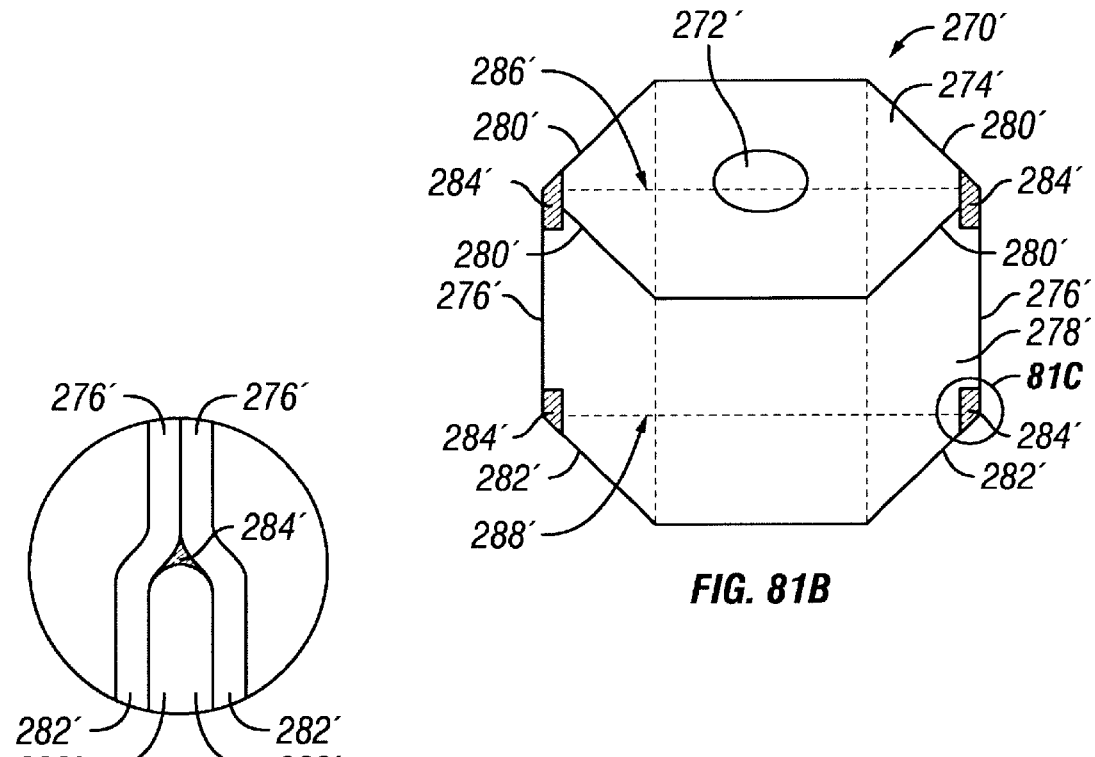
FIG. 81B
FIG. 81C
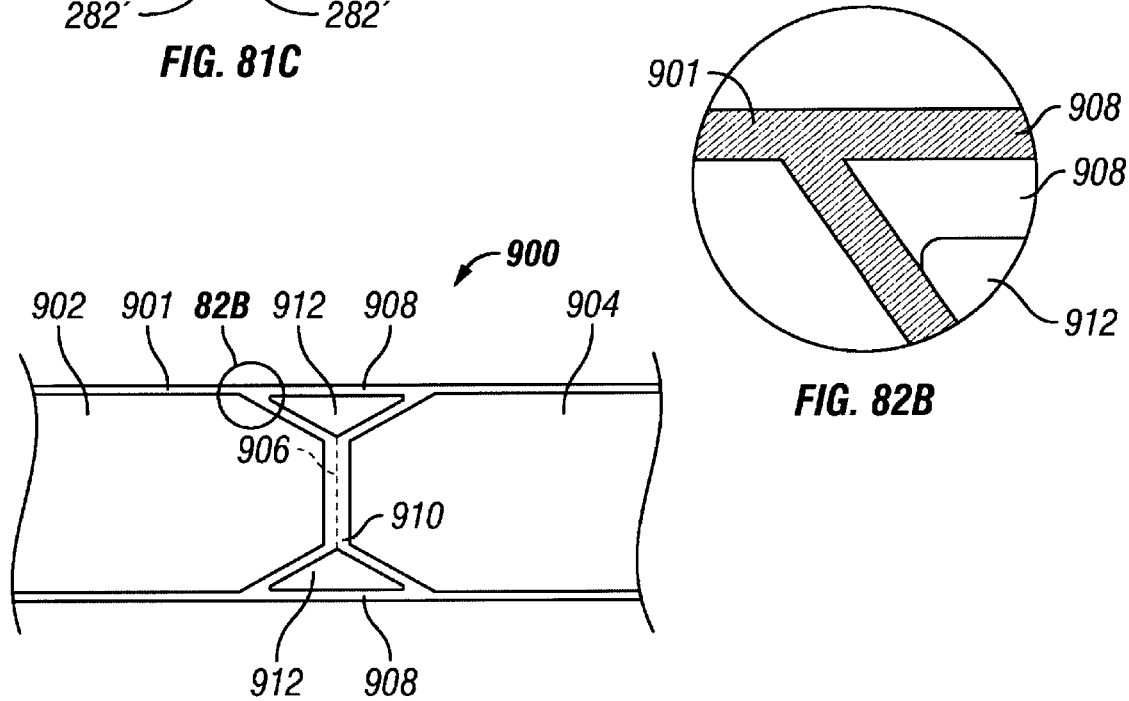
FIG. 82B
FIG. 82A

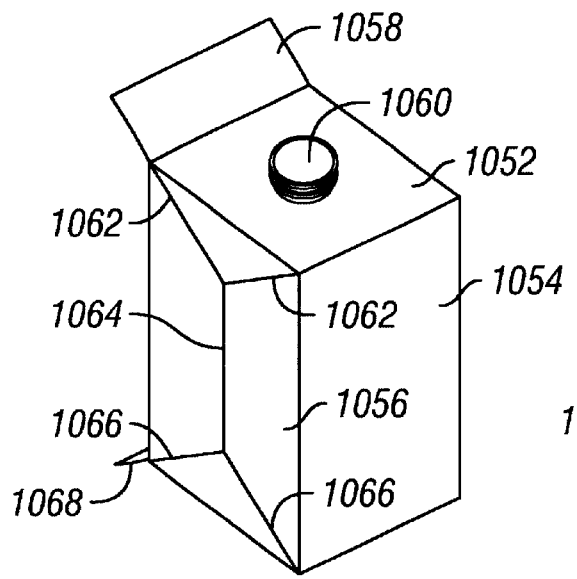
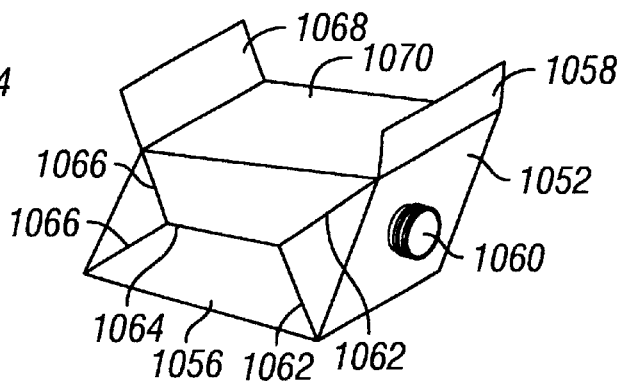
FIG. 88A　　　　FIG. 88B
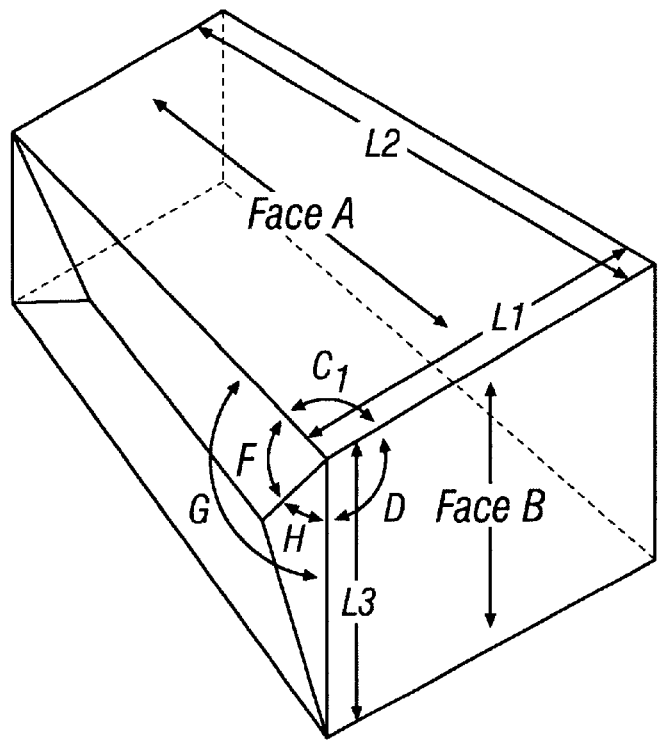
FIG. 89

METHOD OF MANUFACTURING A STANDUP BAG

CROSS REFERENCE TO RELATED APPLICATIONS

This application claims the benefit of U.S. Provisional Application No. 60/261,597, filed Jan. 12, 2001; U.S. Provisional Application No. 60/300,623, filed Jun. 25, 2001; U.S. Provisional Application No. 60/305,788, filed Jul. 16, 2001; and U.S. Provisional Application No. 60/311,774, filed Aug. 10, 2001. The disclosures of the aforementioned U.S. Provisional Applications are hereby incorporated by reference in their entirety.

FIELD OF THE INVENTION

This invention relates to a flexible bag made of flexible sheet material and adapted to be self-standing after receiving flowable substances.

BACKGROUND OF THE INVENTION

Many varieties of bags for flowable products such as liquids, pastes, granulates, flakes, or powders are known. Some examples are standup bags, sachets, tubing bags, paper sacks, and even box-like bags such as milk cartons. The bags can be made from coated paper, plastic sheet, metal foil, or plastic-and-foil laminate. Generally, selection of the bag material is determined by the contents of the bag. Other factors which determine the choice of materials are appearance, ability to standup when filled and/or partially filled, method in which the bags are shipped, strength requirements, need to recycle, and cost. Most known bags have not been able to sufficiently meet all these requirements.

Flexible bags are advantageous because they can be folded extremely flat in their empty state so as to require very little space. The filling of such flexible bags with the product is generally performed in an automated operation. The bag is placed upright with its dispensing opening pointing upwardly to permit a filling nozzle to be inserted thereinto. After the bag has been filled, the dispensing opening is closed by welding, sealing, or a closure.

Conventional standup bags are those with bottom "horizontal" panel gussets, more commonly known as bottom gussets. The gusset is heat-sealed to produce a flexible base on which the bag may stand without support. The base permits the two sidewalls or facewalls to spread at the bottom when the pouch is filled, wherein the bag is a three-panel bag that is self-standing when full or partially full of product heavy enough to bear down on the bottom pane. In most instances, the bottom panel is a separate sheet of flexible material, but some structures fold a single web sheet into a W-shape and heat-seal a base. Other standup bag structures known in the art employ sidewall folds or side gussets and overlapping flat sheet bases. These standup bags do not stand up as well because they do not have the bottom gusset and have been used more successfully for dry products than for liquids.

Such standup bags are adaptable for packaging of liquids and dry products and are suitable replacement for other types of packaging such as plastic or glass bottles, cans, and boxes. One of the advantages standup bags is that they are environmentally sound, offering source reduction of solid waste ranging from 70% to 90% by both weight and volume. As a result, the use of standup bags reduces the need for recycling landfill, and/or incineration. Another advantage of standup bags is that they offer the use of four to six color graphs for improved shelf appeal and acceptance. Standup bags further offer cost savings due to reduced transportation costs. Unlike the shipping of traditional large plastic empty containers, there is no shipping of air. There is further savings with reduced inventory save space and storage costs for containers. Standup bags take up about $1/80^{th}$ the volume compared to storing an equal quantity of rigid containers.

A typical standup bag 100 generally employs two face-to-face fusion side seals and a single face-to-face across-the-top seal in addition to the bottom seals as shown in FIG. 1. When viewed from the side, the standup bag 100 looks likes a distorted triangle with the base of the triangle at the bottom 102. The across-the-top seals may be interrupted by a fitment 104, zipper closure, or other device to facilitate opening, dispensing of the contents, and reclosing. Another type of standup bag 110 includes gussets that permit the bottom to fold into a flat position, like a paper grocery sack as shown in FIG. 2.

In general, standup bags may be classified as one of two types: preformed bags and form-fill-seal bags. Preformed standup bags are made on a separate converting machine and delivered to a packager in ready-to-open, fill-and-close form, while the form-fill-seal bags are fabricated in-line by the packager from flexible roll stock materials on machines that fold the sidewalls and die-cut openings for heat sealing into the bottom section. Output speeds of intermittent motion preformed bag machines are usually faster than those on form-fill-seal machines because of multilane possibilities as well as the limiting factors of filling and sealing on the filling machines. Furthermore, it is easier to incorporate dispensing and other fitments on separate converting equipment than on inline form-fill-seal equipment. Lastly, preformed pouches tend to be more reliable in distribution performance than form-fill-seal bags such that most liquid containing standup bags to date have used preformed bags.

Representative of the prior art are the plastic bags disclosed in U.S. Pat. Nos. to Kneutter (2,265,075), Doyen et al. (3,380,646), Kugler (3,437,258), Michel (3,715,074) and Bustin (4,353,497). Some known standup bags attempt to provide the standup capability merely by use of a simple bottom gusset alone or supplemented with seals added in the gusset structure. A simple bottom gusset sealed at its sides does not provide a normal consumer plastic bag with a sufficient standup feature. Such a plastic bag, typically made from polyethylene film less than one mil thick is too limp to stand up from the gusseted bottom.

Other objects, features, and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 3 is a perspective view of a flexible bag of the present invention in the form of a standup bag having a fitment;

FIG. 3A is a perspective view of a flexible of the present invention having a fitment extending through a heat seal;

FIG. 26 is a top plan view of the continuous web system of FIG. 25;

FIGS. 27–27D are cross-sectional views through FIG. 26;

FIG. 28A is a top plan view of a fully formed web comprising standup bags and FIG. 28B is a side plan view of the web comprising standup bags;

FIG. 77 is a perspective view of an alternate embodiment of the flexible bag of the present invention in the form of a standup bag having a handle spaced from a fitment;

FIG. 77A is a perspective view of an alternate embodiment of the flexible bag of the present invention in the form of a standup bag having a handle adjacent to a fitment;

FIG. 77B is a enlarged side view of the handle of FIG. 77A;

FIG. 78 is a template of a flexible bag of the present invention in the form of a standup bag having two integral handles;

FIG. 78A is a side view of a flexible bag made from the template of FIG. 78;

FIG. 81B is front plan view of a fully formed standup bag in a collapsed state;

FIG. 81C is an enlarged side view of the lower triangular profile of the standup bag of FIG. 81B;

FIG. 82A is a side view of the continuous-web for manufacturing the standup bag including a stay member;

FIG. 82B is a side view of an alternate embodiment of the continuous web for manufacturing the standup bag including a stay member;

FIG. 88A is a perspective view of an alternate embodiment of the standup bag of the present invention having two planar handles;

FIG. 88B is a perspective view of an alternate embodiment of the standup bag of the present invention having two planar handles;

FIG. 89 is a perspective view of an embodiment of the standup bag of the present invention;

BRIEF SUMMARY OF THE INVENTION

Figure 1:
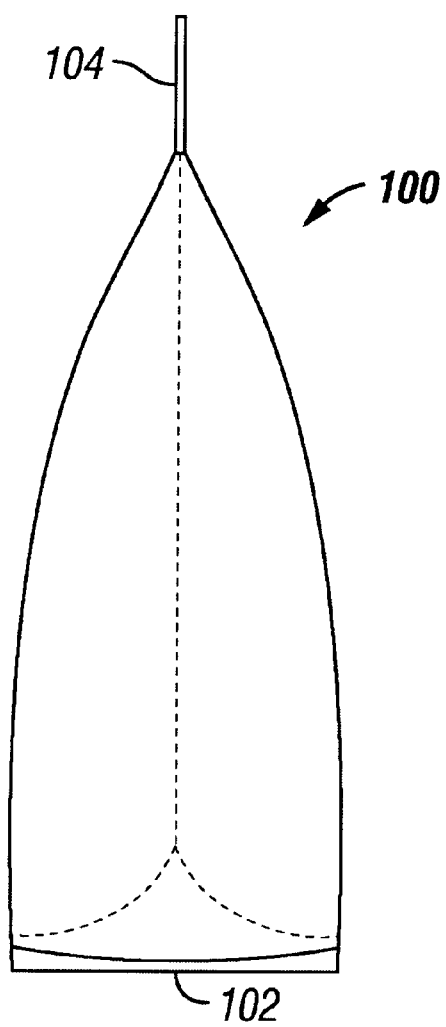
FIG. 1 is a prior art standup bag having face-to-face fusion side seals and a single face-to-face across-the-top seal in addition to the bottom seals.
Figure 2:
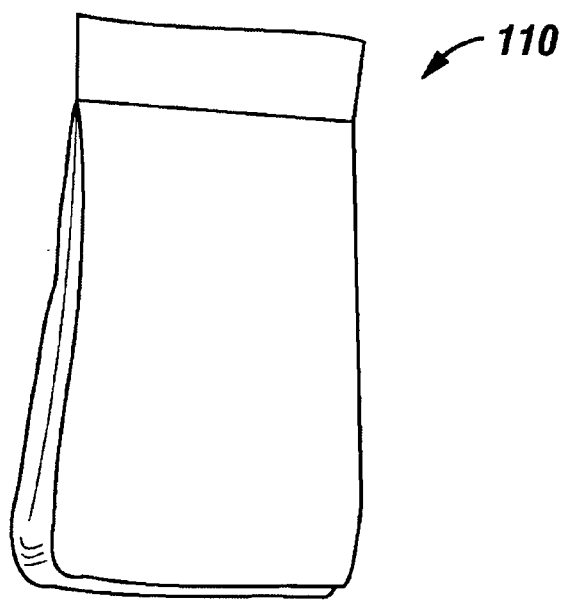
FIG. 2 is another prior art standup bag having gussets that permit the bottom to fold into a flat position.

The present invention relates generally to a self-standing bag made from a flexible materials and to methods of making the self-standing bag. More particularly, the standup bag includes at least one substantially flat surface that is free of seams. This substantially flat surface provides a stable foundation that allows the bag to be self-standing without any additional support members. That is, unlike prior art bags, the standup bag of the present invention does not require any spare material to help support a bag when filled with a flowable substance.

Moreover, the standup bag of the present invention is designed so that it may be manufactured, stored, and/or shipped in a flat form. When filled with a flowable substance, the bag expands to a desired form and becomes self-standing even when partially filled. The flowable substance exerts a pressure on the bag walls which forces the bag to conform to the bag geometry defined by the contour structures.

The self-standing bag of the present invention also may be made from one or more sheets of material. Each sheet may be one or more plies of material. Each material ply may be attached along the periphery, laminated together, or any method thereof. The standup bag is provided with a fitment that may be attached to a wall of the bag or through a seal of the bag. The bags of the present invention are filled and may be emptied through the fitment. The standup bag also may include at least one integrated handle that facilitates the carrying of a filled bag. Furthermore, the standup bag may include a sleeve provide on the exterior surface of the bag which may be adapted as a carrying member or provide surfaces on which to print graphics or labels.

In one embodiment of the present invention, the standup bag is an enclosure formed from at least one sheet of material. The enclosure is defined by at least one wall, and the wall is substantially rigid when the enclosure is filled with a flowable substance. Additionally, the standup bag includes at least one contour structure that defines the geometric shape of the enclosure.

In another embodiment of the present invention, the standup bag is an enclosure having a top wall, a bottom wall, and at least one wall disposed between the top and bottom wall. The standup bag also includes at least one contour structure that defines the overall geometry of the bag. Furthermore, the standup bag is provided with at least one fitment in communication with the enclosure.

In yet another embodiment of the present invention, the standup bag comprises an enclosure having a plurality of substantially flat walls where at least one of the plurality of flat walls being free of seams. The flat wall forms a stable base to allow the enclosure filled with the flowable substance to be self-standing. The standup bag also includes at least one fitment attached to the enclosure where a flowable substance may enter or be withdrawn from the enclosure. The standup bag is also provided with at least one contour structure provided on at least two walls of the enclosure where the contour structures define the shape of the enclosure. The standup bag also includes at least one grasping member attached to the standup bag where the grasping members extend away from the walls of the standup bag.

In another embodiment of the present invention, the standup bag comprises an enclosure having a plurality of substantially flat walls where at least one of the plurality of flat walls being free of seams. The flat wall forms a stable base to allow the enclosure filled with the flowable substance to be self-standing. The standup bag also includes at least one fitment attached to the enclosure where a flowable substance may enter or be withdrawn from the enclosure. The standup bag is also provided with at least one contour structure provided on at least two walls of the enclosure where the contour structures define the shape of the enclosure. The standup bag also includes at least one grasping member integral with the enclosure. That is, the first and second edges of the grasping members are attached to the contour structures.

In another embodiment of the present invention, the standup bags may be provided in a web of standup bags. That is, the web is a plurality of standup bags that may be joined together by adjacent contour structures. In another web embodiment, the adjacent standup bags may also be joined together by at least one stay member that spans between the adjacent standup bags.

The present invention also discloses methods of making the standup bags. According to the teachings of the present invention, the standup bag may be formed from a sheet of material. The standup bag is formed by securing the first edge of the sheet is secured to the second edge of the sheet by a first seal. A first fold substantially parallel to the first edge is created. The distance between the first fold and the first edge defines a first surface of the bag. A second fold substantially parallel to the first fold is also formed on the sheet material. A second seal is formed where the seal extends from the first fold to the second fold. A third seal, which extends from the first fold to the second fold and is opposite the second seal, is also formed to complete the enclosure.

According to another method of the present invention, a standup bag may be formed from two sheets of material. The first sheet of material is positioned on the second sheet of material. The first and second sheets are secured together by forming a first seal and a second seal. A first fold substantially parallel to the first seal is formed where the distance between the first fold and the first seal defines a first surface of the bag. A second fold substantially parallel to the second is formed where in the distance between the second fold and the second edge defines a second surface of the bag. A second and a third seal are formed where the seals extends from the first fold to the second fold.

Moreover, the teachings of the present invention disclose a method of designing standup bags.

According to yet another method of the present invention, a web of standup bags may be formed from two rolls of material. The first roll of material is unwound, a hole is punched in the unwound portion, and a fitment is then fitted through the hole. The second roll of material is unwound and placed atop the unwound portion of the first roll. Material from the corners of the unwound portions are removed, and the unwound portions are joined together by a first and a second horizontal seal. The unwound portions are then folded to form substantially flat surfaces, and the longitudinal surfaces of the unwound portions are sealed with at least two substantially U-shaped seals to form the web of standup bags.

In another embodiment of the present invention, a fitment may be attached to a flexible bag. The fitment comprises a cylindrical body having a lumen, a first end, and a second end. The fitment also includes a cylindrical carrier that is attached to the first end of the cylindrical body where the carrier is detachable from the cylindrical body. The fitment also includes a closure that is capable of sealing the lumen of the cylindrical body.

In yet another embodiment of the present invention, a fitment may be attached to a flexible bag. The fitment comprises a cylindrical body having a lumen, a first end, and a second end. The fitment also includes a cylindrical carrier that is attached to the first end of the cylindrical body where the carrier is detachable from the cylindrical body at an annular groove. The annular groove is disposed between the first end of the cylindrical body and the cylindrical carrier. The fitment also includes a closure that is capable of sealing the lumen of the cylindrical body.

In another embodiment of the present invention, the fitment comprises a cylindrical body having a lumen, a first end, a second end; a cylindrical sleeve that slidably engages the cylindrical body; and a closure that is adapted to engage or disengage the lumen of the sleeve. The cylindrical sleeve has a first position and a second position. In the first position, the sleeve protrudes from the first end of the cylindrical body. In the second position, the sleeve engages the first end of the cylindrical body.

In yet another embodiment, the fitment comprises a cylindrical ring having a lumen disposed between a first end and a second end, and at least one annular groove disposed on an inner surface of the lumen. The fitment also includes a cylindrical sleeve that slidably engages the lumen of the cylindrical ring. The cylindrical sleeve comprises a lumen disposed between a first end and a second end; at least one port arranged about the circumference of the cylindrical sleeve; a base member positioned within the lumen below the port; and at least one annular ridge positioned on an outer surface of the sleeve where the annular ridge is adapted to engage the annular groove of the cylindrical ring. The cylindrical sleeve may be placed in a first position and a second position. In the first position, an interior of the bag is sealed when the annular ridge engages the annular groove. In the second position, the flange of the sleeve engages the first end of the cylindrical ring and the at least one port is in communication with an interior of the standup bag.

In another embodiment, the fitment comprises a cylindrical ring having a lumen disposed between a first end and a second end; at least one sleeve cooperating means disposed on an inner surface of the lumen; and a cylindrical sleeve that is slidably disposed in the lumen of the cylindrical ring. The cylindrical sleeve comprises a lumen disposed between a first end and a second end; at least one port disposed arranged about the circumference of the cylindrical sleeve; a base member positioned within the lumen below the at least one port; and at least one ring cooperating means positioned on an outer surface of the sleeve where the ring cooperating means is adapted to engage the sleeve cooperating means of the cylindrical ring. The cylindrical sleeve having a first position and a second position. In the first position, the ring cooperating means engages the sleeve cooperating means thereby sealing the bag interior. In the second position, the ring cooperating means is disengaged from the sleeve cooperating means and the ports are in communication with the interior of the standup bag.

DETAILED DESCRIPTION OF PREFERRED EMBODIMENTS OF THE INVENTION

Detailed descriptions of the preferred embodiments are provided herein. The general concept of each embodiment is that a standup bag formed from flexible sheet material and has a substantially flat configuration becomes rigid when filled with a flowable substance. The pressure exerted by the flowable substance on the sheet material causes the bag to become self-standing even when partially filled. It is to be understood, however, that the present invention may be embodied in various forms. Therefore, specific details disclosed herein are not to be interpreted as limiting, but rather as a basis for the claims and as a representative for teaching one skilled in the art to employ the present invention in virtually any appropriately detailed system, structure or manner.

Figure 4:
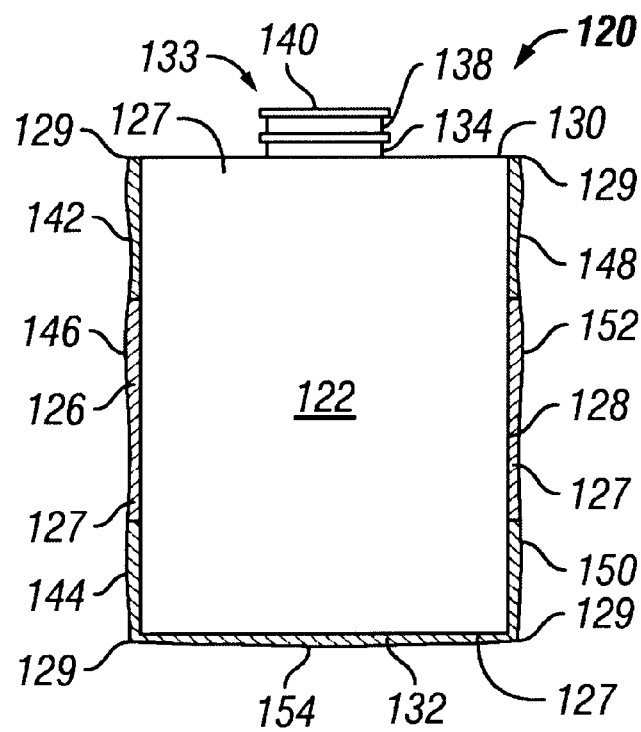
FIG. 4 is a front plan view of the standup bag of FIG. 3.
Figure 5:
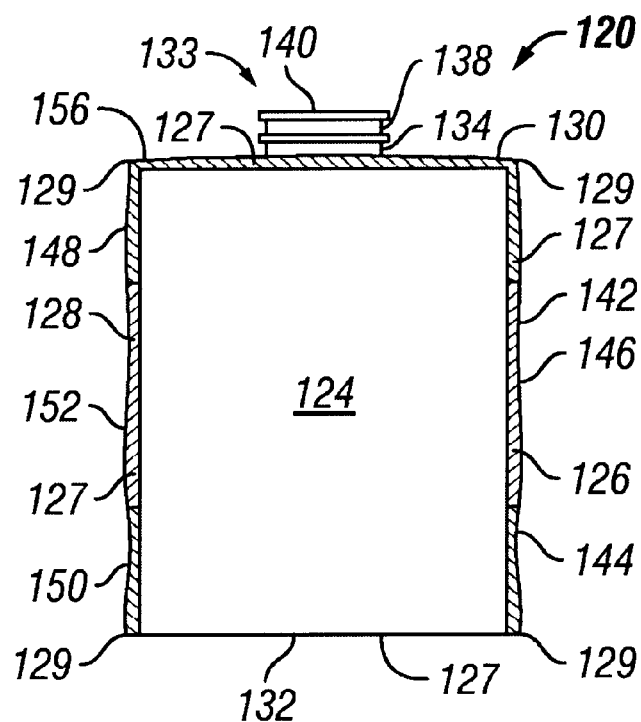
FIG. 5 is a rear plan view of the standup bag of FIG. 3.
Figure 6:
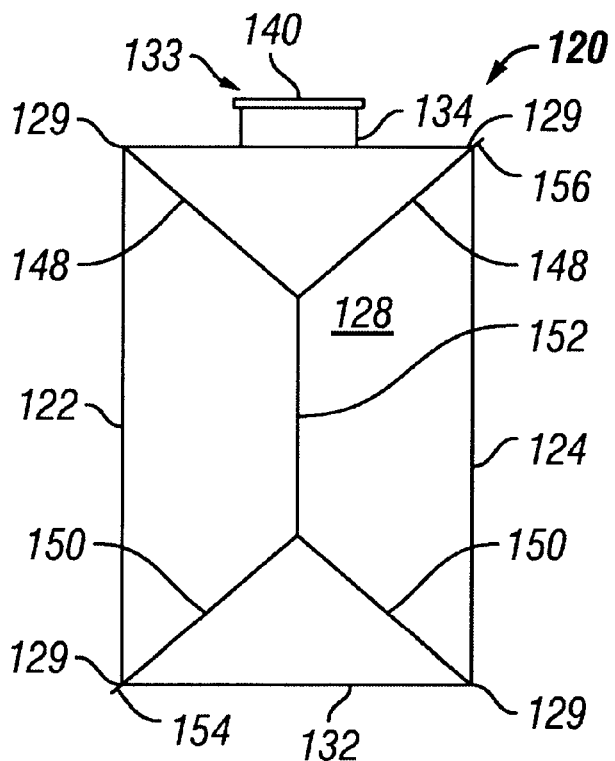
FIG. 6 is a plan view of one side of the standup bag of FIG. 3.
Figure 7:
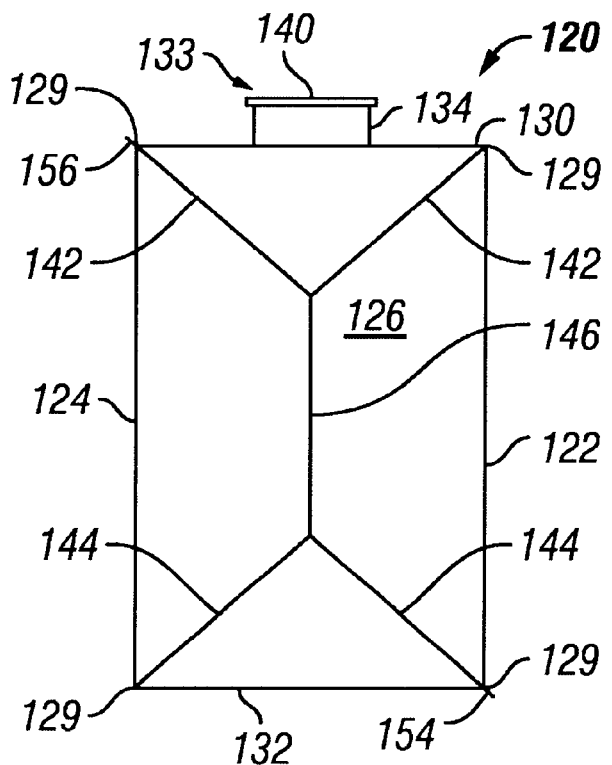
FIG. 7 is a plan view of the other side of the stand up bag of FIG. 3
Figure 8:
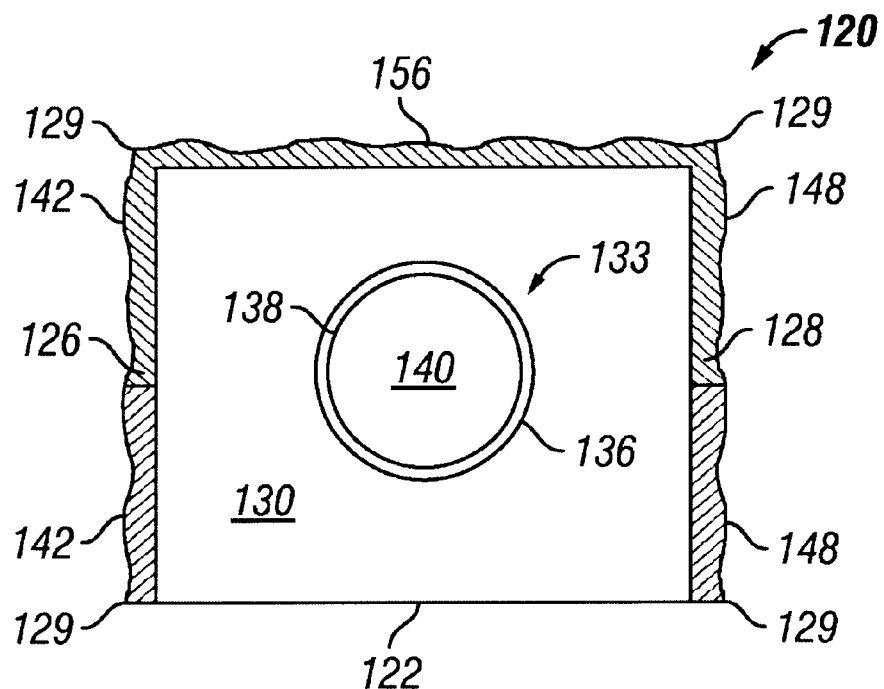
FIG. 8 is a top plan view of the standup bag of FIG. 3.
Figure 9:
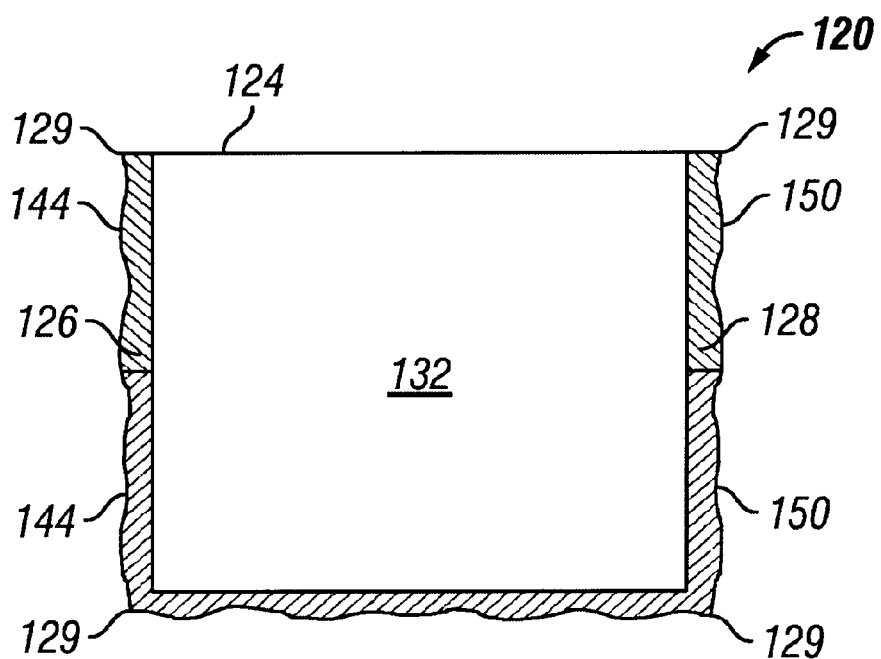
FIG. 9 is a bottom plan view of the standup bag of FIG. 3.

Referring to FIGS. 3–9, a standup bag 120 of the present invention is illustrated. The standup bag 120 has a front wall 122, a rear wall 124, side walls 126, 128; a top wall 130, and a bottom wall 132 to define therebetween an enclosed brick-shaped region for containing the flowable substance. The walls 122, 124, 126, 128, 130, 132 are formed from flexible sheets which are secured together by heat sealing, impulsed sealing, ultrasonic sealing, radio frequency (RF) sealing, or other techniques as would be apparent to those skilled in the art. In the standup bag as shown in FIGS. 6–7, all opposing walls are substantially parallel. For example, the front wall 122 and the rear wall 124 are substantially parallel to one another. Likewise, the top wall 130 and the bottom wall 132, and the side walls 126, 128 are substantially parallel to one another. Additionally, the edges of the walls that comprise the standup bag are substantially perpendicular to one another. Referring back to FIGS. 4–5, the edges 127 of the walls are configured such that an angle formed between two adjacent edges is about 90 degrees. Accordingly, the standup bag may have a plurality of shapes including, but not limited to, a rectangular pyramid or a cuboid structure.

Figure 10A:
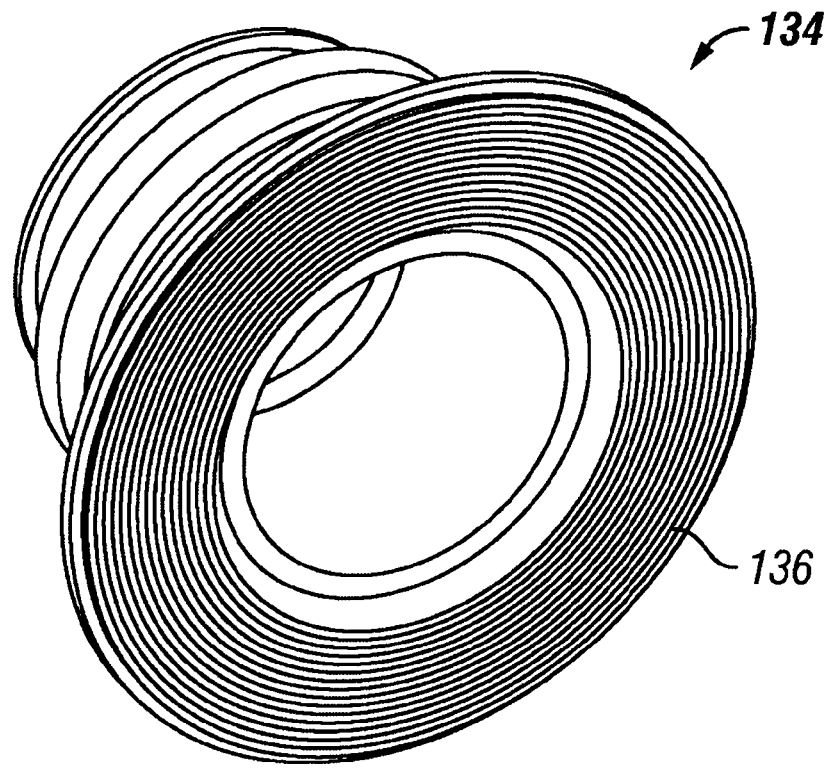
FIGS. 10A–10C are enlarged views of the fitment of FIG. 3.
Figure 10B:
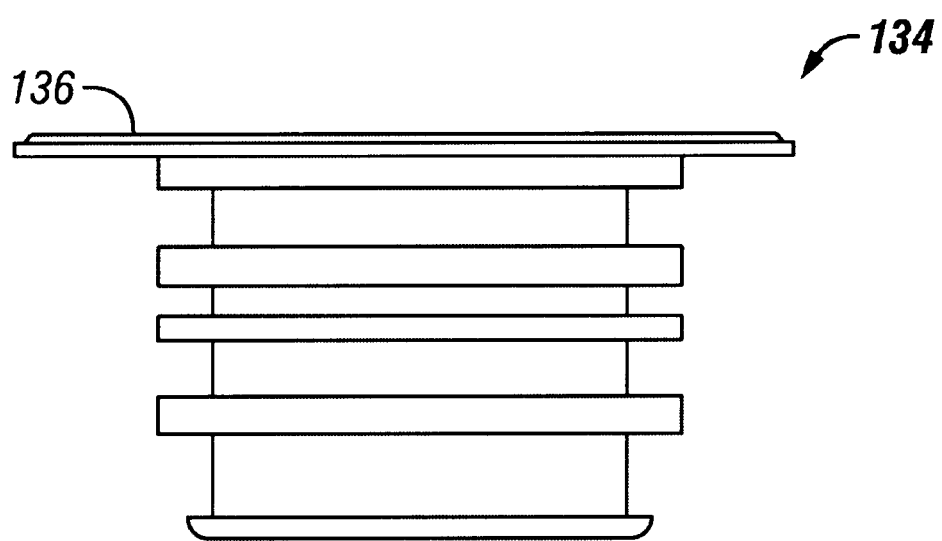
Figure 10C:
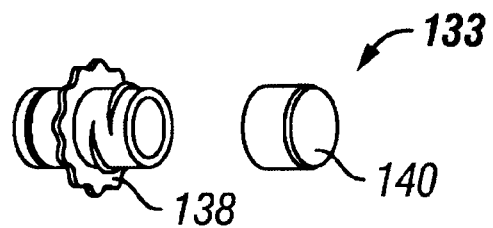
Figure 11:
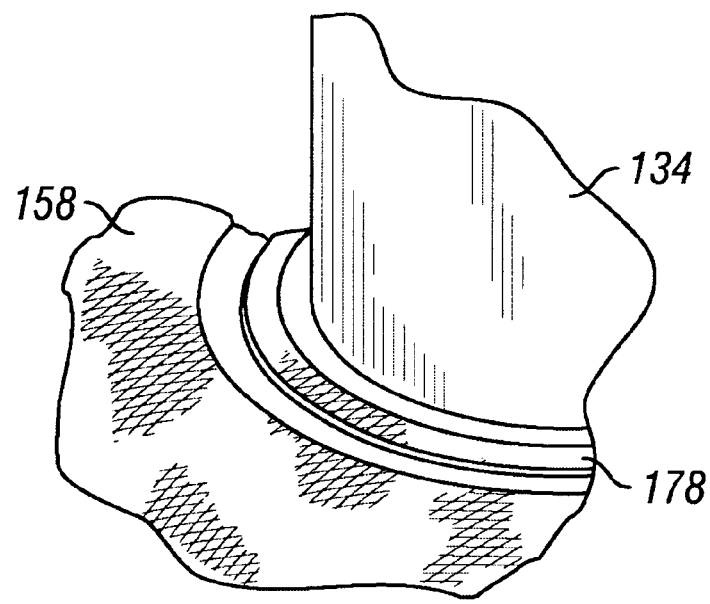
FIG. 11 is an enlarged perspective view showing the securement of the sheet to the top surface of the bottom seal flange of the fitment of FIG. 3.
Figure 12:
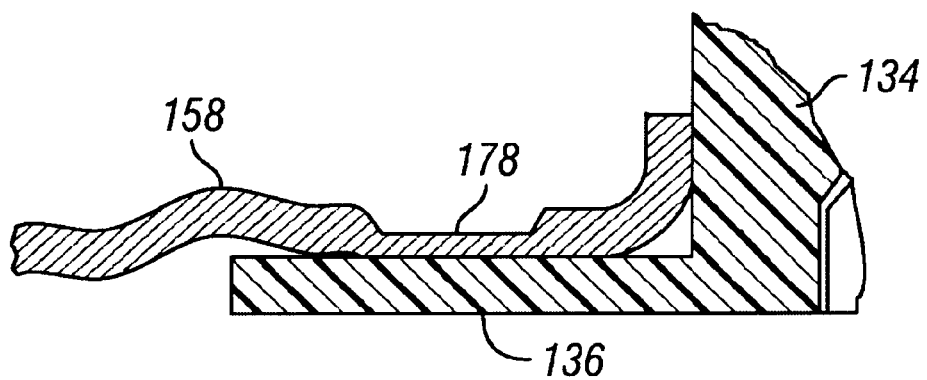
FIG. 12 is a cross-sectional view through FIG. 11.
Figure 13A:
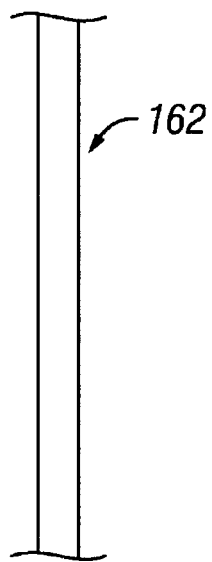
FIGS. 13A–C are side views of the stand up bag of FIG. 3 having a plurality of material plies.
Figure 13B:
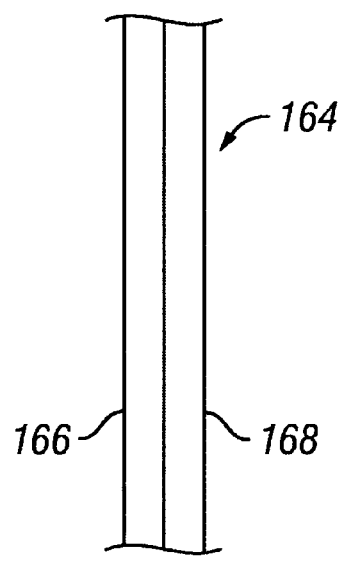
Figure 13C:
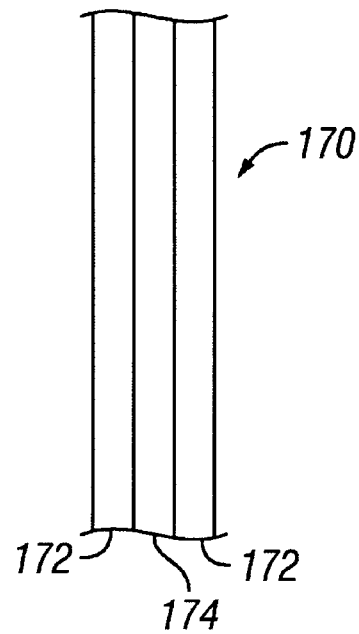
Figure 14:
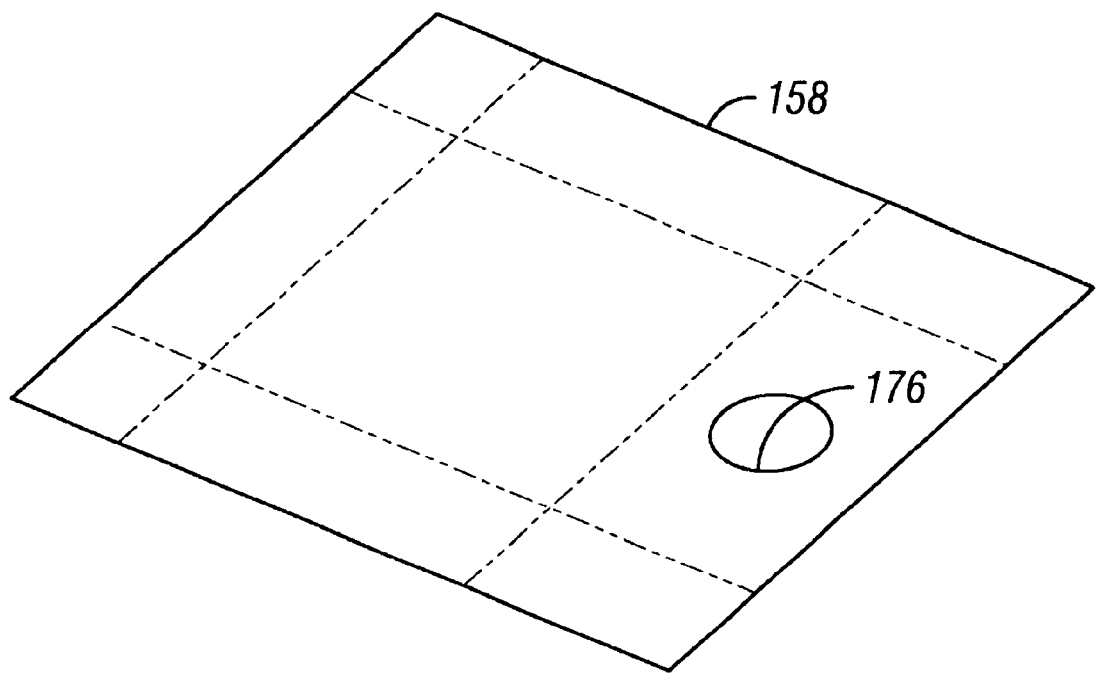
FIGS. 14–23 show the steps for forming the standup bag of FIG. 3.
Figure 15:
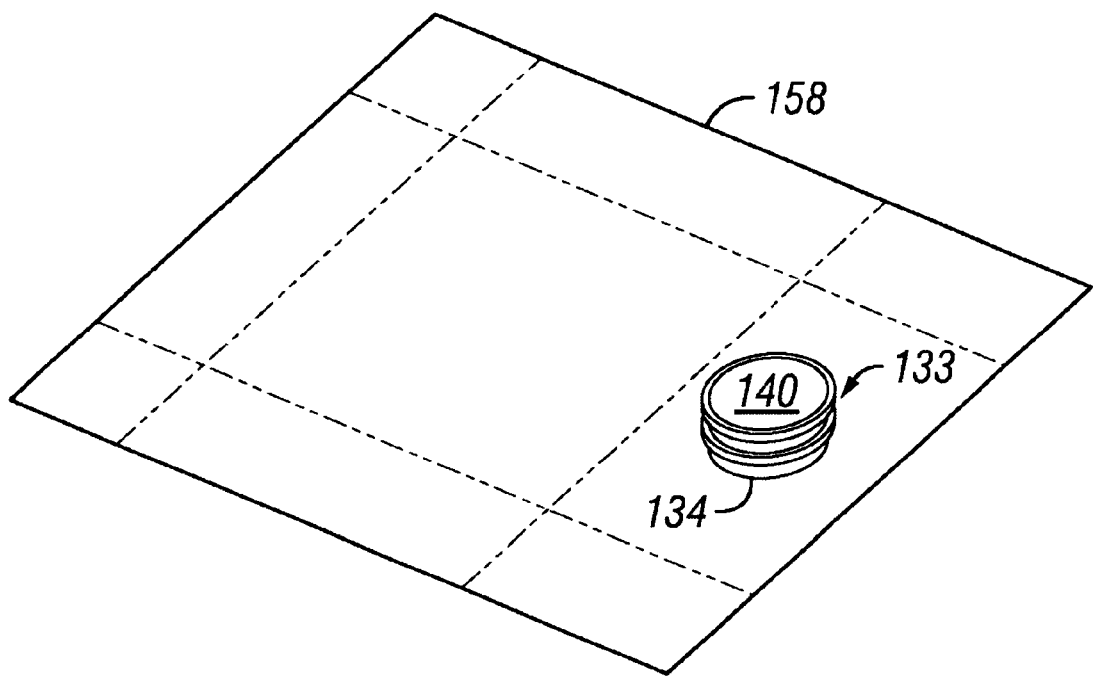

The top wall 130 has a through-hole (not shown) and a fitment shown generally at 133 secured at the hole. The fitment may include at least two parts, a spout body 134 and a lower flange 136. In another embodiment of the fitment, a valve member may provided with the spout body at region 138 as shown in FIG. 3. Additionally, a closure such as, but not limited to, a cap 140 that may be reversibly attached to the opening of spout body. All three parts can be made of plastic, preferably polyethylene. The bottom surface of the lower flange 136 is shown enlarged and in isolation in FIGS. 10A and 10B. The spout body 134 is passed through the through-hole (not shown) so that the top surface of the lower flange 136 engages the bottom surface of the top wall 130 as shown in FIGS. 11 and 12. The top wall 130 is secured to the flange 136 top surface as a ring-shaped seal around the lower flange. Thus, the flange 136 top surface acts as a sealing surface. The flange may be secured to the bag material by heat sealing, impulsed sealing, ultrasonic sealing, RF sealing, or by other techniques known in the art.

Referring back to FIG. 3, the spout is placed in the center of the top wall 130. According to alternate embodiments of the present invention, the spout may be placed in a plurality of locations. As shown in FIG. 3A, a spout may be placed along the heat seal seam 156. Those skilled in the art will appreciate that a spout may be placed along any of the heat seals 148, 150, 152, 154. In an alternate embodiment, the through hole (not shown) and spout may be positioned on any wall 122, 124, 126, 128, 130, 132. Additionally, the spout may be placed at any position on any wall at any location of the wall such as, but not limited to, the top, bottom, center, or off-center positions.

In an alternate embodiment, a closure may be attached to the spout. As shown in FIG. 3, the most basic closure is a plastic cap that may be reversibly attached to the spout. The cap may be made of plastic, preferably polyethylene. Other closures such as, but not limited to, a valve may be attached to the spout opening. The valve provides a means of controlling the contents of the bag. In one embodiment, the valve has at least two positions. In a first position, a passage is provided which allows for the contents to be dispensed. In a second position, the dispensing valve is closed and the contents can not be dispensed. In another embodiment, the valve may be positioned in an intermediate position where the bag contents are dispensed at a lower flow rate as compared to a valve in the first position.

Figure 16:
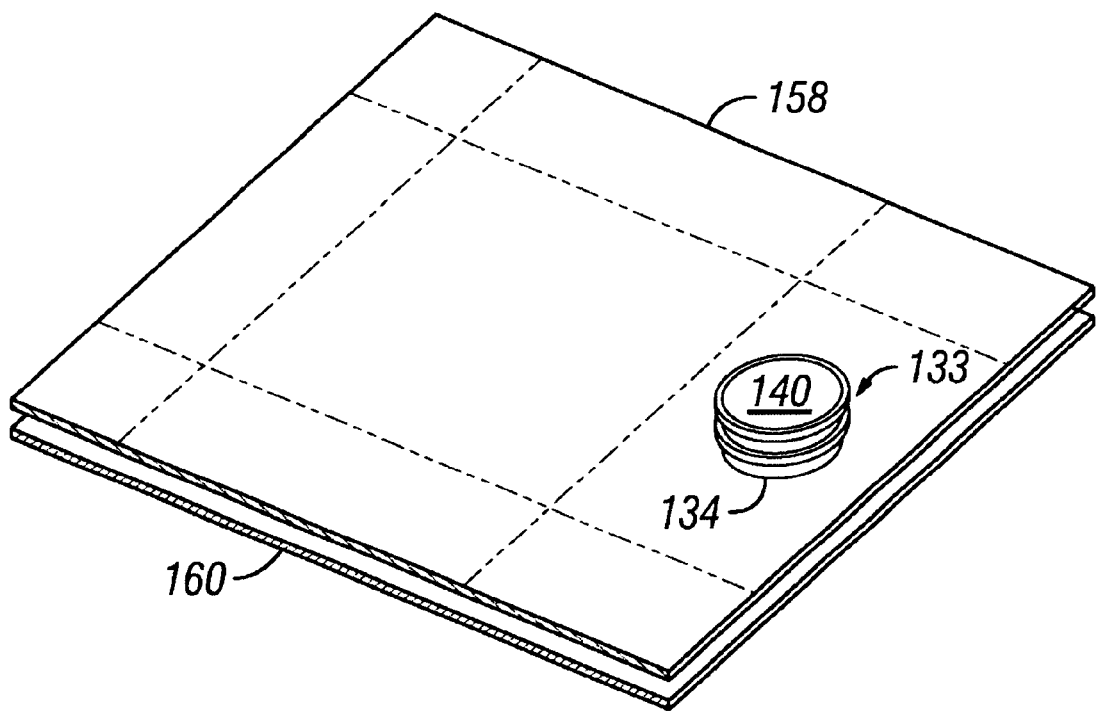

The front wall 122, portions of the side walls 126, 128, and the top wall 130 are formed from a first sheet 158, while the rear wall 124, portions of the side walls 126, 128, and the bottom wall 132 are formed from a second sheet 160 as shown in FIGS. 6, 7, and 16. In particular, the first side wall 126 includes upper heat seals 142 which extend from upper corners of the first side wall 126 and join to form a V-shaped seal when viewed from the side as shown in FIG. 7. The first side wall 126 further includes lower heat seals 144 which extend from lower corners of the first side wall 126 and join to form an inverted V-shaped seal. The V-shaped seals are joined together by a longitudinal heat seal 146 which substantially bisects the first side wall 126. The combination of the V-shaped seals and the longitudinal heat seals forms a bag contour structure. Similarly, the second side wall 128 includes upper heat seals 148 and lower heat seals 150 which form V-shaped seal and an inverted V-shaped seal as shown in FIG. 6, and each of the V-shaped seals are joined together by a longitudinal heat seal 152. As shown in FIG. 3, the longitudinal heat seal 152 may be twisted. The twisted heat seal is attributable to the manufacturing process, yet it may confer additional rigidity to the bag 120 when filled with a fluid. In another embodiment, the longitudinal heat seal 152 is straight as shown in FIG. 3A.

Referring to FIG. 4, a heat seal 154 extends along the bottom edge of the front wall 122 from one of the lower heat seals 144 of the first side wall 126 to one of the lower heat seals 150 of the second side wall 128. In a similar fashion, a heat seal 156 extends along the top edge of the rear face 124 from one of the upper heat seals 142 of the first side wall 126 to one of the upper heat seals 148 of the second side wall 128 as shown in FIG. 5. The heat seals that comprise upper and lower V-shaped seals together with the longitudinal heat seal form a contour structure. The contour structure serves to enhance the rigidity to the flexible bag. As the bag is filled with a flowable substance, the standup may be self-standing due in part to the contour structure.

By configuring the standup bag 120 in the manner shown in FIGS. 3–9, a substantially flat bag may be filled to form a self-standing bag. The relatively flexible sheets are rigidified by the flowable substance exerting pressure against the walls 122, 124, 126, 128, 130, 132. Furthermore, the corners 129 of the standup bag 120 remain rigid and well defined as a result of the flowable substance exerting pressure against the corner regions. Additionally, when a flowable substance is introduced into the bag, the contour structures also distribute the force of the flowable substance and helps define the overall structure of the standup bag. In other words, the pressure of the flowable substance exerted against the contour structures, walls, and the corners of the standup bag creates substantially flat and stable surfaces that allow the standup bag 120 to stand upright on a level surface, even when only partially filled with the flowable substance.

By doing away with conventional bag configurations known in the art such as using relatively thick sheet material and/or supportive structures (i.e. gussets, skirts, and flaps), significant material and manufacturing costs may be reduced. After filling the standup bag, storage and transportation costs may be reduced because the basic cubic shape of the bag occupies less space than non-cubic shape bags such as cylindrical containers of comparable volume. Furthermore, the cubic shape of the standup bag may be more appealing for marketing purposes due to its simplified shape and the ability to form continuous graphics and labeling.

Referring to FIGS. 67–69B, another embodiment of the standup bag 490 is illustrated. The standup bag 490 has a front wall 500, a rear wall 502, side walls 501, 503, a top wall 508, and a bottom wall 510 to define therebetween an enclosed frustrum of a rectangular pyramidal for containing the flowable substance. As shown in FIGS. 67–69B, the top of the standup bag is narrower than the bottom of the bag.

Figure 67:
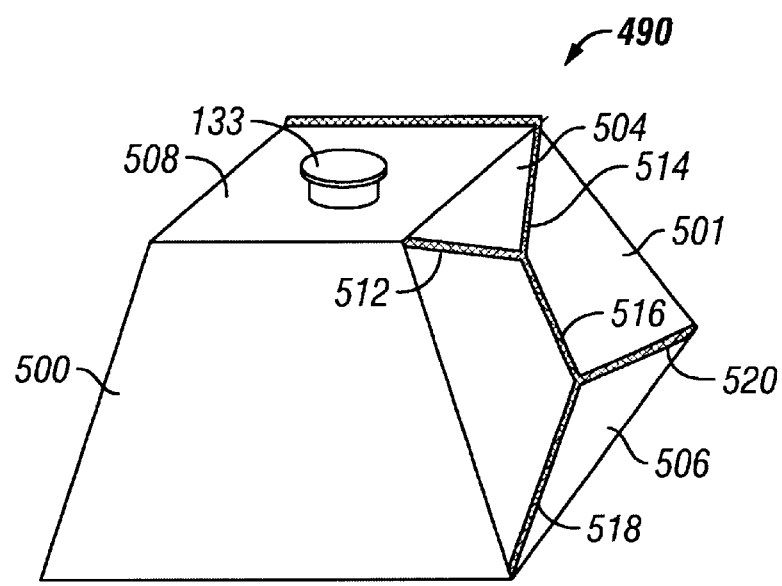
FIG. 67 is a perspective view of a flexible bag of the present invention in the form of a standup bag having a fitment.
Figure 67A:
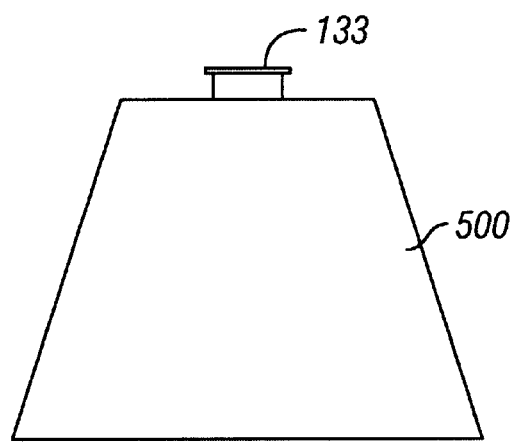
FIG. 67A is a front plan view of the flexible bag of FIG. 67.
Figure 67B:
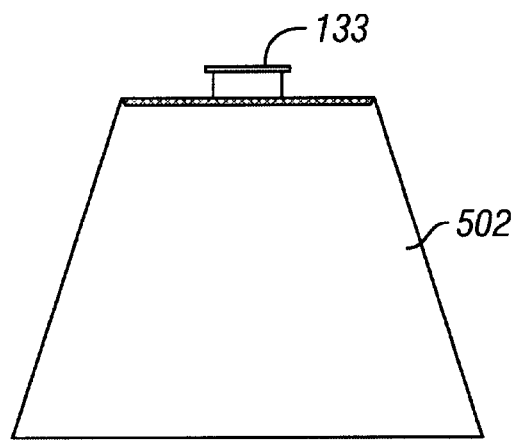
FIG. 67B is a rear plan view of the flexible bag of FIG. 67.
Figure 67C:
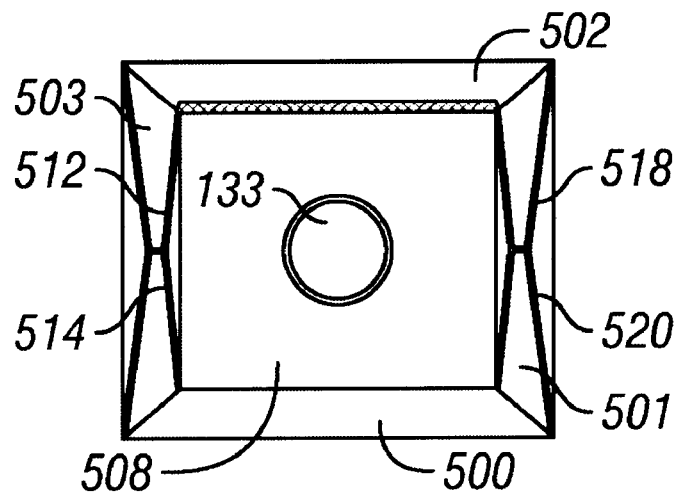
FIG. 67C is a top plan view of the flexible bag of FIG. 67.
Figure 67D:
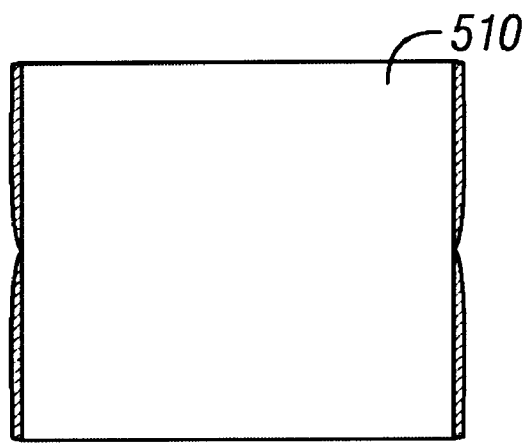
FIG. 67D is a bottom plan view of the flexible bag of FIG. 67.
Figure 68:
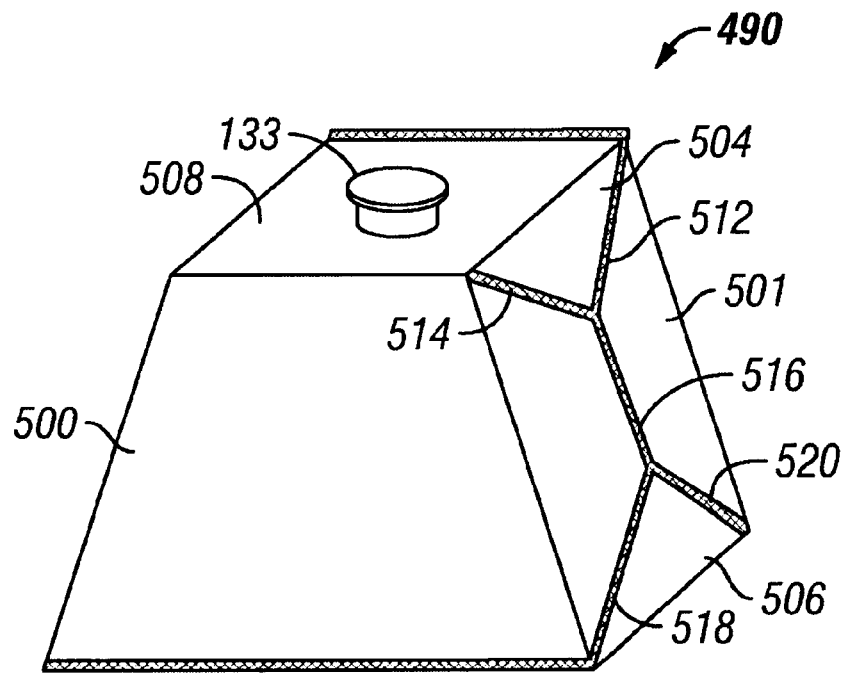
FIG. 68 is a perspective view of an alternate embodiment of a flexible bag of the present invention in the form of a flexible bag having a fitment.

The shape of the standup bag 490 is attributed to at least two opposing walls 500, 502 or 501, 503 having a configuration as shown in FIG. 67. The first side wall 501 further includes upper heat seals 512, 514 that extend from the upper corners of the side wall 501 to form a first 504 V-shaped seal when viewed from the side as shown in FIG. 68. The first side wall 501 further includes lower heat seals 518, 520 that extend from the lower corners of the side wall 501 to form an inverted V-shaped seal 506. The first 504 and second 506 V-shaped seals are joined together by a longitudinal heat seal 516 to form a contour structure. Similarly, the second side wall 503 includes upper and lower heat seals that form a first and second V-shaped seal joined by a longitudinal heat seal to form a contour structure.

Figure 68A:
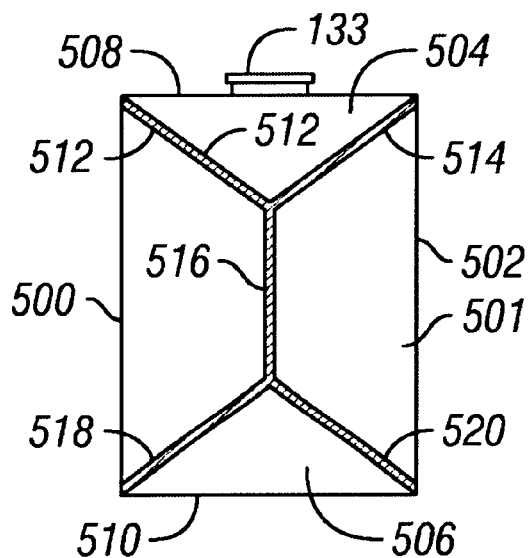
FIG. 68A is a plan view of one side of the flexible bag of FIG. 68.
Figure 69:
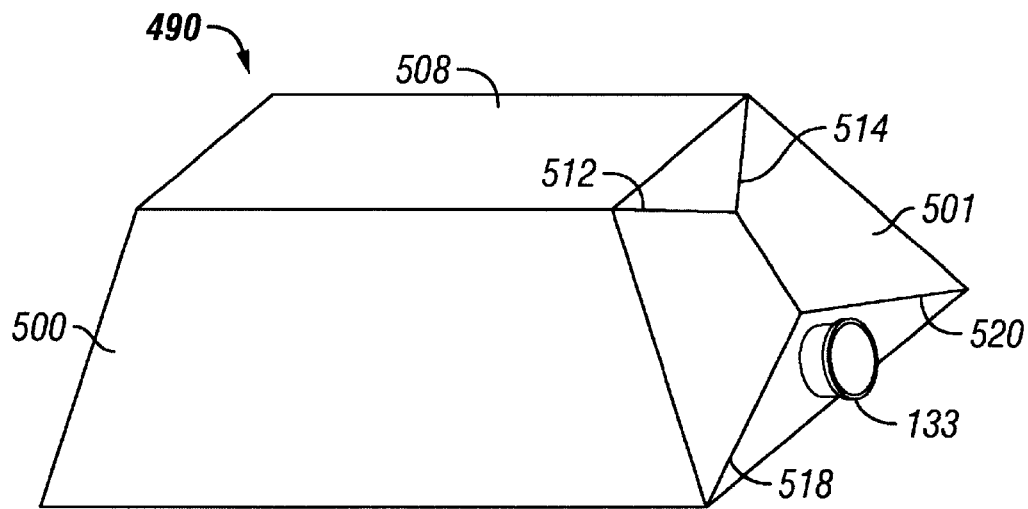
FIG. 69 is a perspective view of an alternate embodiment of a flexible bag of the present invention in the form of a standup bag having a fitment.
Figure 69A:
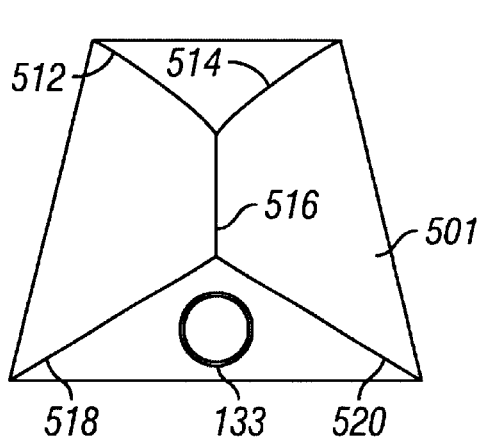
FIG. 69A is a plan view of one side of the flexible bag of FIG. 69.
Figure 69B:
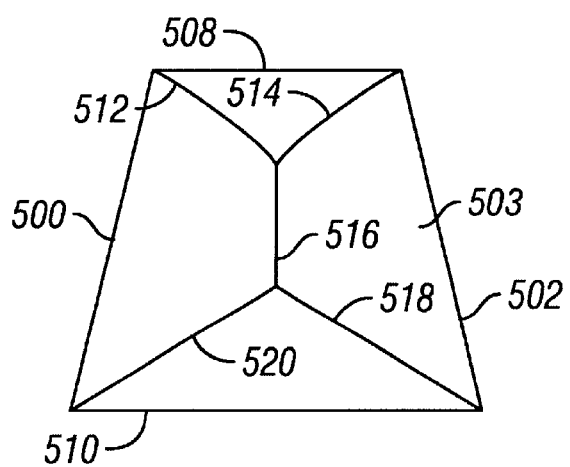
FIG. 69B is a plan view of the other side of the flexible bag of FIG. 69.

In an alternate embodiment, the front 500 and rear 502 walls have a configuration as shown in FIGS. 68 and 68A and the side walls 501, 503 have a rectangular shape such as, but not limited to, a square or a rectangle as shown in FIGS. 68 and 68A. In yet another embodiment, the front, back, and both side walls may be pyramidally-shaped to form a standup bag as illustrated in FIGS. 69, 69A, and 69B. The difference in width between the top and bottom of a pyramidal-shaped wall may be as little as 1–2.5 mm; however, it is also contemplated that the difference in width may be substantially larger.

Figure 70:
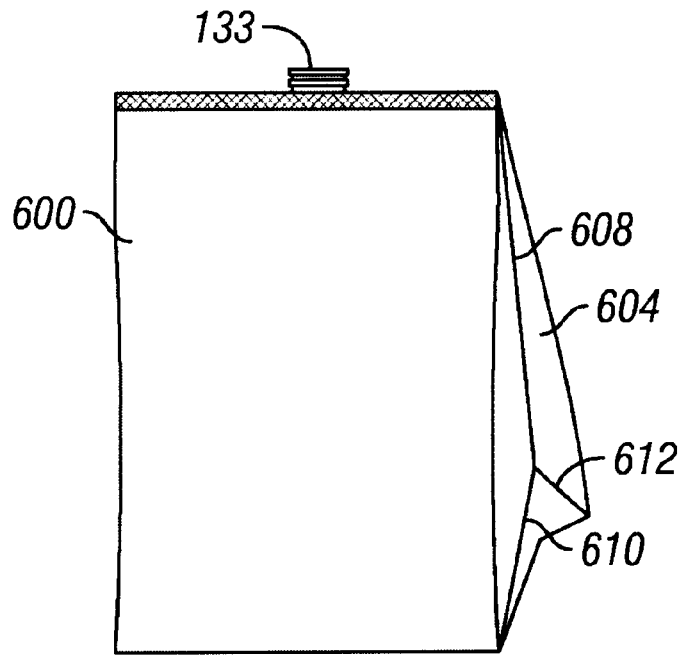
FIG. 70 is a perspective view of an alternate embodiment of a flexible bag of the present invention in the form of a standup bag.
Figure 70A:
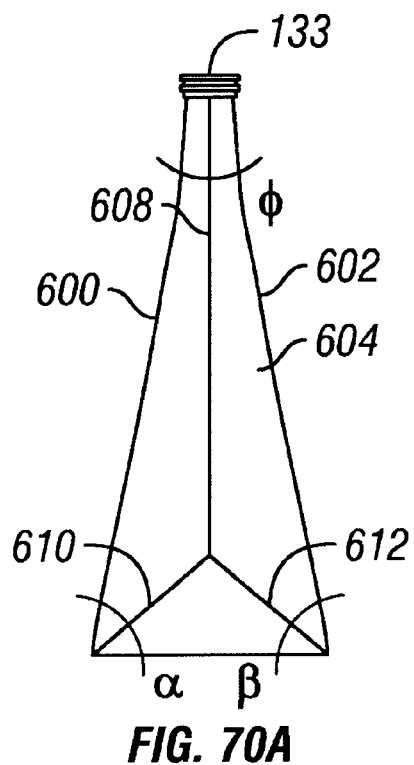
FIG. 70A is a side view of one side of the flexible bag of FIG. 70.
Figure 71:
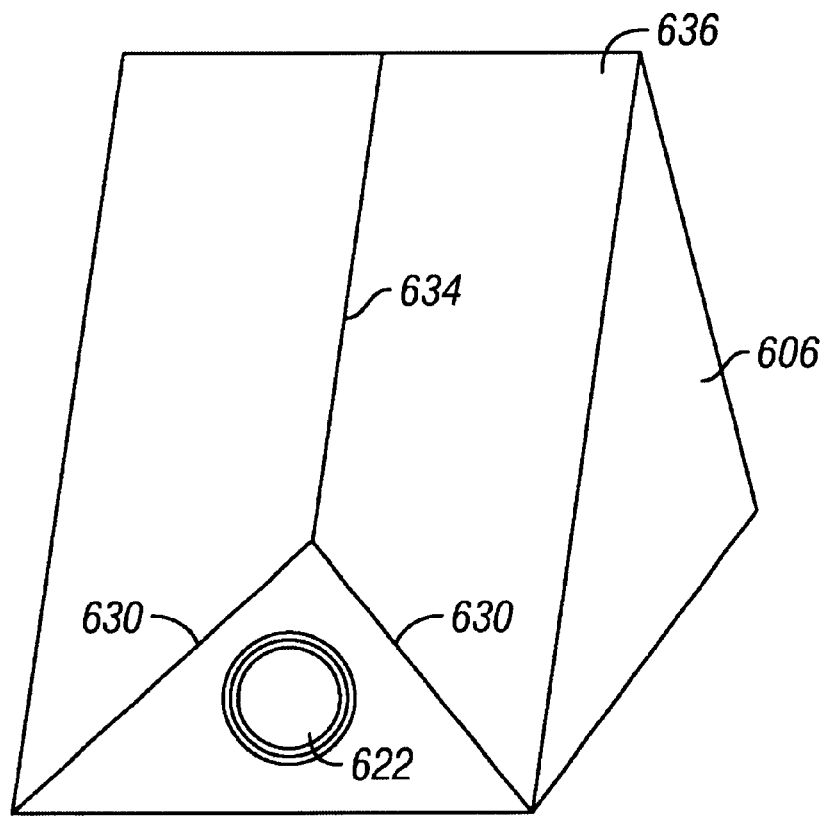
FIG. 71 is a perspective view of an alternate embodiment of a flexible bag of the present invention in the form of a standup bag.

FIGS. 70–71 illustrate a prism-shaped bag where the front panel and back panel meet at a point which is fin sealed. The front wall 600 and the back wall 602 have a substantially right quadrilateral shape while the side walls 604, 606 are triangular in shape. The side walls include heat seals 608, 610, 612 that extend from the corners of the side wall to form an inverted Y-shaped seal as shown in FIG. 70A. The heat seals 608, 610, 612 extend away from the corners at an angle that is about half of the angle formed between adjacent edges of the side wall. Stated differently, the heat seals bifurcate the angles α, β, φ formed between adjacent edges of the side wall as shown in FIG. 70A.

Figure 70B:
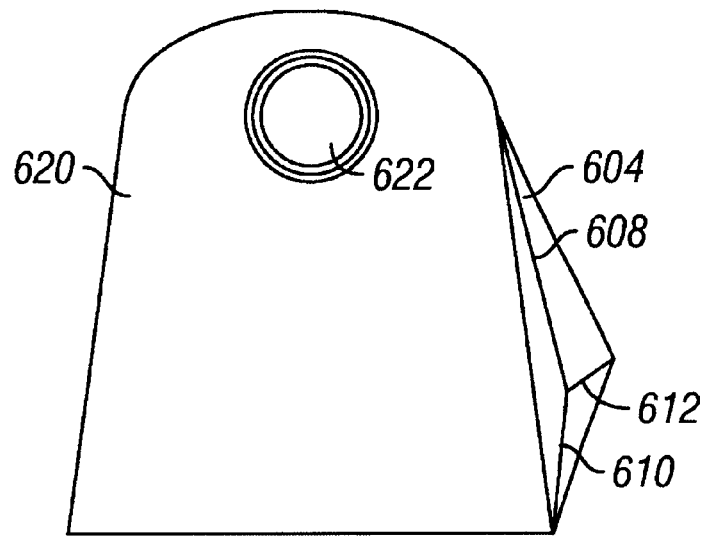
FIG. 70B is a perspective view of an alternate embodiment of a flexible bag of the present invention in the form of a standup bag.

FIG. 70B illustrates another prism-shaped bag where the front and back panels meet at a point. The standup bag comprises two side walls 604, 606 that are triangular in shape and front wall 620 and back wall (not shown) that have a substantially right quadrilateral shape with a rounded top region. The front 620 and back walls (not shown include and lower seals 610, 612 that form a lower triangular profile. These upper and lower triangular profiles are connected by a longitudinal heat seal 608. Additionally, the fitment 622 is located on the front wall 620.

Figure 70C:
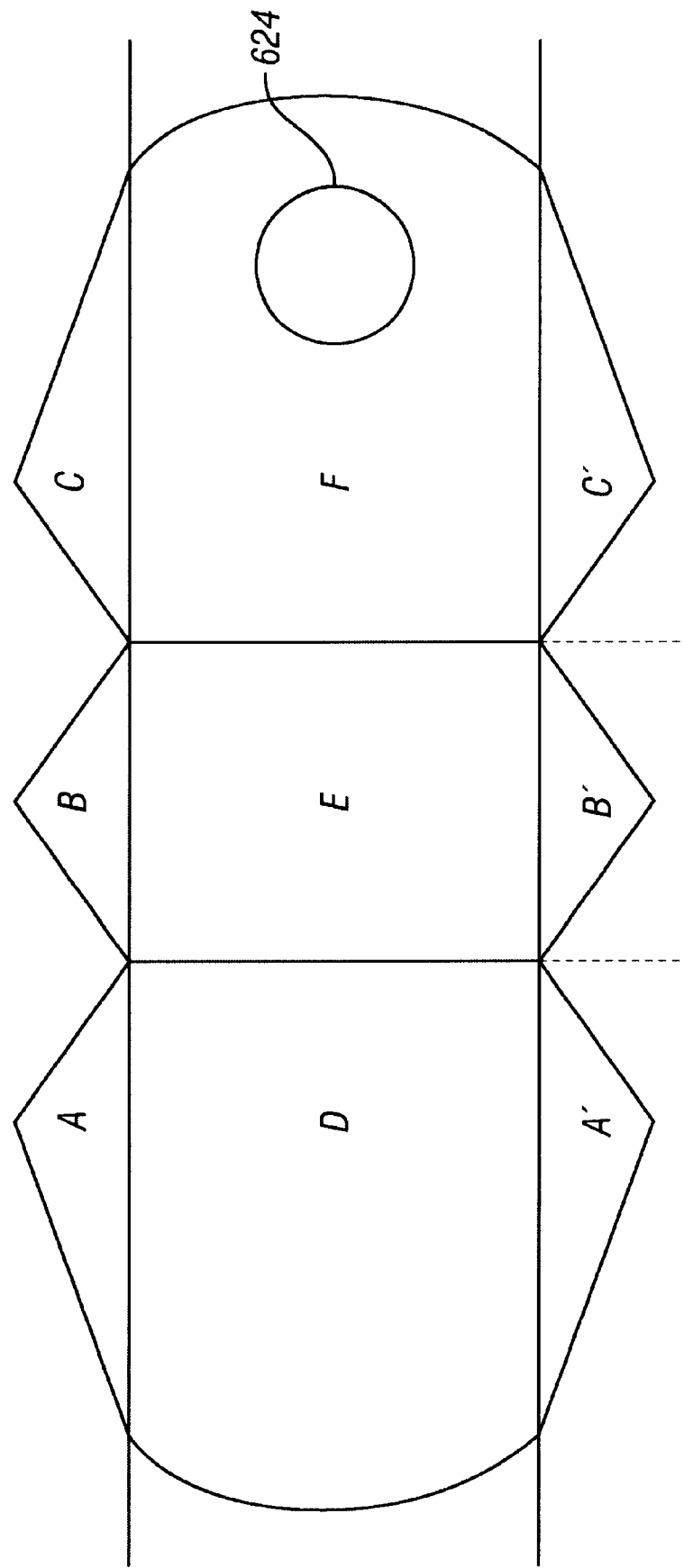
FIG. 70C is a template of the flexible bag of FIG. 70B.

FIG. 70C illustrates a pattern that may be used to form the standup bag as shown in FIG. 70B. Sections A, B, C, A', B', and C' form the two side panels of the standup bag. Section E is the bottom wall, and Sections D and F are the front and back walls, and the fitment is inserted through a through-hole (not shown). The standup bag made according to the pattern of FIG. 70C comprises at least one sheet of material. That is, the standup bag may be made from one to nine sheets of material. For example, nine separate sheets of material may be provided to form each section (A–F and A'–C') and each section is welded together to form the standup bag as illustrated in FIG. 70B.

FIG. 71 shows another embodiment of a prism shaped standup bag of the present invention. The standup bag comprises a front wall 636, back wall (not shown), side walls 606, and a bottom wall (not shown). The standup bag also includes a fitment 622 which may be provided on any walled surface or along any heat sealed edge. As shown in FIG. 71, the fitment is located at the bottom of the front panel. However, those skilled in the art will appreciated that the fitment may be located on any surface or along any seal of the bag. As shown in FIG. 71, the front and back walls include a longitudinal heat seal 634 and oblique heat seals 630.

As shown in FIG. 70, a fin seal fitment 133 is provided at the top of the standup bag. FIG. 70B illustrates a standup bag having a fitment 622 provided on a walled surface. Those skilled in the art will appreciate that the fitments may be located on any surface or along any edge of the standup bag of the present invention. The fitment location as shown in FIGS. 70–71 are illustrative and not meant to be limiting.

Referring back to FIG. 67, the standup bag has a through hole (not shown) and a fitment provided on the top wall. The fitment may be placed in a plurality of locations such as, but not limited to, the front wall, rear wall, first V-shaped seal of the first side wall, second V-shaped seal of the first side wall, first side panel of the first side wall, and second side panel of the first side wall, first V-shaped seal of the second side wall, second V-shaped seal of the second side wall, first side panel of the second side wall, and second side panel of the second side wall. The fitment may be placed along a heat seal seam as shown in FIG. 3A. Those skilled in the art will appreciate that a fitment may be placed along any of the heat seals of the standup bag. Furthermore, the standup bag may be provided with more than one fitment.

The pyramidal-shape is advantageous because it provides additional stability for a given thickness of material. That is, in addition to the contour structures and substantially flat walls, the pyramidal shape provides a larger base to further enhance the stability of the standup bag. The enhanced stability of the pyramidal-shaped bag is illustrated by comparing FIGS. 99A–D and FIGS. 100A–D. FIGS. 99A–D illustrates the effects of a force X applied to the side of a rectangular-shaped bag. FIGS. 100A–D illustrates the effects of the same force X applied to the side of a pyramidal-shaped bag of the present invention.

Figure 99A:
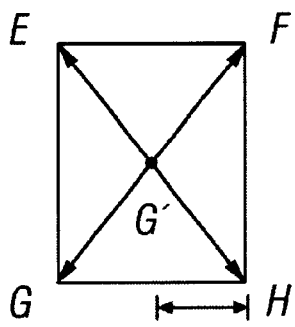
FIGS. 99A–D illustrate the effects of Force X applied to a standup bag of the present invention.
Figure 100A:
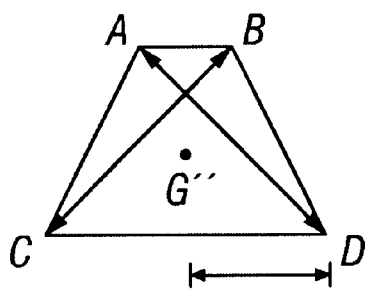
FIGS. 100A–D illustrate the effects of Force X applied to an alternate embodiment of a standup bag of the present invention.

FIG. 99A shows the rectangular-shaped bag's center of gravity G and the lines of force shown as lines E to H and F to G. FIG. 100A shows the pyramidal-shaped bag's center of gravity G' and the lines of force shown as the lines A to D and C to D. The lines of force represent the tension in the bags, and the bags' tendency to retain their shapes when subjected to external forces. As shown in FIGS. 99A and 100A, the pyramidal-shaped bag has larger lines of forces as compared to the rectangular-shaped bag. Accordingly, the pyramidal-shaped bag has a greater tendency to hold its shape as compared to the rectangular-shaped bag. Furthermore, the pyramidal-shaped bag's ability to retain its shape translates into the ability to remain self-standing when an external force is applied to the bag.

Figure 99B:
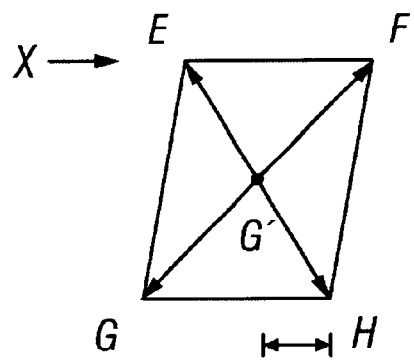
Figure 99C:
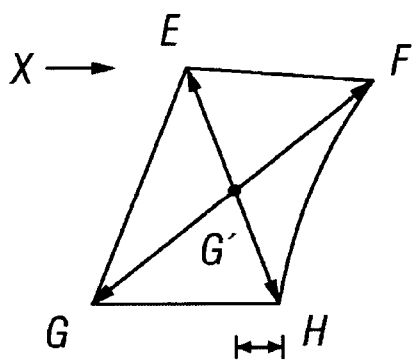
Figure 99D:
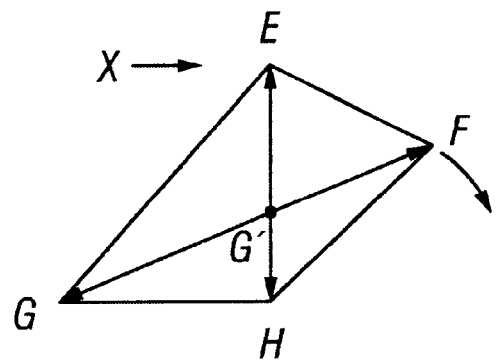
Figure 100B:
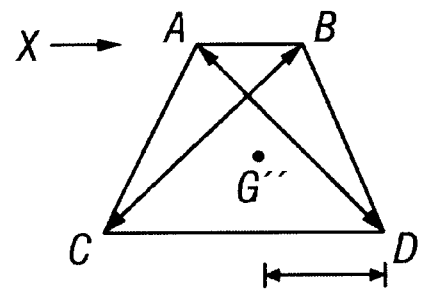
Figure 100C:
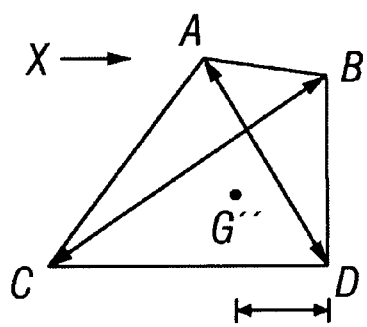
Figure 100D:
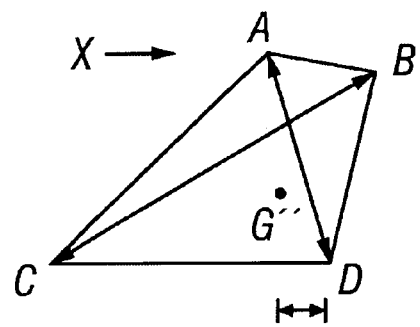

As shown in FIG. 99B and FIG. 100B, when force X is applied to the side of the bag, the center gravity G', G" of the rectangular and pyramidal bags have shifted towards point D and point H, respectively. As an additional force X is applied to the side of the pyramidal-shaped bag, the bag's center of gravity G" moves closer to point D as shown in FIGS. 100C–D. Likewise, when the same force X is applied to the rectangular shaped bag, the center of gravity G' moves closer to point H as shown in FIG. 99C. As shown in FIG. 99D, when the center of gravity G' moves closer to point H, the bag will lose stability and topple over. That is, once the center of gravity gets too close and/or passes the footprint boundary of the bag, the corner of the bag buckles under the weight of the flowable substance thereby causing the bag to topple. In contrast, the pyramidal-shaped bag does not topple because the center of gravity G" is still within the boundary of the base. FIGS. 100A–D illustrate a pyramidal bag with a larger base footprint as compared to the top of the bag. However, a slight increase in the width of the base relative to the top of the bag has been shown to improve the stability of a standup bag.

Referring to FIGS. 13–23, the standup bag 120 can be formed by providing a first rectangular sheet 158 and a second rectangular sheet 160. Each of the sheets 158, 160 may be comprised of at least one layer of material. The layers of material may be co-extruded or glued or laminated together. In an alternate embodiment, the layers of material may be connected only at their edges by a perimeter seal. FIG. 13A shows a sheet 162 having a single-layer construction. FIG. 13B shows an alternative sheet having a two-layer construction 164 with an inner layer material 166 and an outer layer 168 material. FIG. 13C shows another alternative sheet 170 having a three-ply laminate construction with inner and outer layers 172 and a center layer 174.

Figure 17:
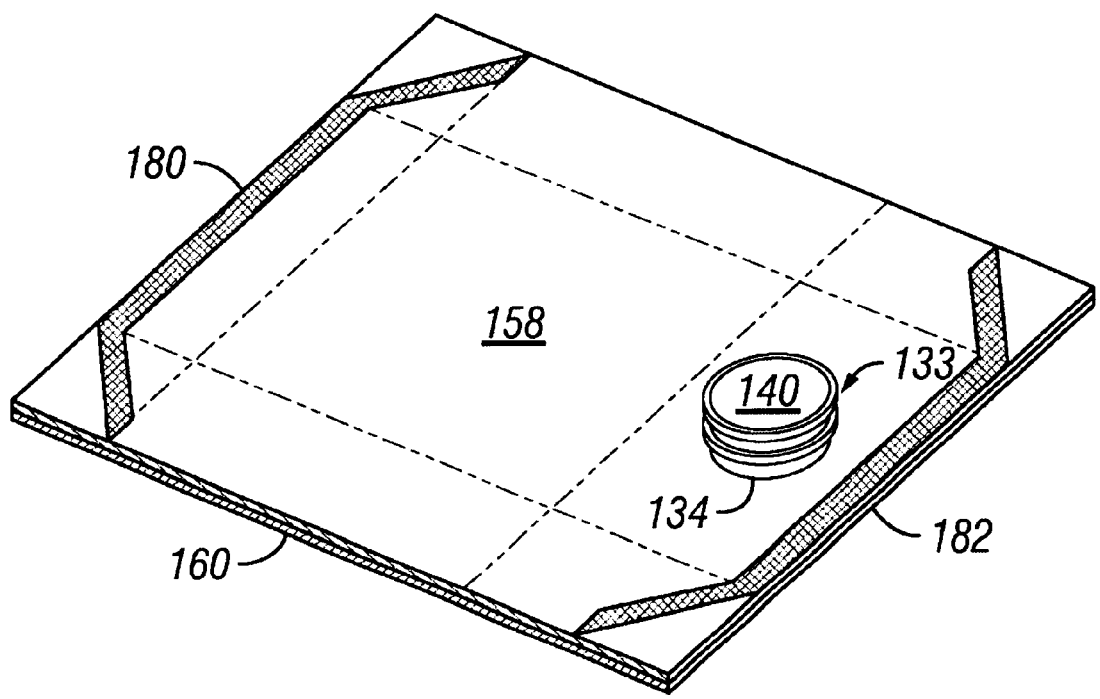
Figure 18:
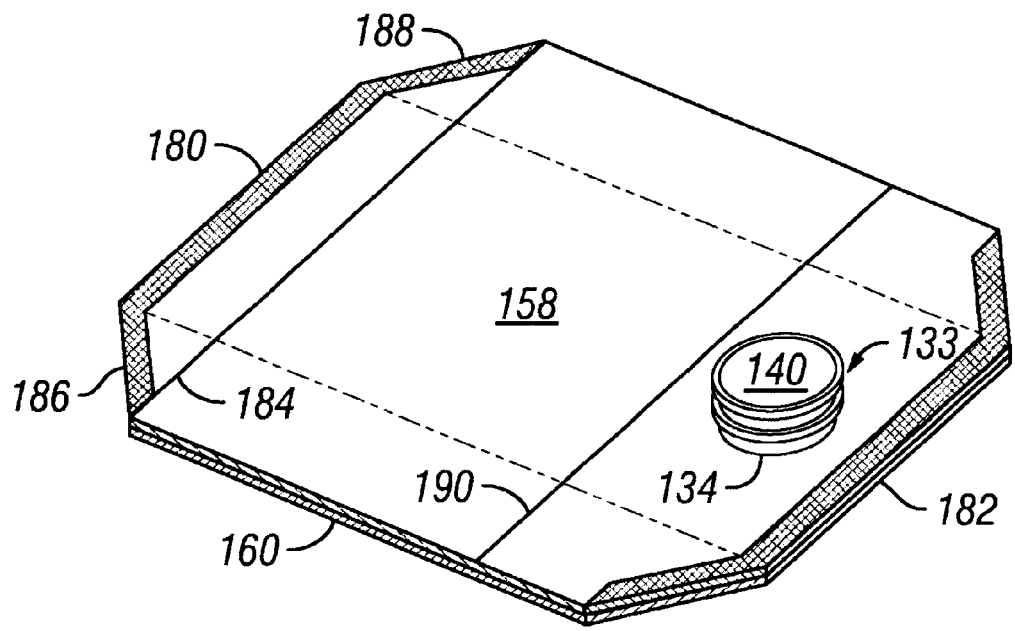

A hole 176 is punched in the first rectangular sheet 158 to define the through-hole (see FIG. 14), and the spout body 134 is fitted up through the through-hole (see FIG. 15), wherein the lower flange 136 is sealed to the first rectangular sheet 158 to form the seal ring 178 (see FIG. 12). Referring to FIG. 16, the first sheet 158 is positioned above the second sheet 160. As shown in FIG. 17, the sheets 158, 160 are secured together at a bottom portion by forming a first U-shaped seal 180 extending from one side of the sheets 158, 160 to an opposite side of the sheets 158, 160 and are further secured together at a top portion by forming a second U-shaped seal 182 extending from one side of the sheets to the opposite side of the sheets. The seals 180, 182 can be formed by heat sealing, impulsed sealing, ultrasonic sealing, radio frequency (RF) sealing, or other techniques as would be apparent to those skilled in the art. Referring to FIGS. 17 and 18, four corner portions of the sheets 158, 160 are removed by trimming along end segments of the first 180 and second U-shaped seal 182.

Figure 19:
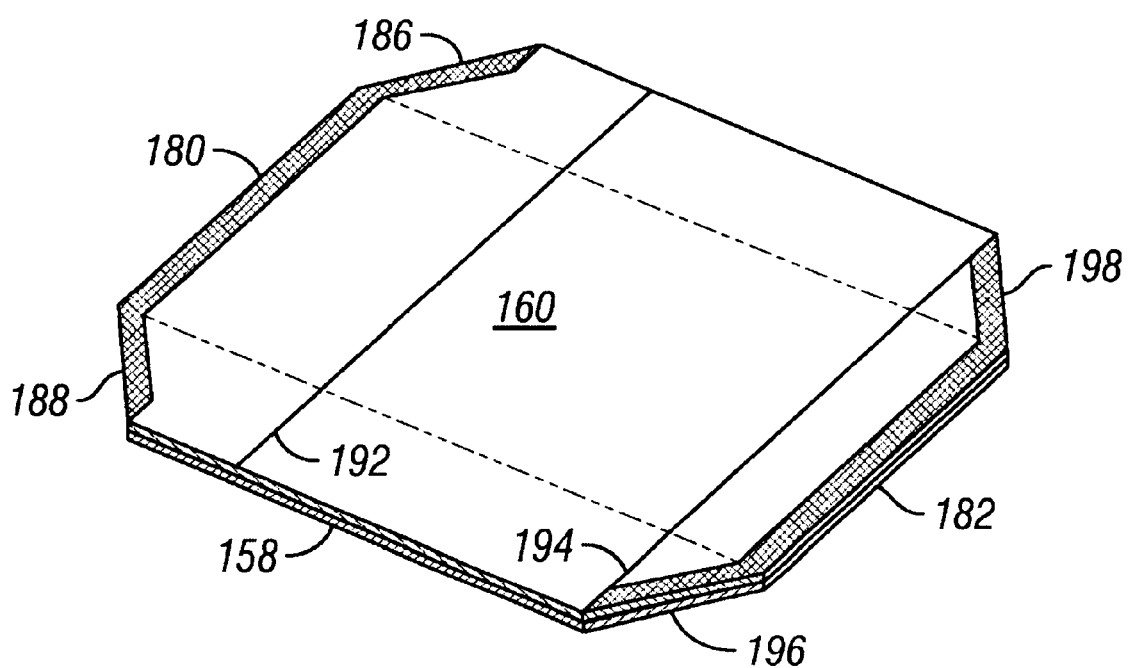

Referring to FIG. 18, a first fold 184 is formed near the bottom portion of the first sheet 158. The first fold 184 extends from one side of the first sheet 158 to the opposite side of the first sheet 158, wherein the first fold 184 abuts end segments 186, 188 of the first U-shaped seal 180. A second fold 190 is formed near the top portion of the first sheet. The second fold 190 extends from one side of the first sheet 158 to the opposite side of the first sheet 158. Referring to FIG. 19, a third fold 192 is formed near the bottom portion of the second sheet 160. The third fold 192 extends from one side of the second sheet 160 to the opposite side of the second sheet 160. A fourth fold 194 is formed near the top portion of the second sheet 160. The fourth fold 194 extends from one side of the second sheet 160 to the opposite side of the second sheet 160, wherein the fourth fold 194 abuts end segments 196,198 of the second U-shaped seal 182.

Figure 20:
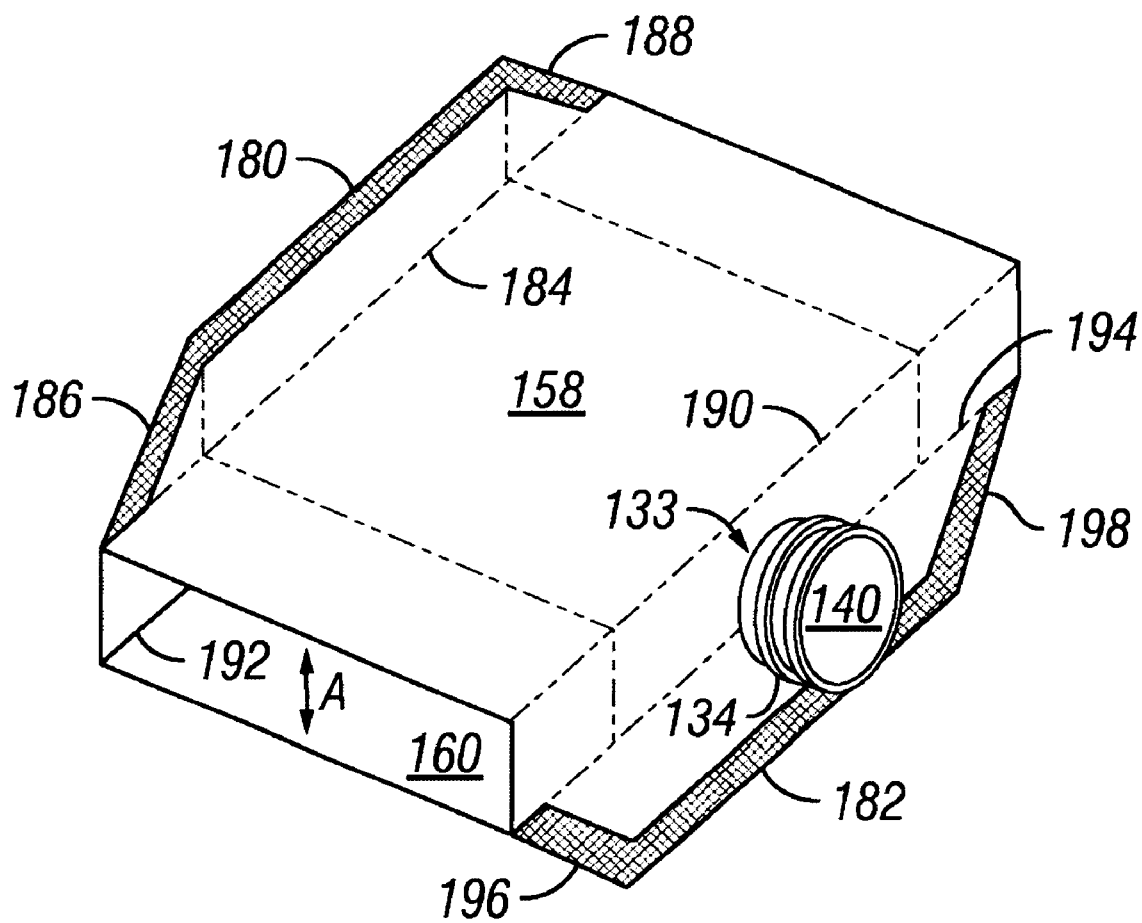
Figure 21:
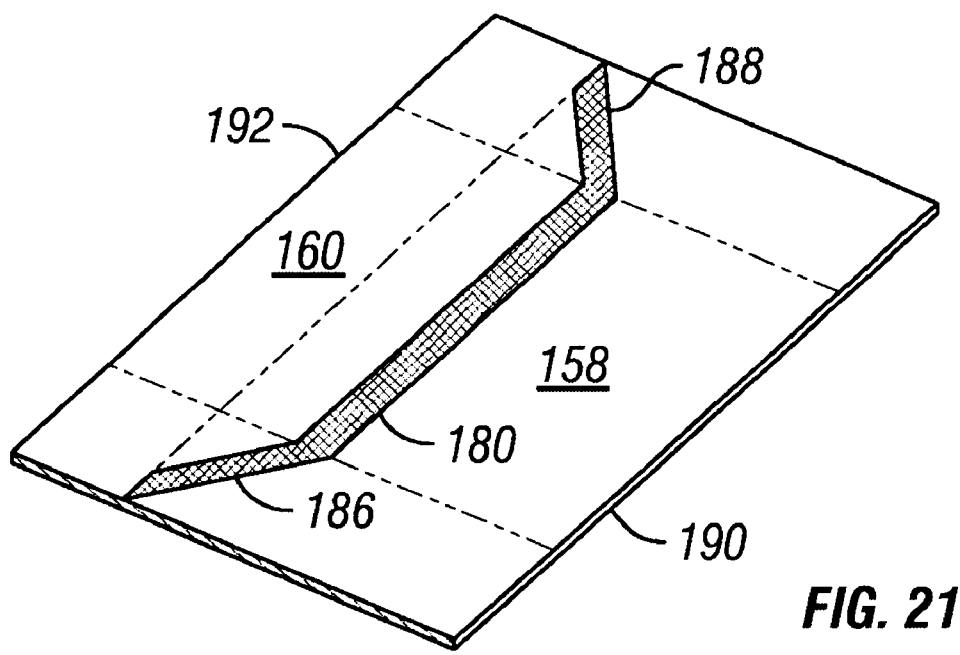
Figure 22:
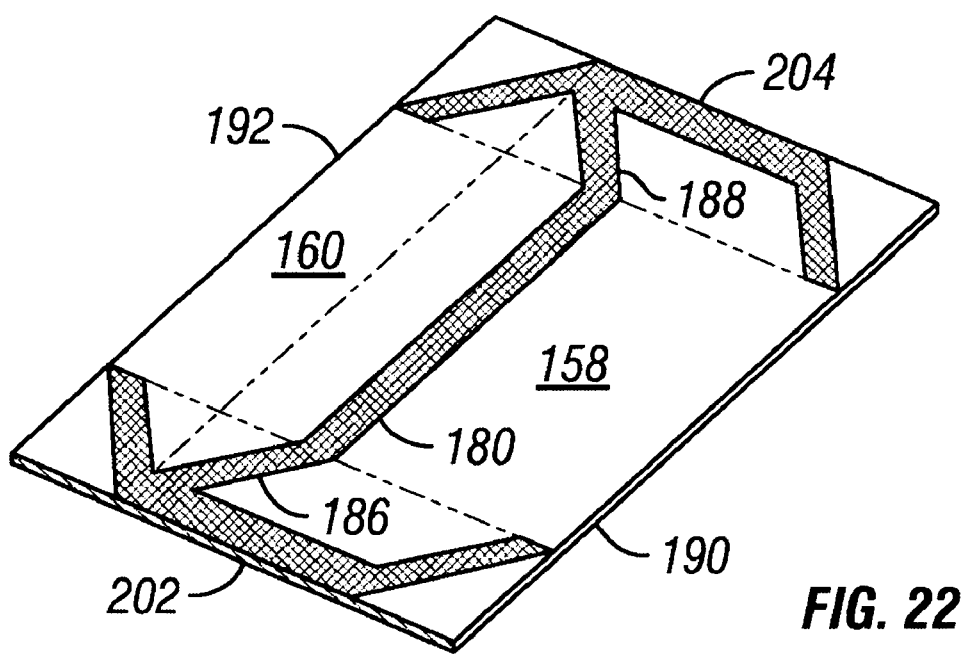

FIG. 20 illustrates the sheets 158, 160 folded approximately ninety degrees at the first 184, second 190, third 192, and fourth fold 194 such that mid-portions of the first 158 and second sheet 160 are separated from each other by a distance A. As illustrated in FIG. 21, the sheets 158, 160 are further folded at the first 184, second 190, third 192, and fourth fold 194 from approximately ninety degrees to one hundred eighty degrees to form a rectangularly shaped assembly, wherein the mid-portion of the first sheet 158 and the bottom portion of the second sheet 160 are illustrated.

Figure 23:
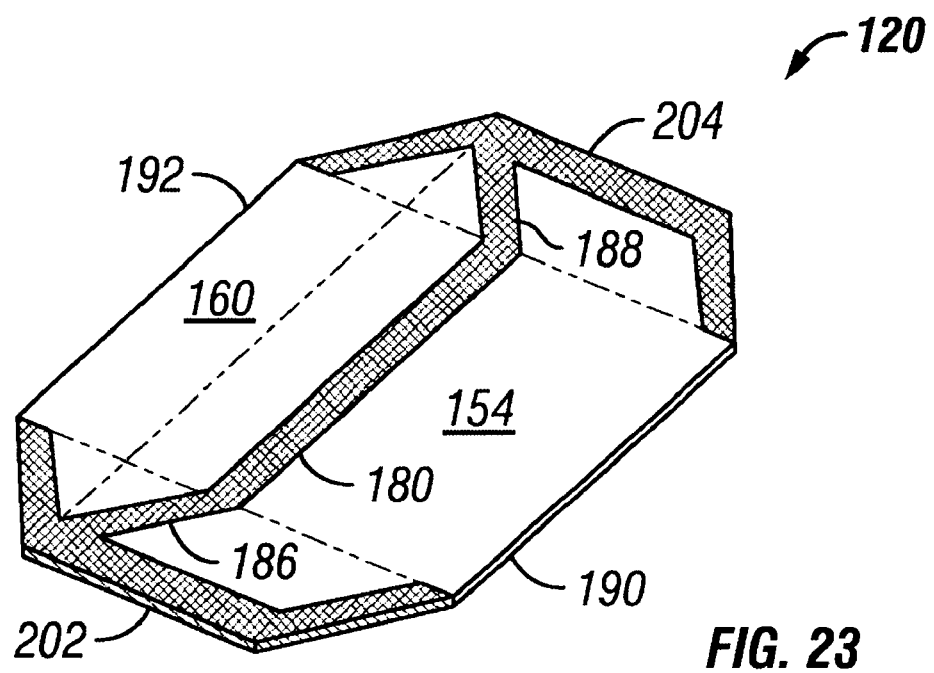
Figure 24:
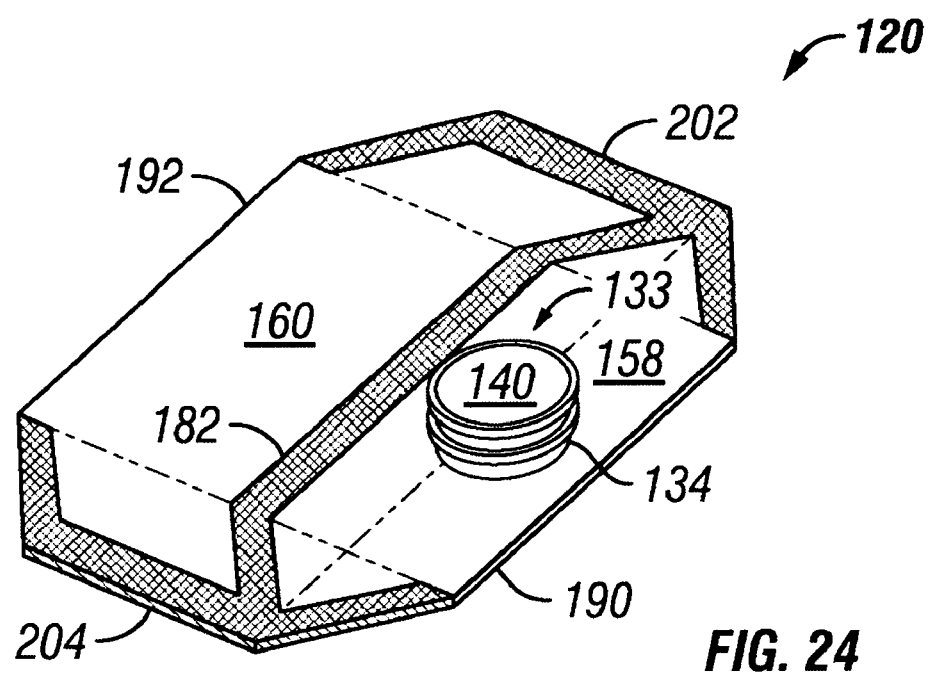
FIG. 24 is a fully form ed standup bag of FIG. 3 in a collapsed state.

Referring back to FIG. 22, the sides of the sheets 158, 160 are secured together by a third U-shaped seal 202 and a fourth U-shaped seal 204. As shown in FIG. 23, four corner portions of the rectangularly shaped assembly are removed by trimming along end segments of the third 202 and fourth U-shaped seal 204. The standup bag 120 is now fully formed and may be shipped to a filling station in the collapsed state as shown in FIG. 24. One of the advantages of fully forming the standup bag 120 prior to filling is that a large number of bags may be packed into a container for shipment to the filling station because the bags are relatively flat. Furthermore, the likelihood of contaminating the flowable substance during filling is minimized by providing a fully formed bag because the flowable substance may be more easily filled in a protected environment. This is important for aseptic applications or where contamination of a flowable substance is unacceptable.

Referring to FIGS. 25–27D, an alternative method of forming the standup bag 120 is illustrated schematically using a continuous web system 206 for high throughput applications. The standup bag 120 can be formed by providing a first roll 208 of material to define the first sheet 158 and a second roll 210 of material to define the second sheet 160, unwinding a portion of the first roll 208, punching a hole in the unwound portion to define the through-hole at a hole-punching station 212, fitting the spout body 134 up through the through-hole and sealing the lower flange 136 to the unwound portion to form the seal ring 178 (see FIG. 12) at a spout-sealing station 214. A portion of the second roll 210 is unwound such that the first sheet 158 is offset from the second sheet 160 as shown in FIG. 26, and portions of the two rolls 208, 210 are sealed together at a sealing station 216 to form first seals 218. Referring back to FIG. 4, the first seals 218 are the longitudinal heat seals 146, 152 of the standup bag 120. At a notching station 220, eight corner portions of the assembly are removed, wherein the removal is equivalent to the removal of the eight corners portions illustrated in FIGS. 18 and 23. As shown in FIGS.

FIGS. 27A–D are cross-sectional views of two sheets of materials that form the standup bag of the present invention. FIG. 27 shows the first sheet 158 overlapping the second sheet 160. As shown in FIG. 27A, a portion of an assembly 221 is folded upwardly to form a first flap 222 and a portion of the assembly 221 is folded downwardly to form a second flap 224 at a first folding station 226. As shown in FIG. 27B, a portion of the assembly 221 is further folded to form flaps 228, 230 at a second folding station 232. As shown in FIG. 27C, the flaps 228, 230 are further folded approximately ninety degrees at a third folding station 234. FIG. 27D shows a complete standup bag folded flat. Referring back to FIG. 25, additional seals 236, 238, 240 are formed to complete the assembly 242. It is noted that the seals may be formed by heat sealing, impulsed sealing, ultrasonic sealing, RF sealing, or by other techniques known to those skilled in the art.

Figure 25:
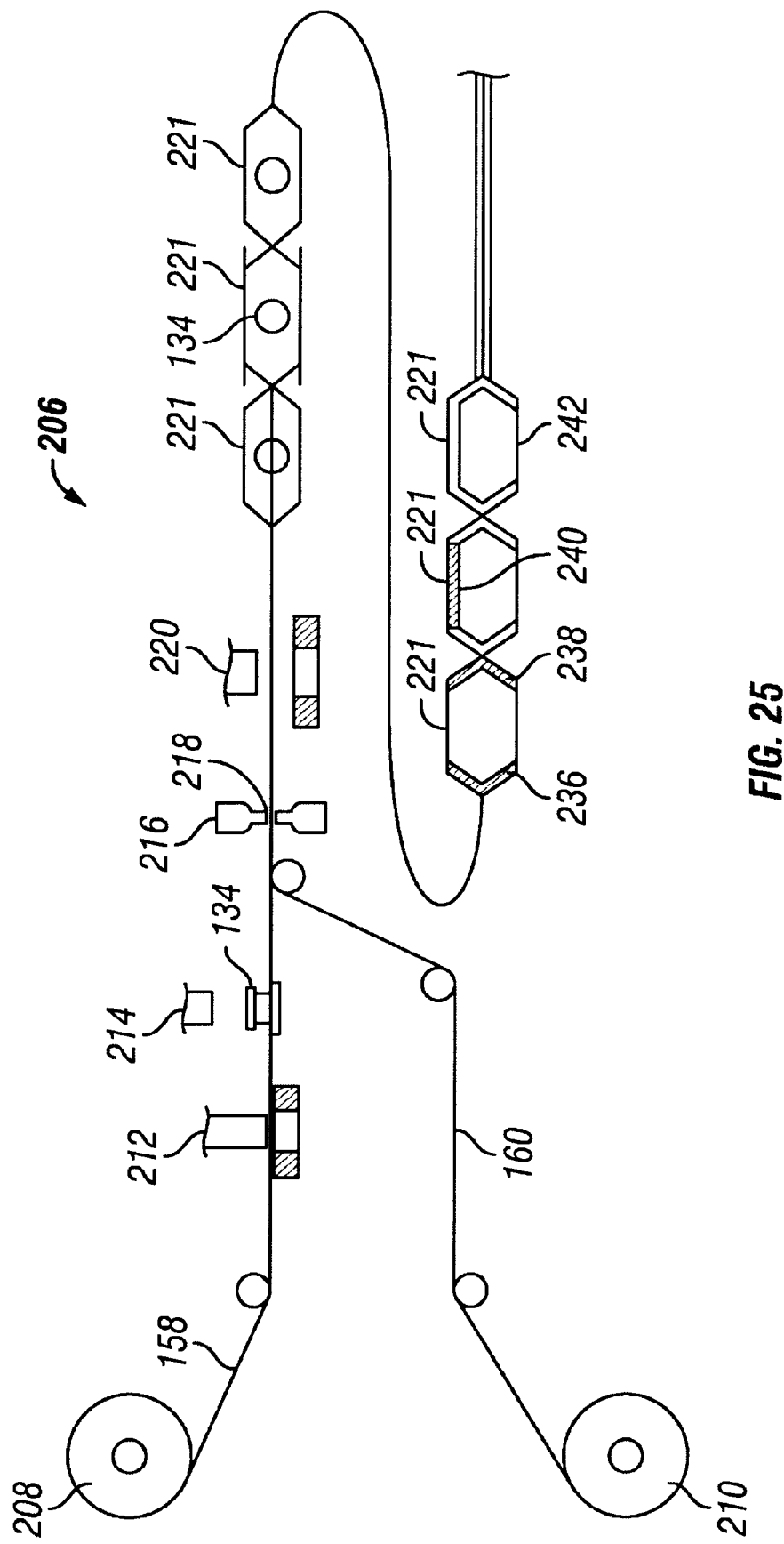
FIG. 25 is a side plan view of a continuous web system for manufacturing the standup bag of FIG. 3.
Figure 28C:
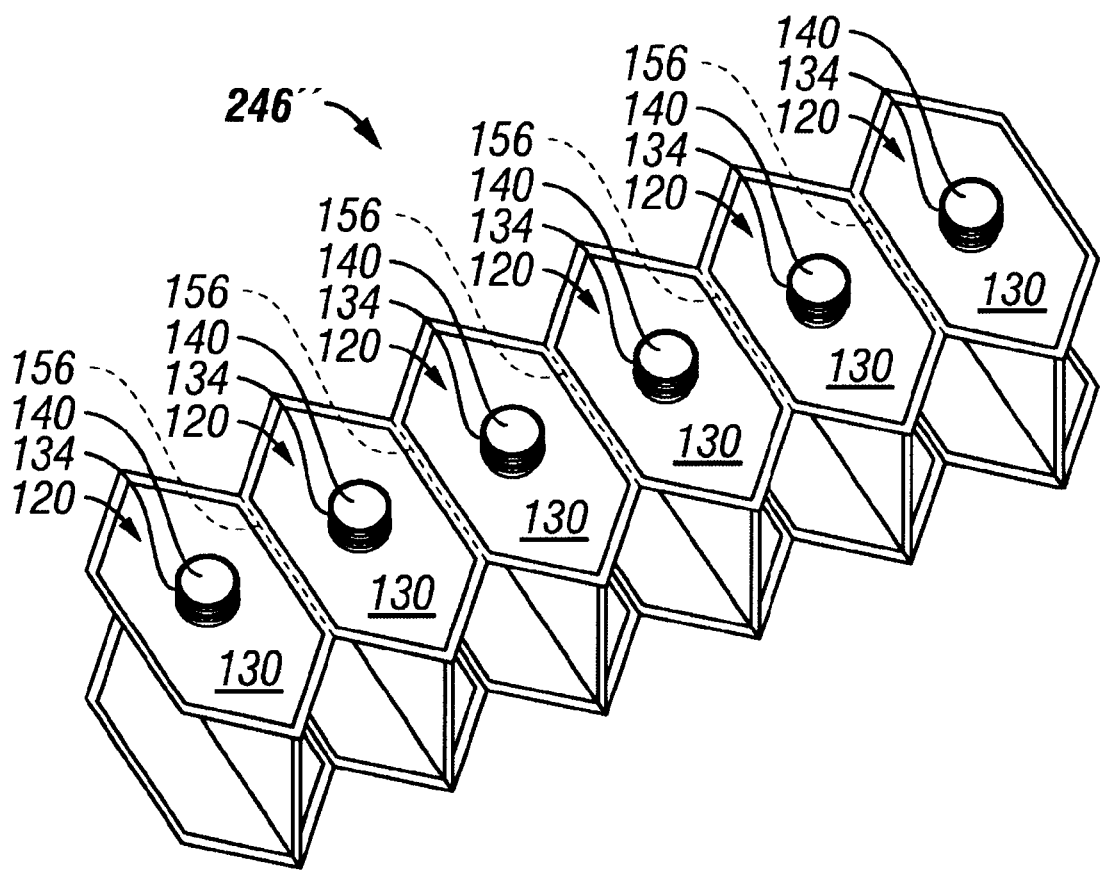
FIG. 28C is a perspective view of an alternate embodiment of fully formed web of standup bags.
Figure 28D:
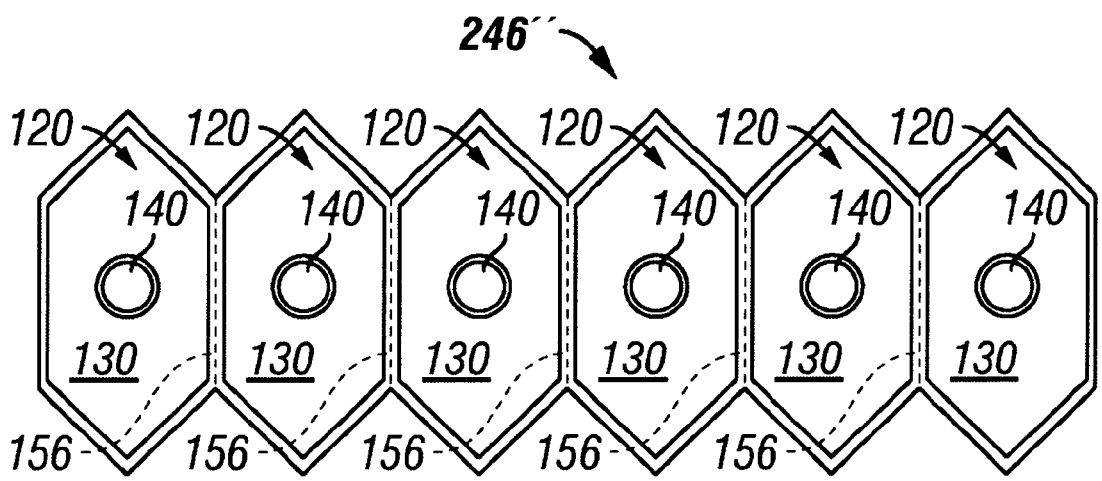
FIG. 28D is a top plan view of the web of FIG. 28C.
Figure 28E:
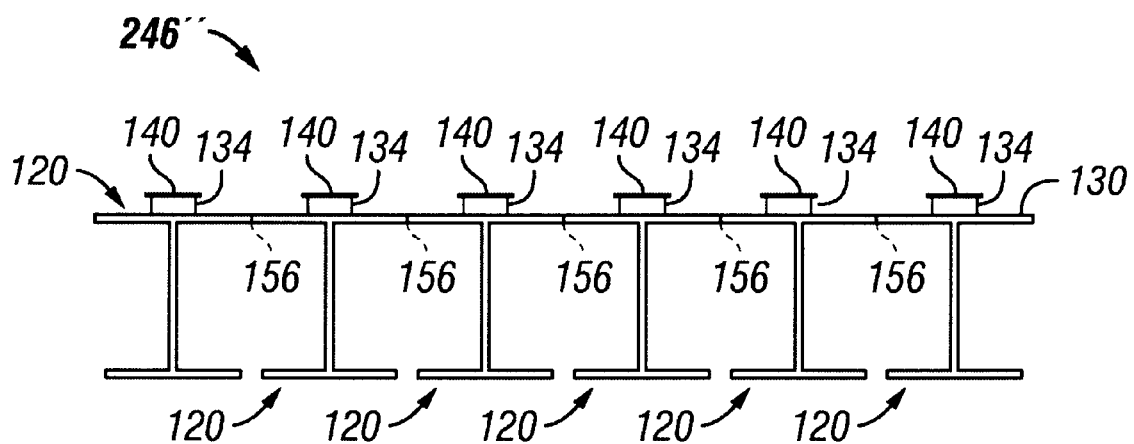
FIG. 28E is a side view of the web of FIG. 28C.
Figure 28F:
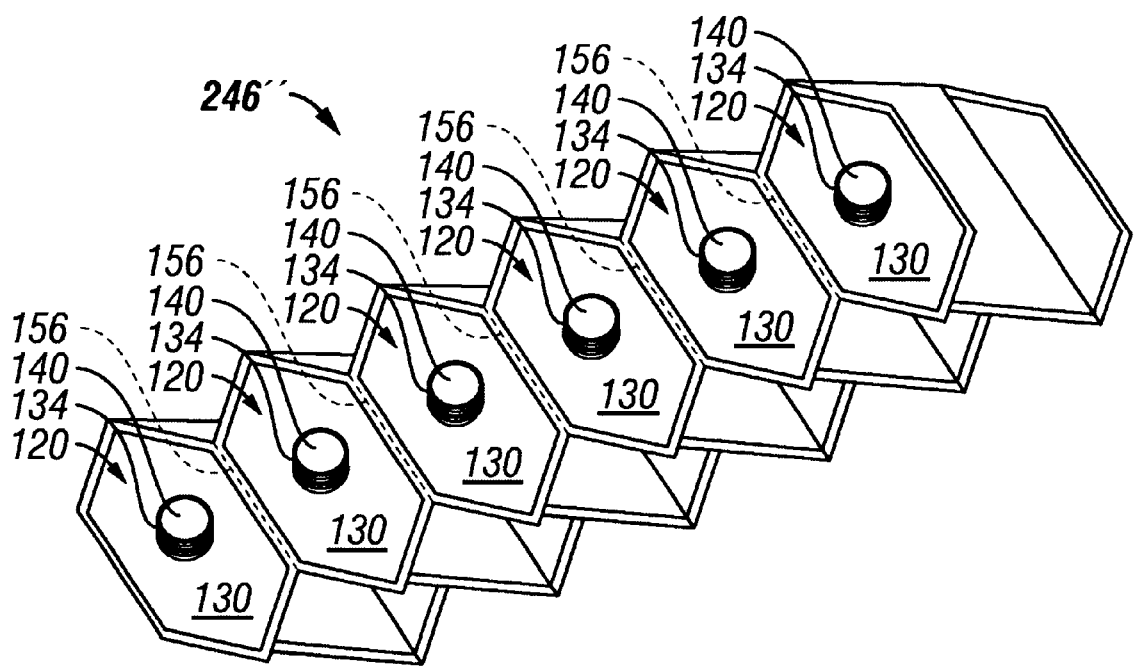
FIG. 28F is a perspective view of an alternate embodiment of fully formed web of standup bags.
Figure 28G:
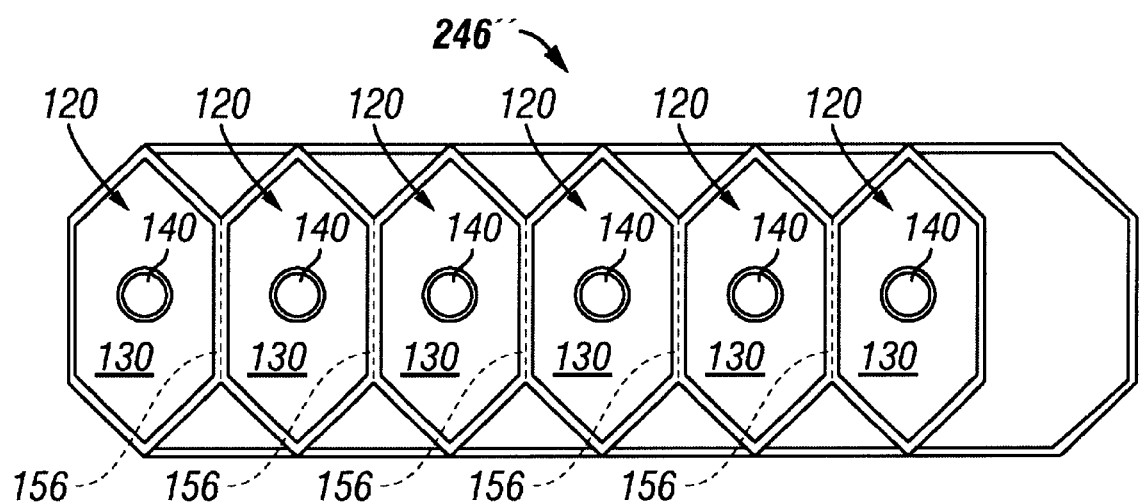
FIG. 28G is a top plan view of the web of FIG. 28F.
Figure 28H:
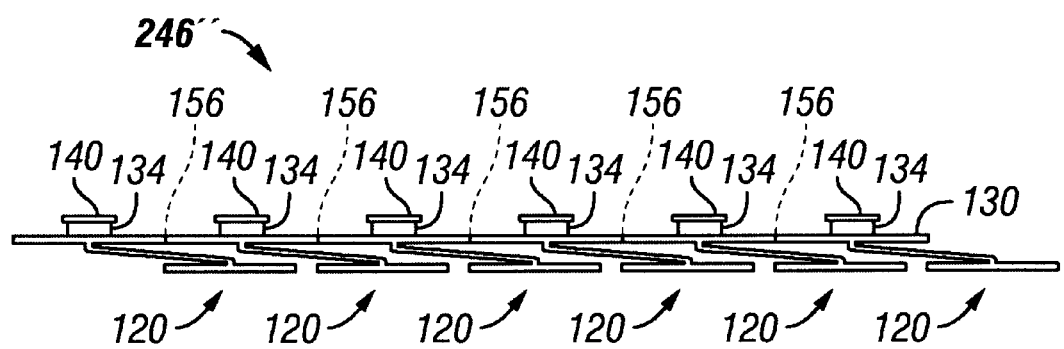
FIG. 28H is a side view of the web of FIG. 28F.

FIGS. 28A–28B illustrate the continuous web 246 of standup bags 120 made in accordance with the methods shown in FIGS. 25–26. The standup bags 120 are joined along the longitudinal heat seals. As shown in FIG. 28B, the bags may be folded into a substantially flat configuration. This configuration is advantageous because the empty bags occupy less space than an empty container. FIG. 28C illustrates another continuous web 246" of standup bags 120. The standup bags 120 are joined along an head heat seal 156. As shown in FIGS. 28C–28E, the heat seals 156 are perforated, but those skilled in the art will appreciate that the heat seal may not need to be perforated. In this configuration, the tops of adjacent bags are substantially planar and the body of the bags hang below the top surface of the bag as shown in FIG. 28E. Nevertheless, the standup bags 120 that joined along the head heat seals 156 may be folded substantially flat like the standup bags joined along the longitudinal heat seals as shown in FIGS. 28F–28H. Those skilled in the art will appreciate that the web of standup of bags may be joined along any of the heat seals that may be provided on the surfaces of the standup bag.

Figure 80:
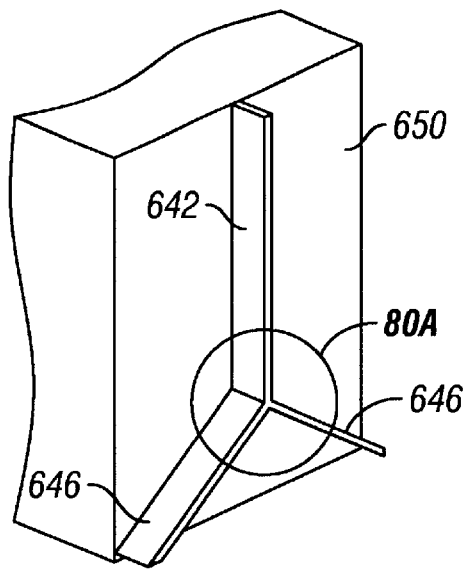
FIG. 80 is a perspective view of the lower triangular profile of flexible bag of the present invention in the form of a standup bag.
Figure 80A:
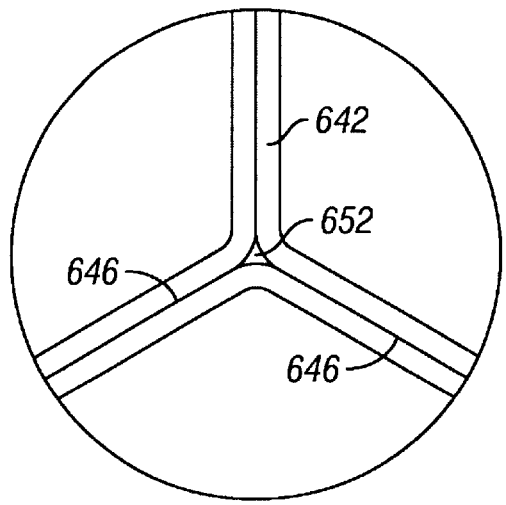
FIG. 80A is an enlarged side view of the lower triangular profile of the flexible bag of FIG. 80.
Figure 80B:
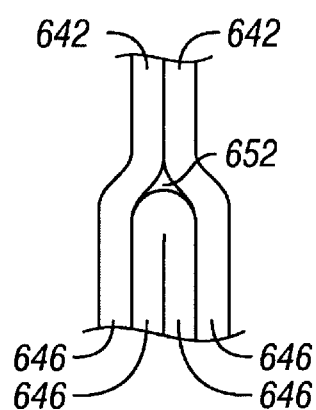
FIG. 80B is an enlarged side view of the lower triangular profile of the flexible bag in a collapsed state.

FIG. 80 shows the lower V-shaped seal of the standup bag. More particularly, FIG. 80 shows the point of intersection between the longitudinal heat seal 642 and the two lower heat seals 646, 646' that form the lower V-shaped seal. FIG. 80A is an enlarged view of the lower portion of the contour structure having a void 652 between the various heat seals that form a vertex. In particular, FIG. 80A shows the void 652 of an expanded standup bag that may result during the welding of the heat seals 642, 646, 646'. FIG. 80B is a enlarged side view of the void 652 of a collapsed standup bag. When a bag is filled with fluid, the bag may leaks may develop at the intersection of the longitudinal heat seal 642 the lower heat seals 646, 646' if the void is not properly sealed. Traditionally, conventional bags provide comparatively thick inner material layer to facilitate the flow of material into the void. Typically, the void is sealed when the inner material layers are heated. Once heated, the abundance of inner material becomes viscous and the material flows into the cavity thereby closing the void. However, using a thick inner layer adds to the cost of manufacturing the bags since a thicker gauge material needs to be used.

In contrast, the present invention may seal the void by providing a strip or a patch along the edge of the material that will form the longitudinal seal. The patch and/or strip provides additional material that may flow into the cavity and seal the void. Using a strip or a patch at the point of intersection between the longitudinal heat seal and the lower heat seals reduces manufacturing costs for at least the following reasons. First, thinner gauge material is more cost effective as compared to traditional thicker gauge material. Second, a thinner gauge material is easier to manipulate during the manufacturing process.

Figure 81A:
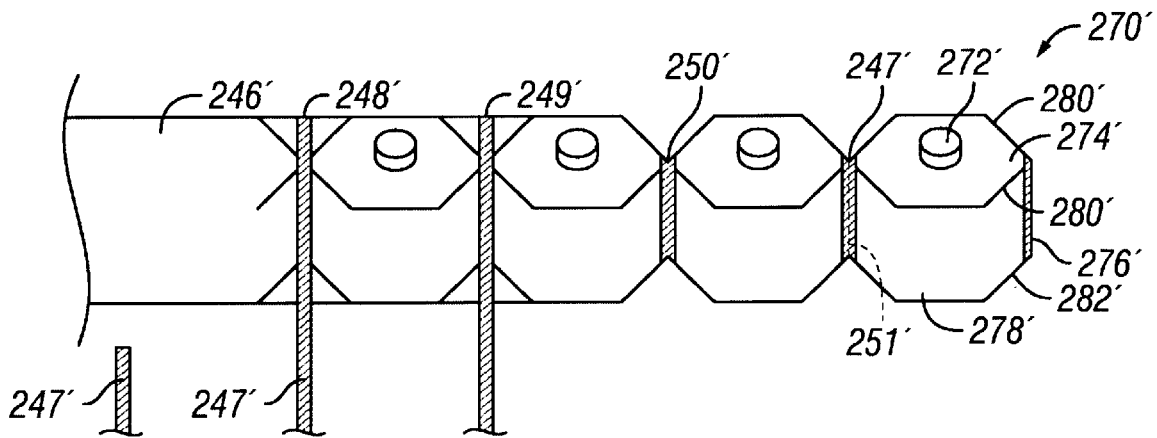
FIG. 81A shows the steps for forming the standup bag from a continuous web.

FIG. 81A illustrates another embodiment of a web 246' of material that will form the standup bags. In particular, FIG. 81A schematically shows the process of (1) inserting 248' a strip 247' of material to seal the voids 652 that occur at the points of intersection between the longitudinal heat seal 276' and oblique heat seals 280', 282'; (2) welding 249' the strip 247' to the web 246'; (3) trimming 250' the excess strip material and bag material; and (4) perforating 251' the heat seal. The strip material 247' is placed over the area of the web 246' that corresponds to the intersection of the longitudinal heat seal 276' with the upper 280' and lower 282' oblique heat seals that form the first and second V-shaped seals. FIG. 81A also illustrates that the strips 247' may be trimmed to the size of the bag as the web 246' is advanced. The strip may be made from a plurality of polymer materials such as, but not limited to, polypropylene and polyethylene. Additionally, those skilled in the art will appreciate that the strips 247' may have different gauge thickness based upon the intended use of the standup bag. Furthermore, the gauge of the strips 247' may also be based upon the gap that needs to be filled and gauge of the material that forms the walls of the standup bag.

FIG. 81B illustrates a standup bag 270' in a collapsed configuration where reinforcement patches 284' are provided at all four points of intersection between the oblique heat seals 280', 282' and the longitudinal heat seals 276'. The standup bag comprises a top wall 274', a front wall 278', back and bottom walls (not shown), and side walls. The standup bag includes a fitment 272' that is provided on the top wall. The standup bag also includes folds 286', 288' that are located near the top and the bottom of the bag. FIG. 81C is an enlarged side view of the intersection point of between the longitudinal heat seal 276' and the oblique heat seals 282' that form one of the vertices of the V-shaped seal with the reinforcing patch 284' sealing the void.

FIGS. 82A and 82B illustrate another embodiment of the web 900 of standup bags. FIG. 82A shows two adjacent bags 902, 904 that have been formed form a continuous sheet of material. The two adjacent bags 902, 904 are connected together by a central web 906. The central web may be perforated 910 as shown in FIG. 82A. The perforation facilitates the separation of the web of bags into individual bags. However, it is contemplated that the central web may not be perforated for certain web configurations. In those applications where a perforation is not provided, the central web is cut prior to or after filling the bag with a flowable substance.

Furthermore, FIGS. 82A and 82B show at least one stay member 908 disposed between the two adjacent bags 902, 904. The stay member 908 may be the same width as the weld 901 as shown in FIG. 82A or the stay member 908 may be wider than the weld 901 as shown in FIG. 82B. The width of the stay member may be varied by changing the size of the cut-out portion 912. Moreover, the width of the stay member may be varied depending on the size of the bag or material strength. The central web and stay members are cut prior to or after the introduction of flowable substances into the individual bags.

Figure 29:
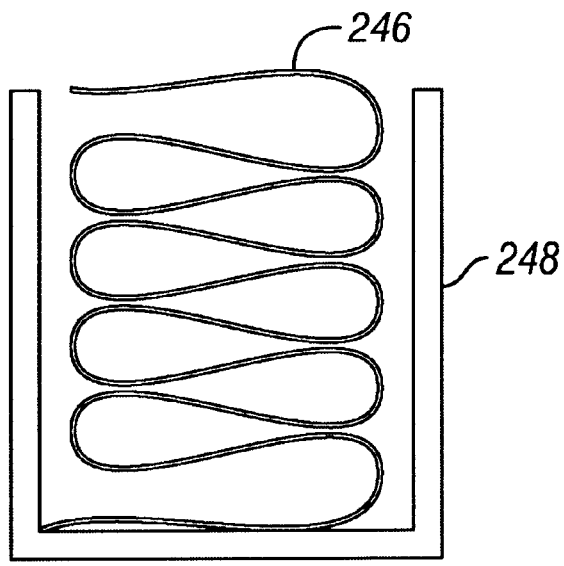
FIG. 29 is a side plan view of the web of FIG. 28A packaged in a box for shipping.

FIGS. 28A and 28B illustrate a fully formed web 246 with the standup bags 120 in a collapsed state. The web 246 may be stored in a box 248 as shown in FIG. 29 for transport to the filling station (not shown). The standup bag 120 may be filled in accordance with at least one the following two procedures. The web 246 may be fed into a high speed filling station wherein the closure 140 is automatically removed from the spout body 134. The enclosed region is automatically filled through the opening in the spout body 134 with the flowable substance, thereby causing the standup bag 120 to expand. The closure 140 is then automatically reattached to the spout body 134, and the filled standup bag 120 is detached from the web 246 by a cutter. The detached standup bag 120 may be placed in a box and transported to the market where it can be placed on shelves and displayed as a self standing product. Alternatively, the web may be fed into a high speed filling station wherein the individual bags are separated from the web. The closure is automatically removed from the spout and the individual bags are filled. The closure 140 is then automatically reattached to the spout body 134, and the filled standup bag 120 may be placed in a box and transported to the market where it can be placed on shelves and displayed as a self-standing product.

The customer may access the fitment 133, remove the closure 140, and dispense the flowable substance. If the entire contents of the standup bag 120 is not completely dispensed, the closure 140 be reattached to the spout body 134 and the remaining flowable substance can be dispensed at a later date, wherein the standup bag 120 is capable of self standing even when partially filled. In one application, an use-demand valve, often referred to as a dispensing valve or tap, may be attached to the spout body to control the flow rate of the substance. It is noted that some applications may not require a valve member and a closure such as, but not limited to, a cap or plug may be reattached to the spout body after the enclosure is filled with the flowable substance.

In an alternate applications requiring larger standup bags (larger than several gallons), the customer may access the fitment, remove the cap, and attach a suction hose (not shown) to the fitment. The suction hose may be operatively connected to a pump (also not shown) and the flowable substance is withdrawn through the fitment or spout as desired by the customer. The valve member may be a check valve to allow the flowable substance to be sucked out of the bag while preventing air from entering the bag.

Figure 30:
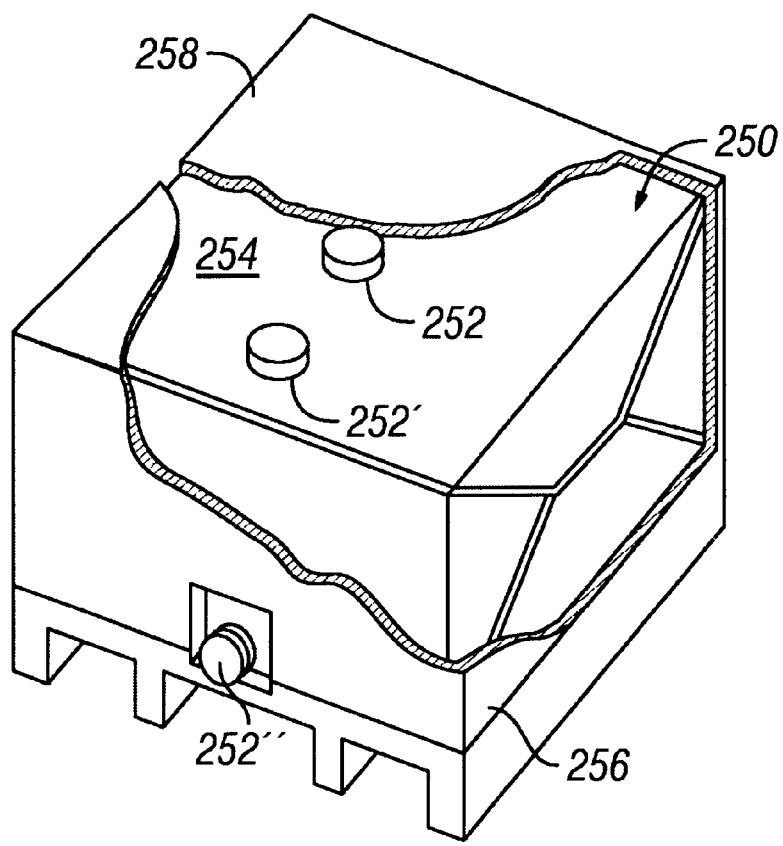
FIG. 30 is a perspective view of an alternative embodiment of a flexible bag of the present invention.

Referring to FIG. 30 another embodiment of standup bag 250 is shown for applications requiring relatively large enclosed regions. The standup bag 250 is placed within a bin 256 having a plurality of walls. The bin may be placed on a pallet 260 and provided with a lid 258. The flexible bag 250 may be configured and formed in accordance with the previous embodiment shown in FIG. 3; however, the bag may have a volume ranging from about ten gallons to about five hundred gallons. The standup bag 250 may be used as a liner for bulk containers such as, but not limited to, bins, boxes, crates, or drums. The walls of the bin, box, crate, or drum may be rigid or flexible, but the walls serve to provide additional support the walls of the standup bag 250.

To facilitate filling and dispensing of the flowable substance, a plurality of fitments 252, 252', 252" may be positioned in a plurality of locations. The fitments 252, 252' may be used to fill the standup bag, and the fitment 252" may be used dispense the contents of the standup bag. Those skilled in the art will appreciate that fitment 252" may also be used to fill the standup bag. Accordingly, in this instance, the fitments 252, 252' located on the front wall 254 are not needed.

The standup bag 250 offers several advantages over bags such as pillow style bags. For example, flex cracking of the sheet material is reduced when the standup bag 250 is placed in a bin, box, crate, or drum because the corners and walls of the standup bag 250 conform more readily with the walls of the container as shown in FIG. 30. The rigidity of the bag 250 is particularly important to avoid flex cracking at the corners during transport. Furthermore, because the standup bag 250 conforms more readily to the space within the bin, box, crate, or drum, the standup bag is more space efficient and is capable of carrying a greater volume of flowable substance for a given space as compared to the pillow style bag.

Referring to FIGS. 31–37, another embodiment of a standup bag 300 is shown which is formed from a single sheet of material. The standup bag 300 is similar to the standup bag 120 shown in FIG. 3 with the exception that one of the seals is replaced with a fold. For example, a fold along an edge of a bottom wall may replace a seal, or a fold along an edge of a top wall may replace a seal. The standup bag 300 has a front wall 302, a rear wall 304, a first side wall 306, a second side wall 308, a top wall 310, and a bottom wall 312 to define therebetween an enclosed brick-shaped region for containing the flowable substance. The walls are formed from flexible sheets.

Figure 31:
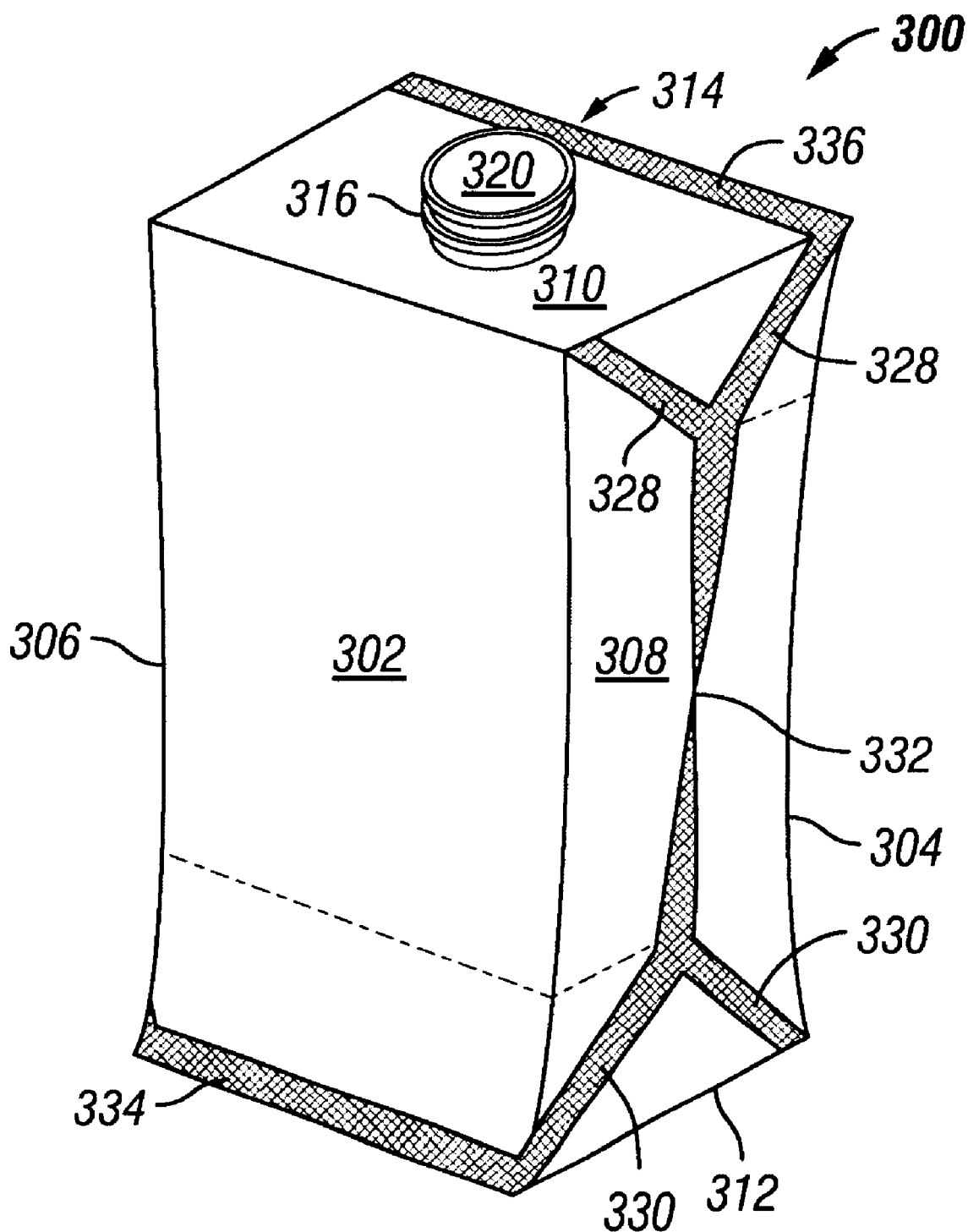
FIG. 31 is perspective view of another alternative embodiment of a flexible bag of the present invention in the form of a standup bag having a fitment.
Figure 32:
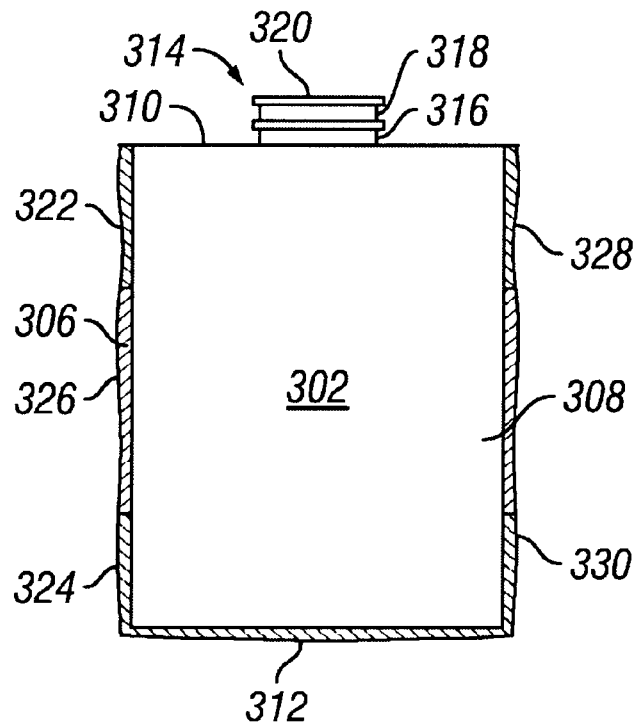
FIG. 32 is a front plan view of the standup bag of FIG. 31
Figure 33:
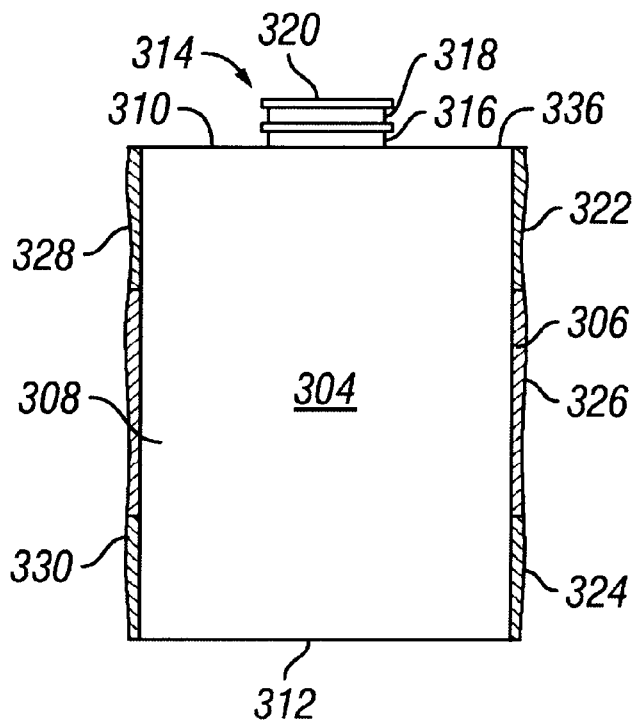
FIG. 33 is a rear plan view of the standup bag of FIG. 31.
Figure 34:
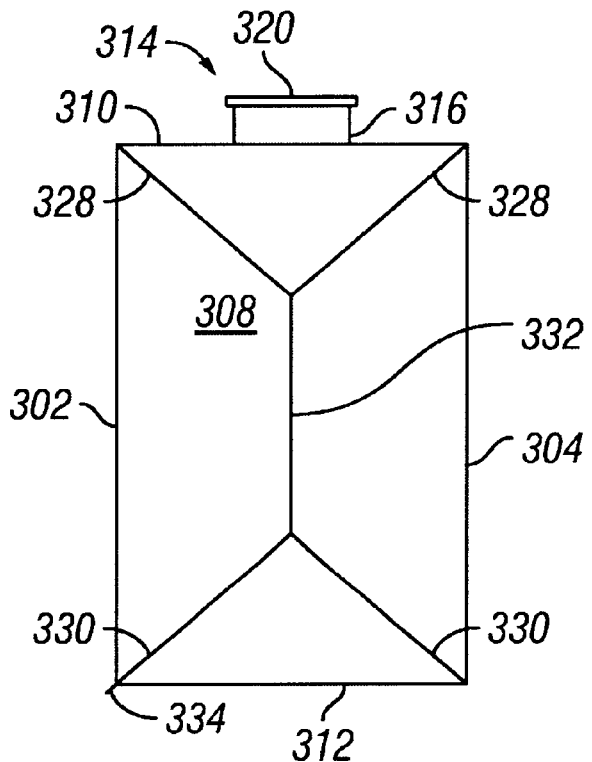
FIG. 34 is a plan view of one side of the standup bag of FIG. 31.
Figure 35:
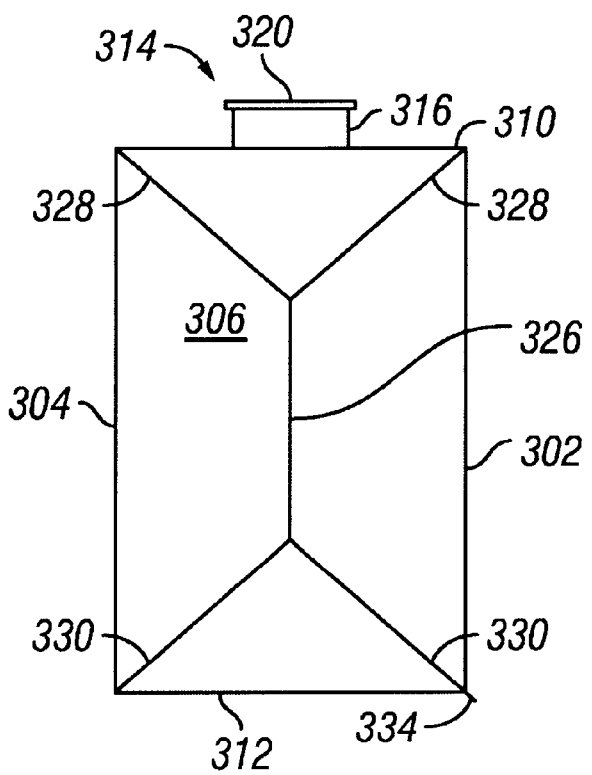
FIG. 35 is a plan view of the other side of the standup bag of FIG. 31.
Figure 36:
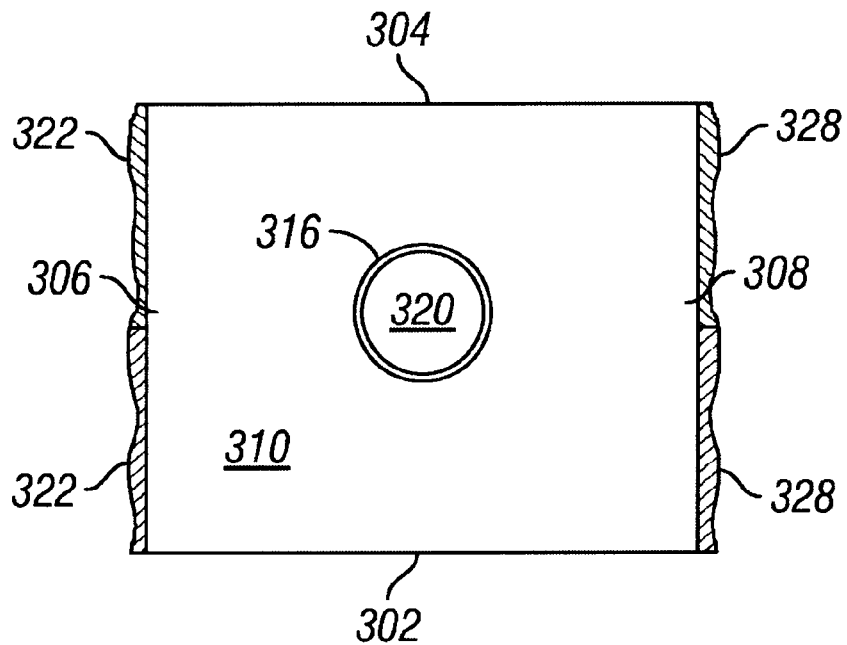
FIG. 36 is a top plan view of the standup bag of FIG. 31.
Figure 37:
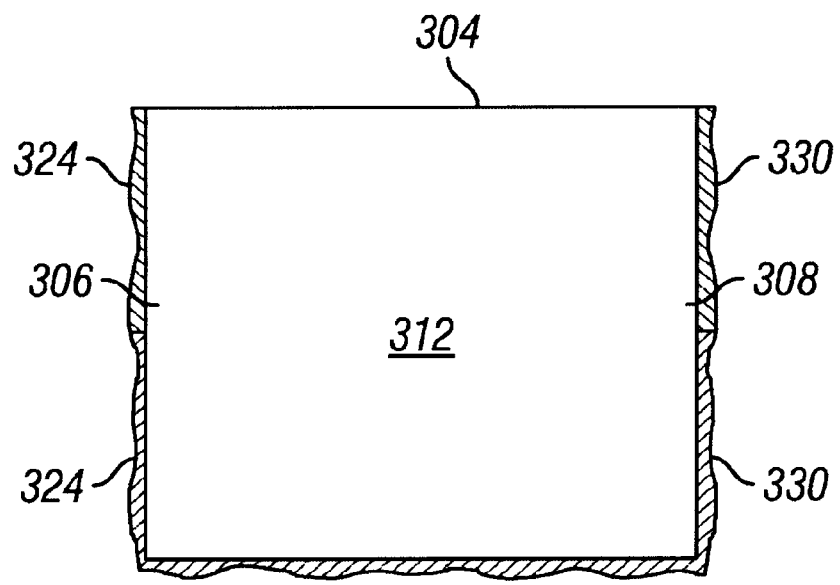
FIG. 37 is a bottom plan view of the standup bag of FIG. 31.

The top wall 310 has a through-hole, and a fitment 314 having a spout body 316 and a cap 320. The first side wall 306 includes upper heat seals 322 which extend from upper corners of the first side wall 306 and join to form a V-shaped seal when viewed from the side as shown in FIG. 35. The first side wall 306 further includes lower heat seals 324 which extend from lower corners of the first side wall 306 and join to form an inverted V-shaped seal. The V-shaped seals are joined together by a longitudinal heat seal 326 to form a contour structure. Similarly, the second side wall 308 includes upper heat seals 328 and lower heat seals 330 which form V-shaped seals as shown in FIG. 34, and each of the V-shaped seals are joined together by a longitudinal heat seal 332. Referring back to FIGS. 31 and 32, a heat seal 334 extends long the bottom edge of the front wall 302 from one of the lower heat seals 324 of the first side wall 306 to one of the lower heat seals 330 of the second side wall 308. Instead of a heat seal, a fold 336 extends along the top edge of the rear wall 304 from one of the upper heat seals 322 of the first side wall 306 to one of the upper heat seals 328 of the second side wall 308 as shown in FIGS. 31 and 33.

An alternate embodiment of the standup bag may be formed from twelve sheets of material. The sheets of material correspond to the front wall, rear wall, top wall, bottom wall, a first side wall, and a second side wall. The first and second side walls are made up of four components: a first triangular profile, a first side wall panel, a second side wall panel, and a second triangular profile. The side walls are formed by heat sealing the first and second side wall panels to the first triangular profile. On the opposite end, the second triangular profile is heat sealed to the first and second side wall panels. A longitudinal heat seal is also made to attach the first and second side wall panels together. The side walls are then heat sealed to the top, bottom, front, and back walls to form the standup bag. That is, the edges of the top, bottom, front, back, and side walls are heat sealed together to form a standup bag. Those skilled in the art will appreciate that fewer sheets of material may be used to form the standup bag by substituting folds in the material for heat seals. That is, instead of a heat seal between the front wall and the bottom wall, a single sheet of material may be folded to form the front and bottom wall. As those skilled in the art will appreciate, a through hole and spout may be provided on any sheet of material.

Figure 38:
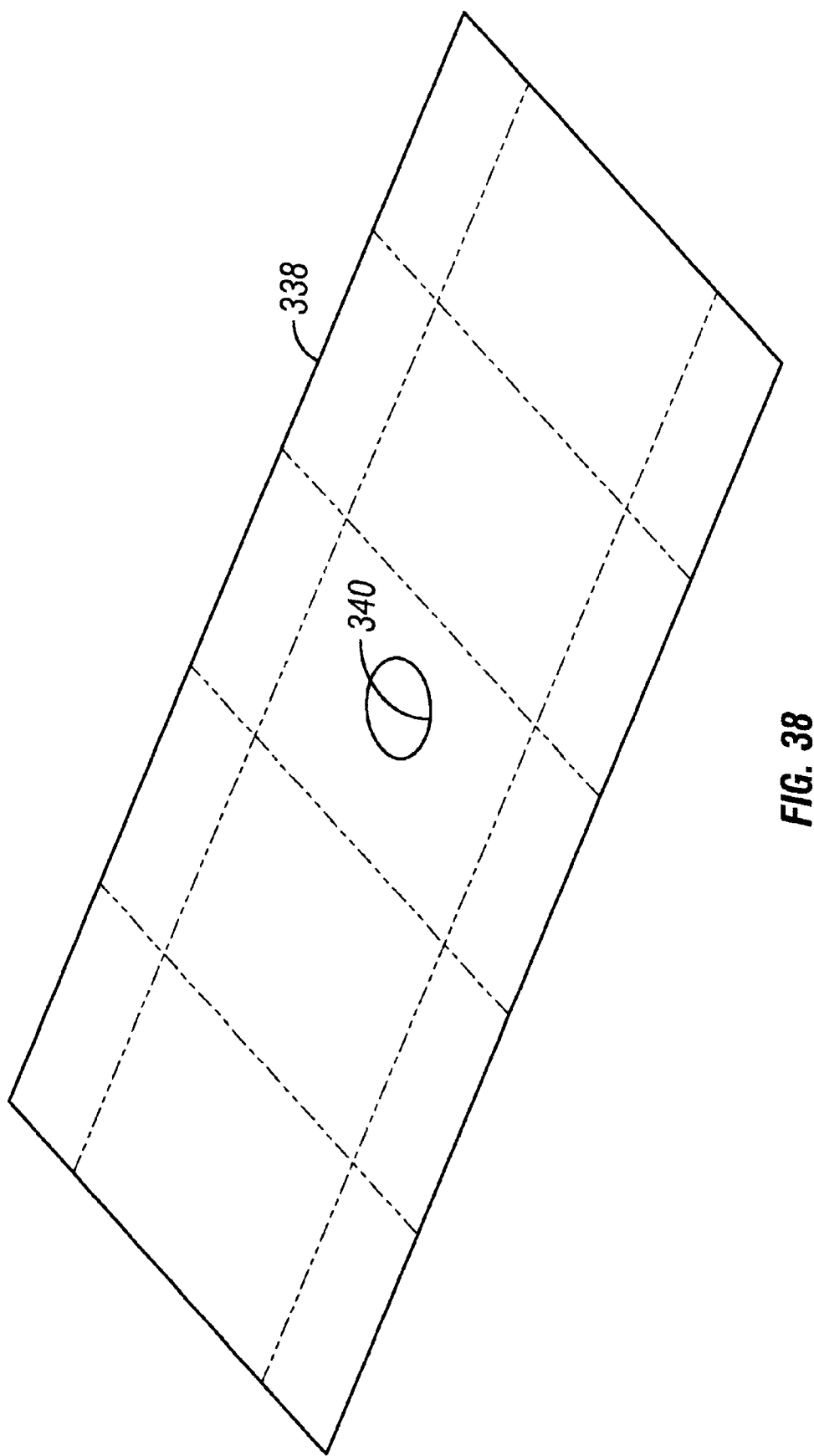
FIGS. 38–47 show the steps for forming the standup bag of FIG. 31.
Figure 39:
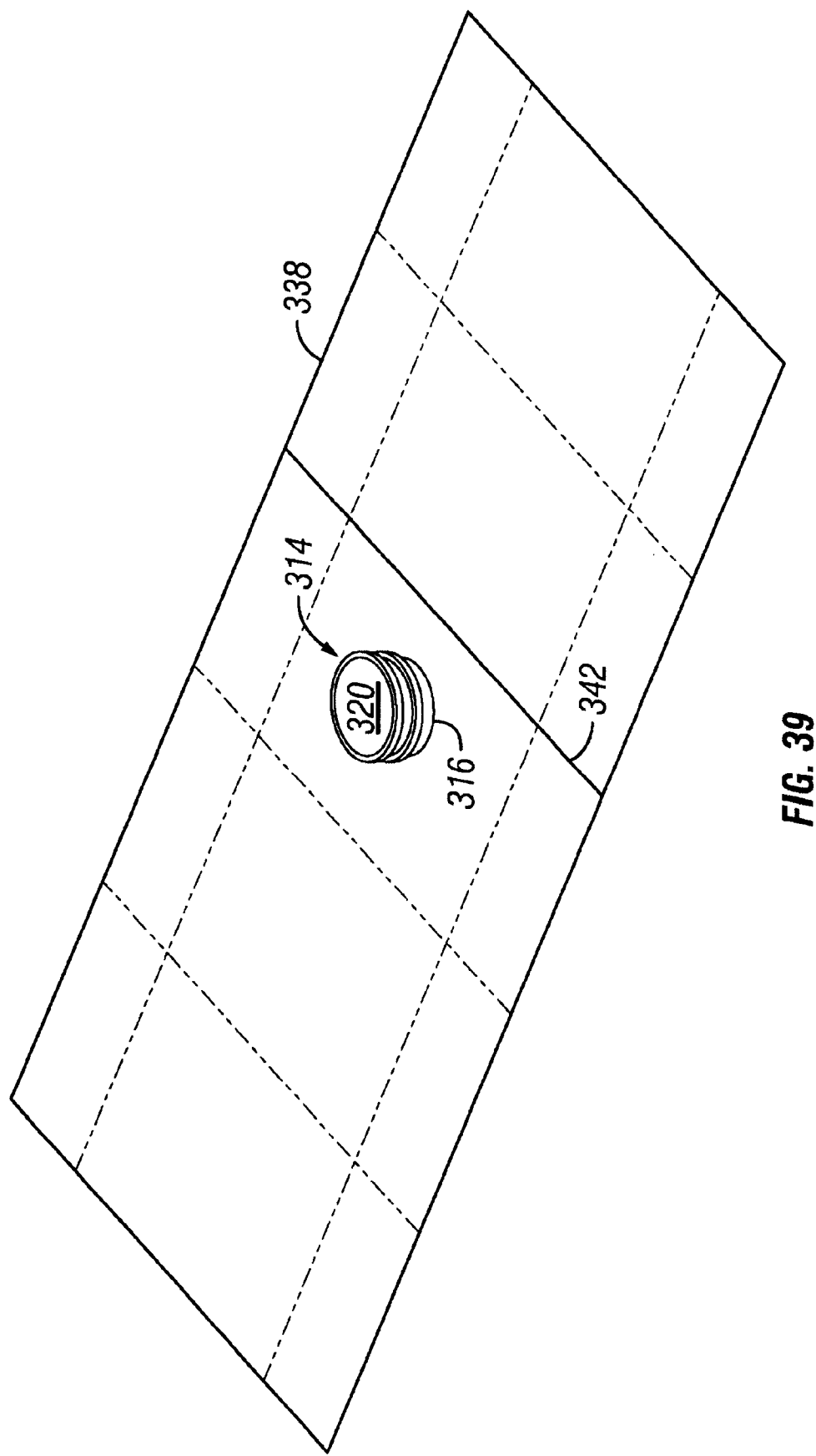
Figure 40:
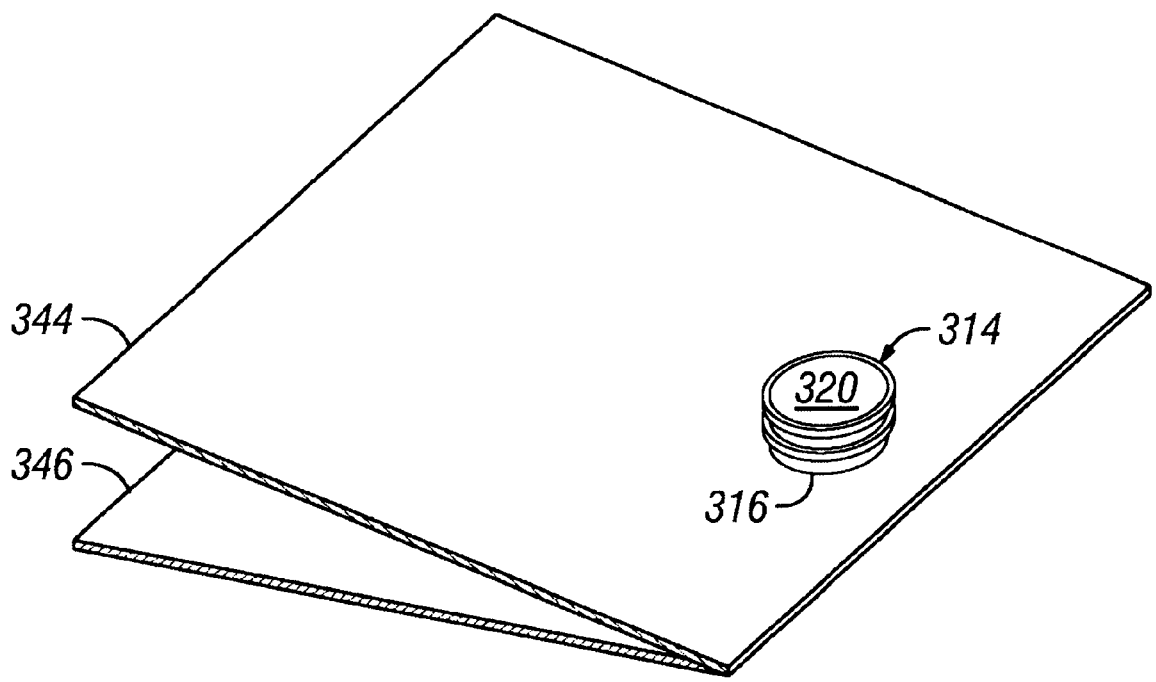
Figure 41:
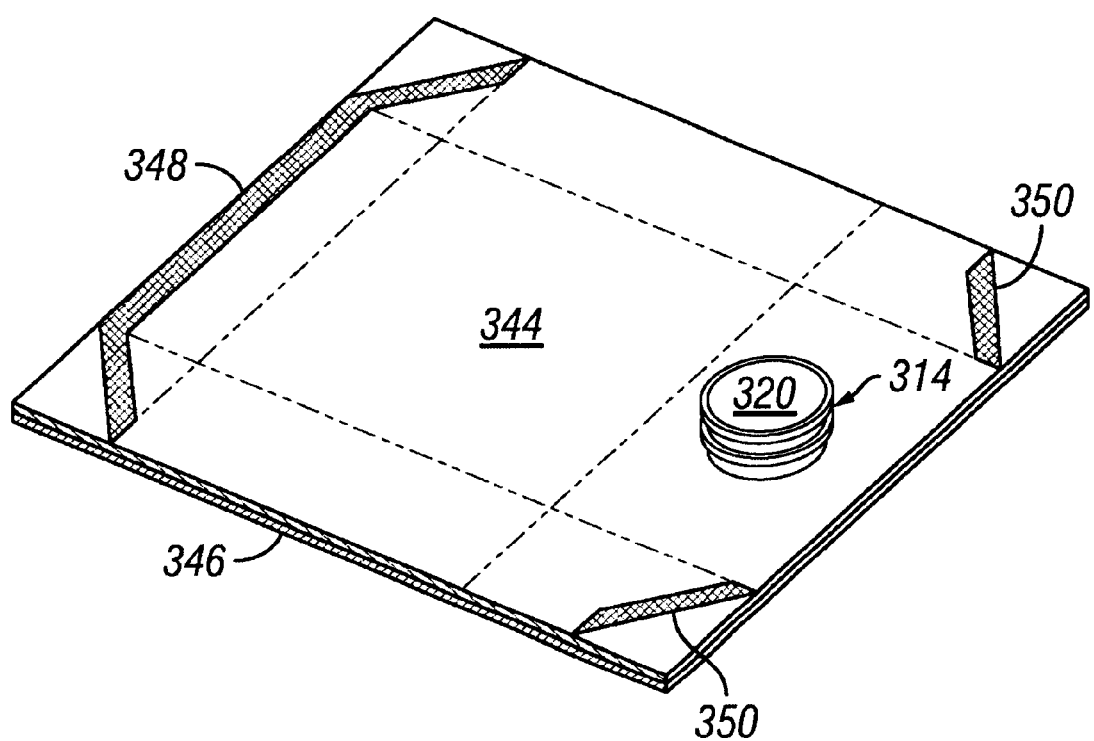

Referring to FIGS. 38–48, the standup bag 300 can be formed by providing a rectangular sheet 338 having a single layer, two layers, three layers, four layers, or more layers of material. A hole 340 is punched in the rectangular sheet 338 to define the through-hole as shown in FIG. 38. Referring to FIG. 39, the spout body 316 is fitted up through the through-hole, the lower flange is sealed to the rectangular sheet 338 to form the seal ring, and a first fold 342 is formed. Referring to FIG. 40, the rectangular sheet 338 is folded along the first fold 342 to form a first sheet 344 and a second sheet 346. Referring to FIG. 41, the two sheets 344, 346 are secured together at a bottom portion by forming a first U-shaped seal 348 extending from one side of the sheets 344, 346 to an opposite side of the sheets 344, 346 and are further secured together at a top portion by forming end seals 350.

Figure 42:
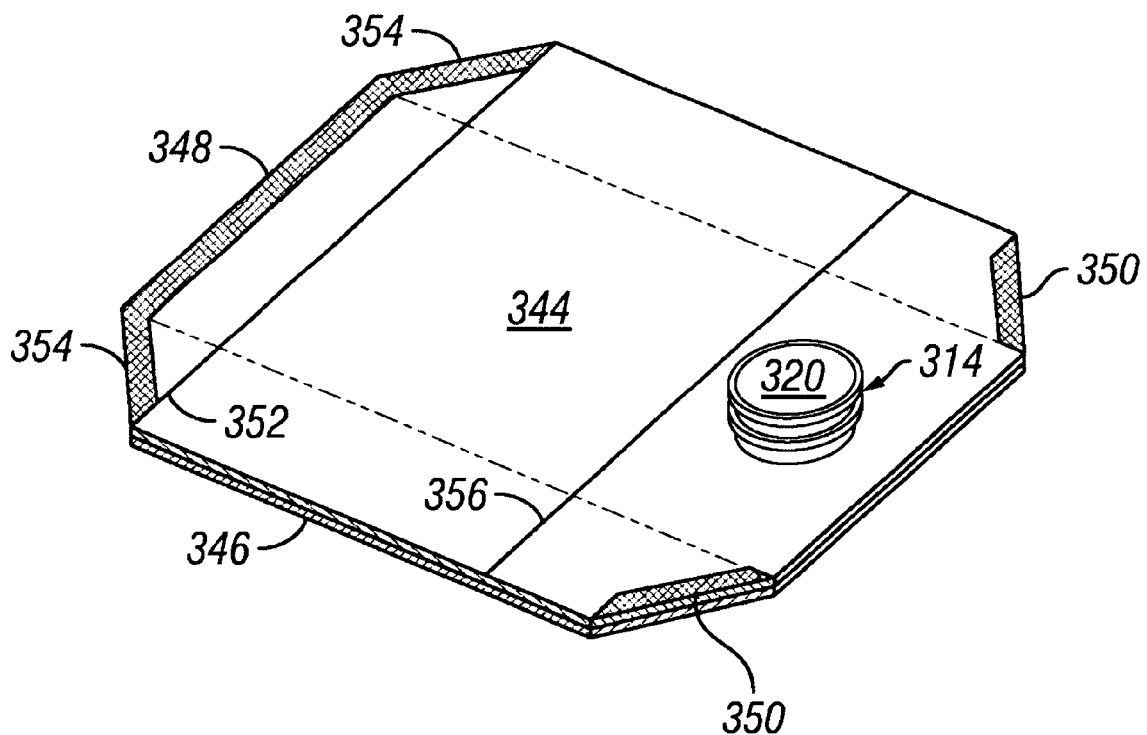
Figure 43:
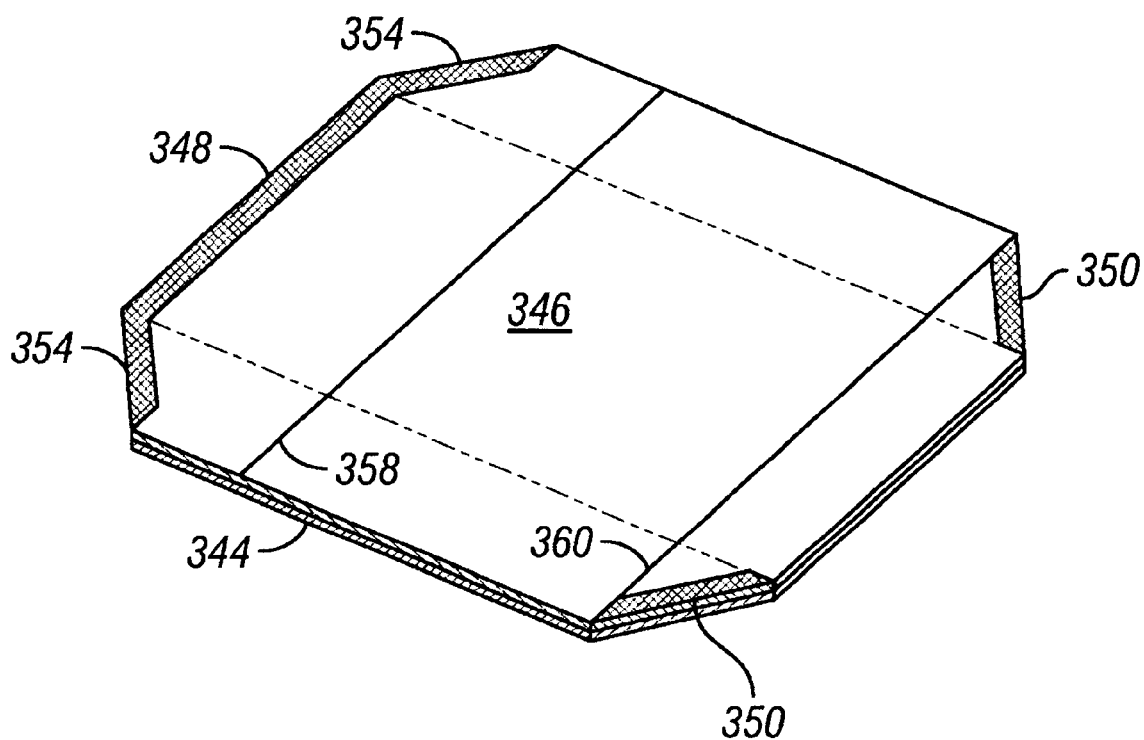

Referring to FIG. 42, four corner portions of the sheets are removed by trimming the sheets along end segments of the first U-shaped seal 348 and the end seals 350. A second fold 352 is formed near the bottom portion of the first sheet 344. The second fold 352 extends from one side of the first sheet 344 to the opposite side of the first sheet 344 and abuts end segments 354 of the first U-shaped seal 348. A third fold 356 is formed near the top portion of the first sheet 344 and extends from one side of the first sheet 344 to the opposite side of the first sheet 344. Referring to FIG. 43, a fourth fold 358 is formed near the bottom portion of the second sheet 346 and extends from one side of the second sheet 346 to the opposite side of the second sheet 346. A fifth fold 360 is formed near the top portion of the second sheet 346 and extends from one side of the second sheet 346 to the opposite side of the second sheet 346 and abuts the ends of the end seals 350.

Figure 44:
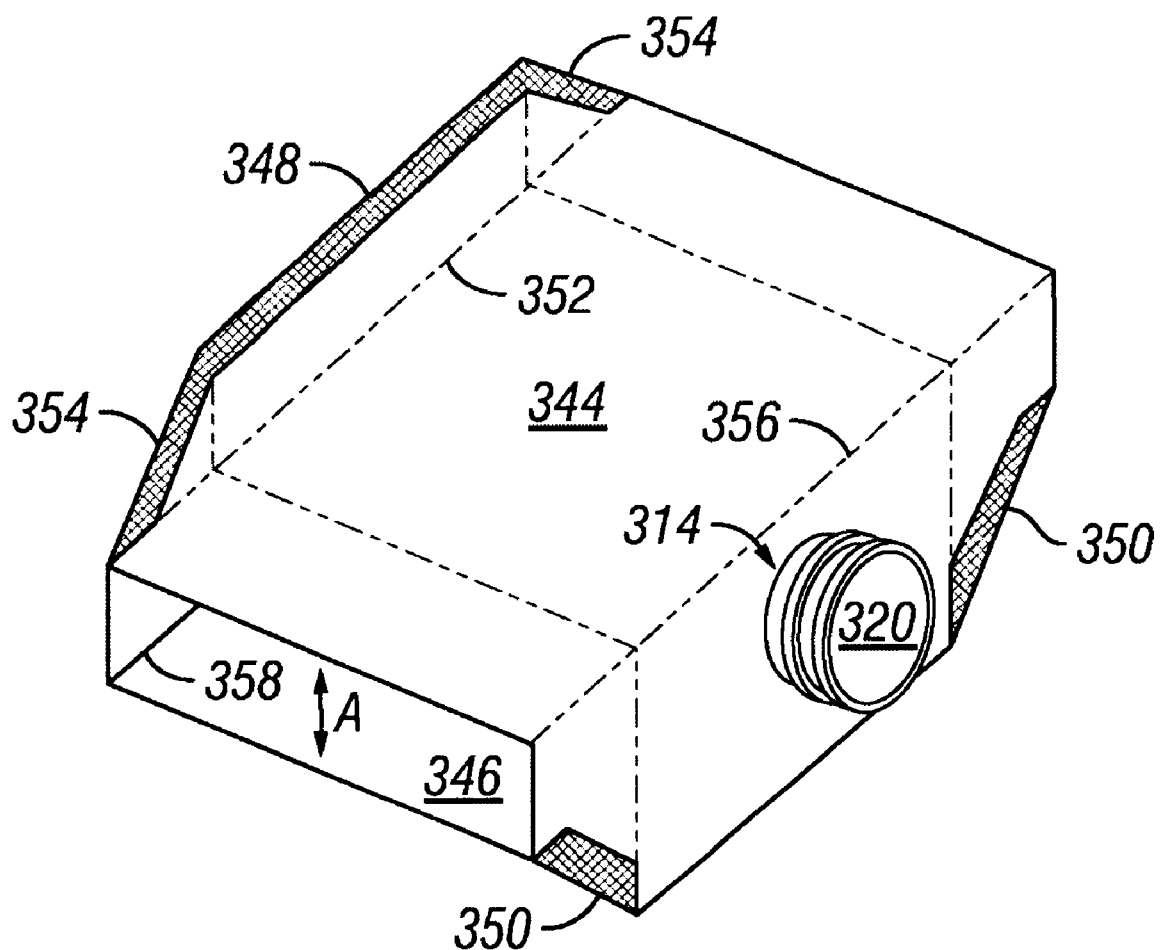
Figure 45:
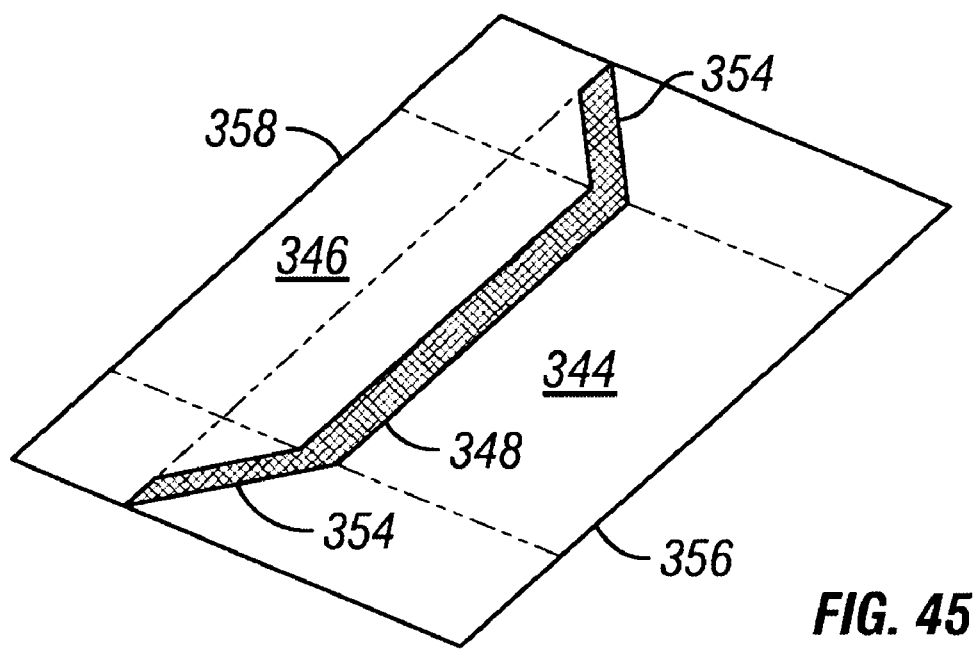

Referring to FIG. 44, the sheets 344, 346 are folded along the second 352, third 356, fourth 358, and fifth fold 360 approximately ninety degrees such that mid-portions of the first 344 and second sheet 346 are separated from each other by a distance A. As illustrated in FIG. 45, the sheets 344, 346 are further folded at the second 352, third 356, fourth 358, and fifth fold 360 to approximately one hundred eighty degrees to form a rectangularly shaped assembly, wherein the mid-portion of the first sheet 344 and the bottom portion of the second sheet 346 are illustrated.

Figure 46:
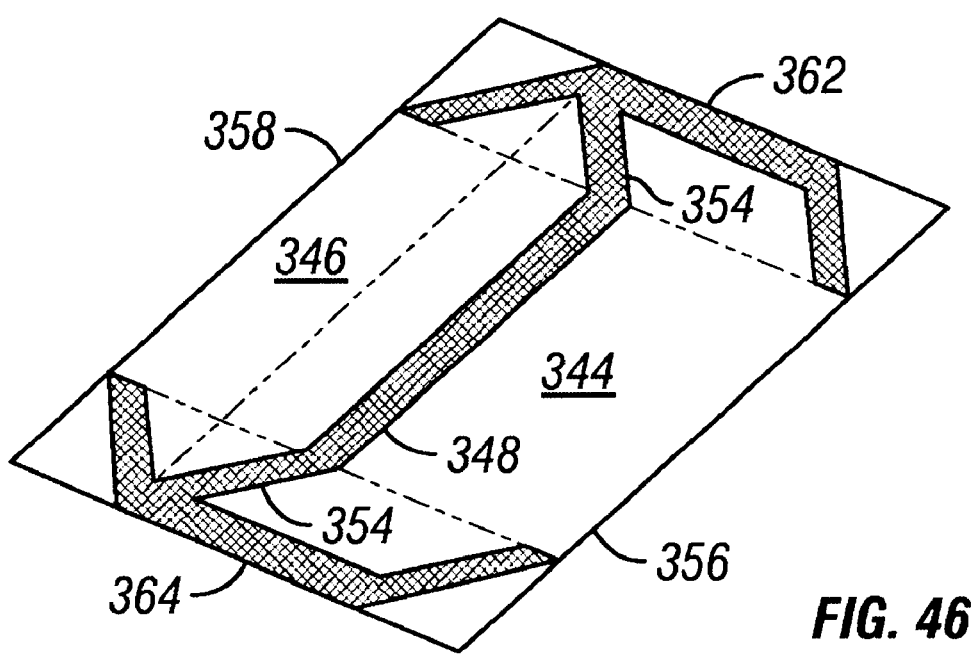
Figure 47:
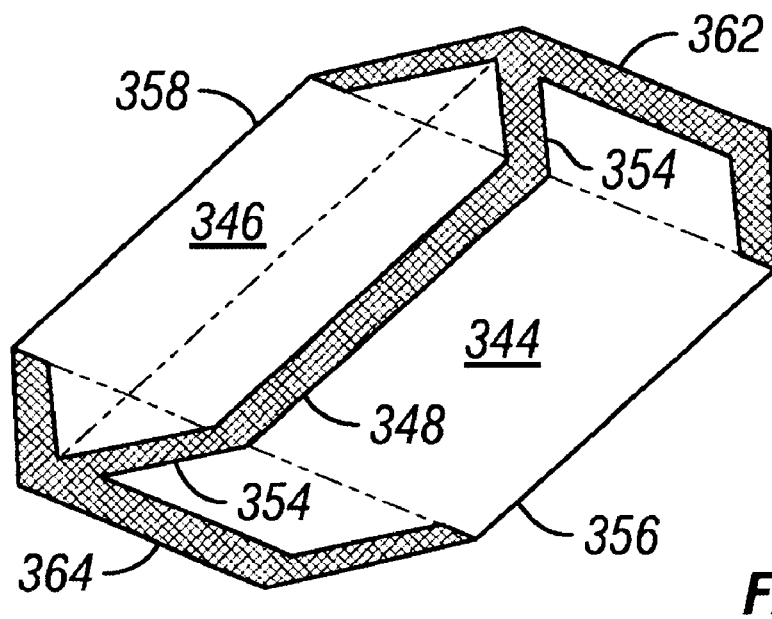
Figure 48:
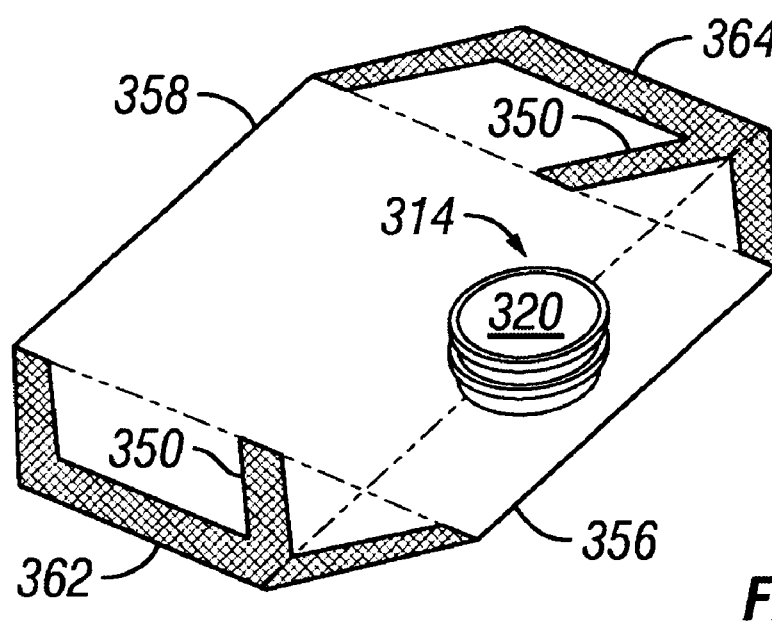
FIG. 48 is a fully formed standup bag of FIG. 31 in a collapsed state.

Referring to FIG. 46, the sides of the sheets 344, 346 are secured together by a second U-shaped seal 362 and a third U-shaped seal 364. As shown in FIG. 47, four corner portions of the rectangularly shaped assembly are removed by trimming along end segments of the second 362 and third U-shaped seal 364. The standup bag 300 is now fully formed an may be shipped in the collapsed state to a filling station as shown in FIG. 48.

Referring to FIGS. 49–55, another embodiment of a standup bag 400 is shown. The standup bag 400 is intended primarily to contain relatively small enclosures ranging from a few pints to a few gallons. The standup bag 400 has a front wall 402, a rear wall 404, a first concave shaped side wall 406, a second concave shaped side wall 408, a top wall 410, and a bottom wall 412 to define therebetween an enclosed region for containing flowable substances. The walls 402, 404, 406, 408, 410, 412 are formed from flexible sheets.

Figure 49:
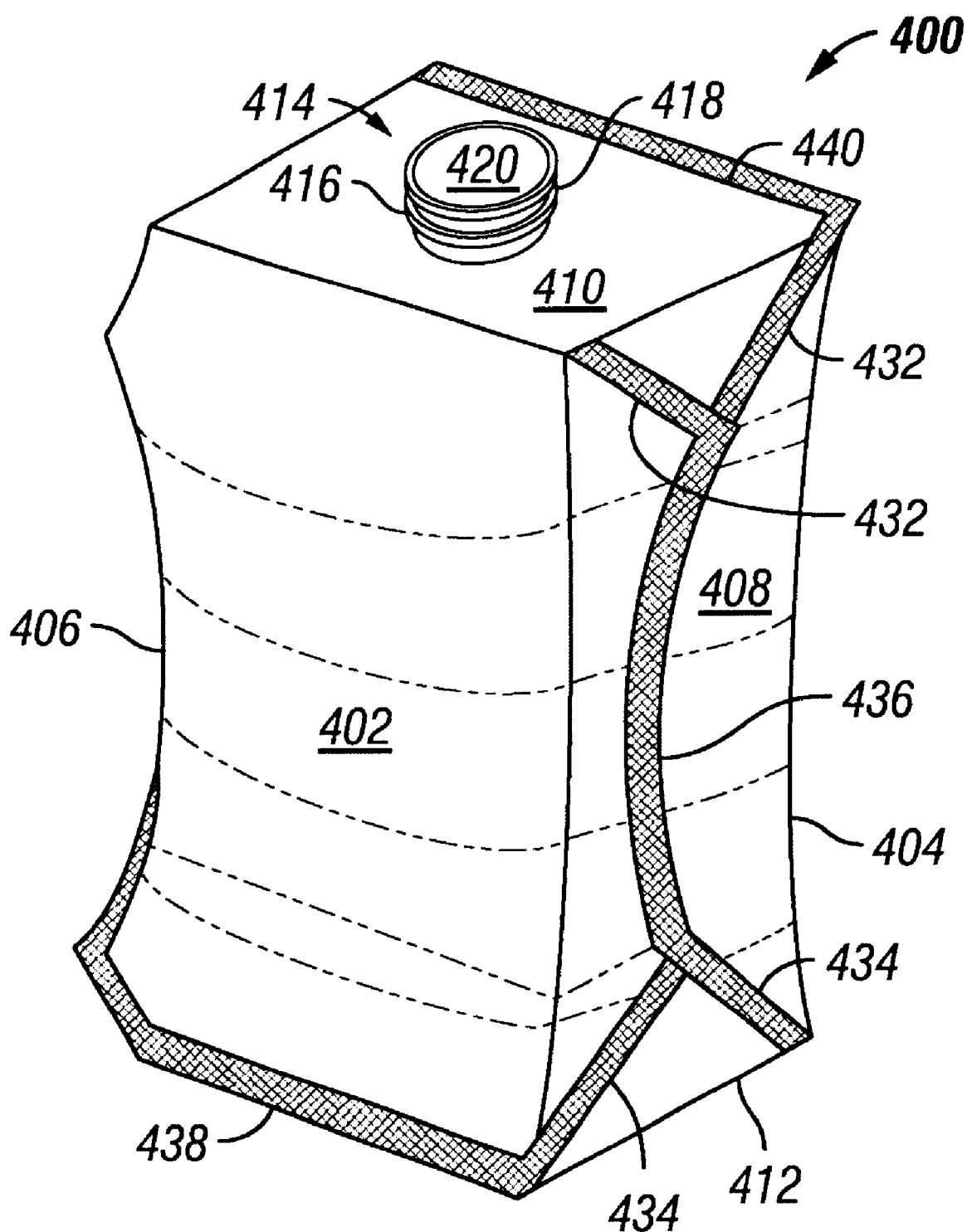
FIG. 49 is another alternative embodiment of a flexible bag on the present invention in the form of a standup bag having a fitment.
Figure 50:
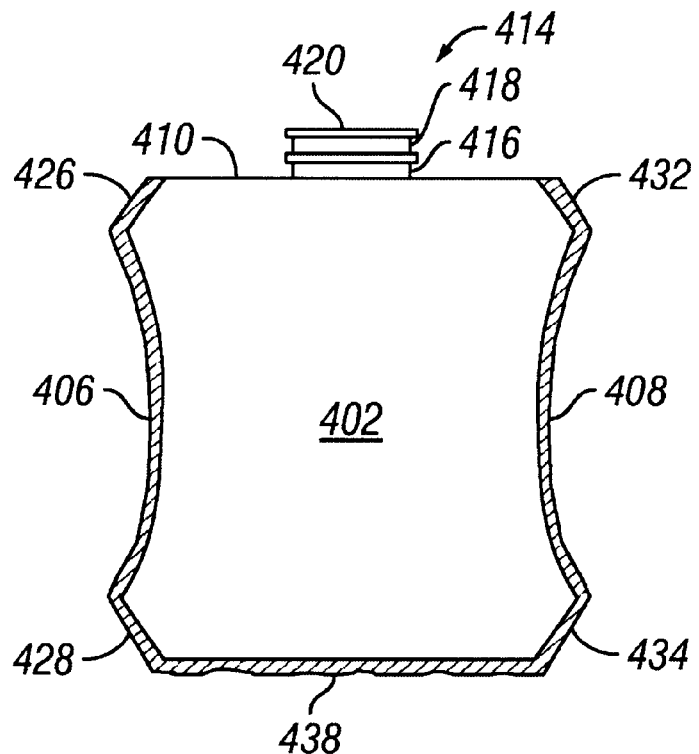
FIG. 50 is a front plan view of the standup bag of FIG. 49.
Figure 51:
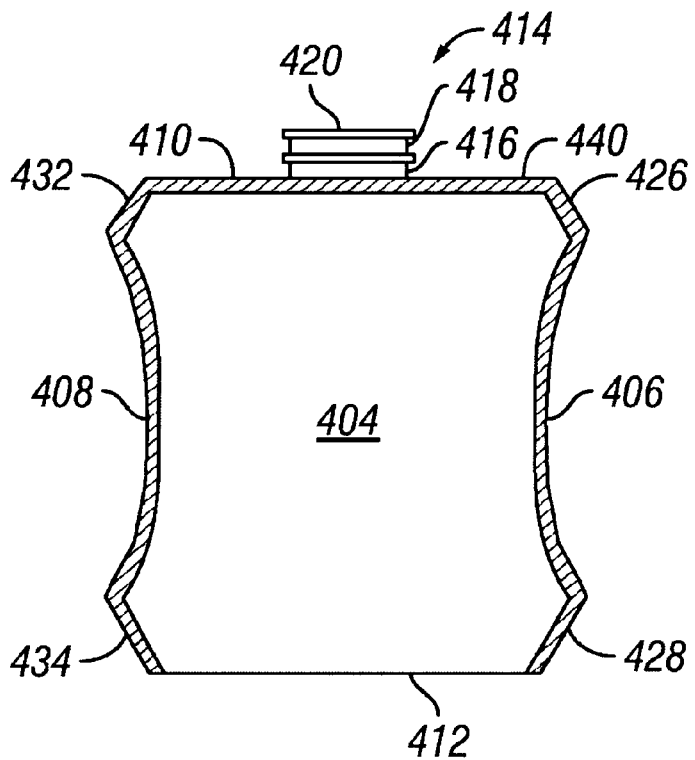
FIG. 51 is a rear plan view of the standup bag of FIG. 49.
Figure 52:
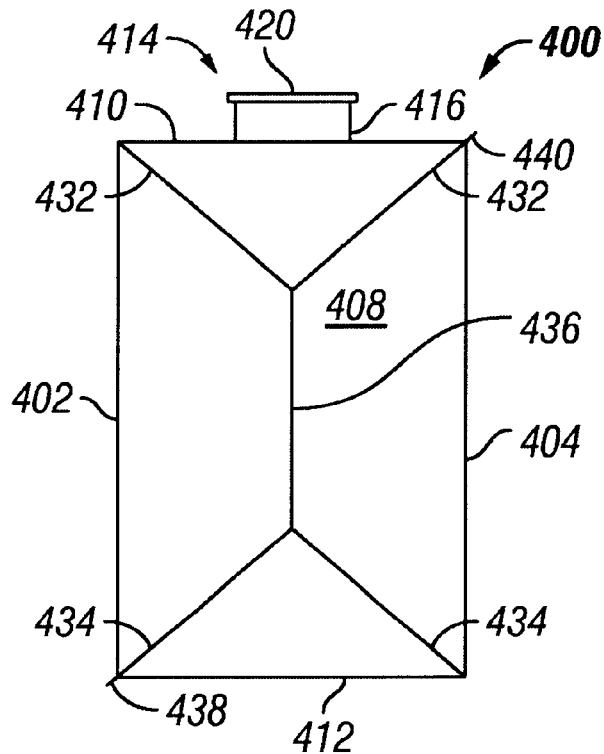
FIG. 52 is a plan view of one side of the standup bag of FIG. 49.
Figure 53:
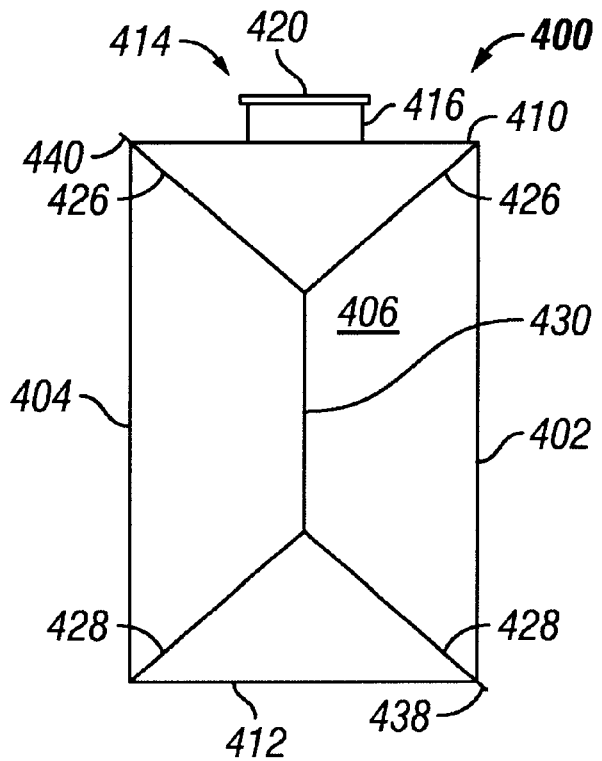
FIG. 53 is a plan view of the other side of the standup bag of FIG. 49.
Figure 54:
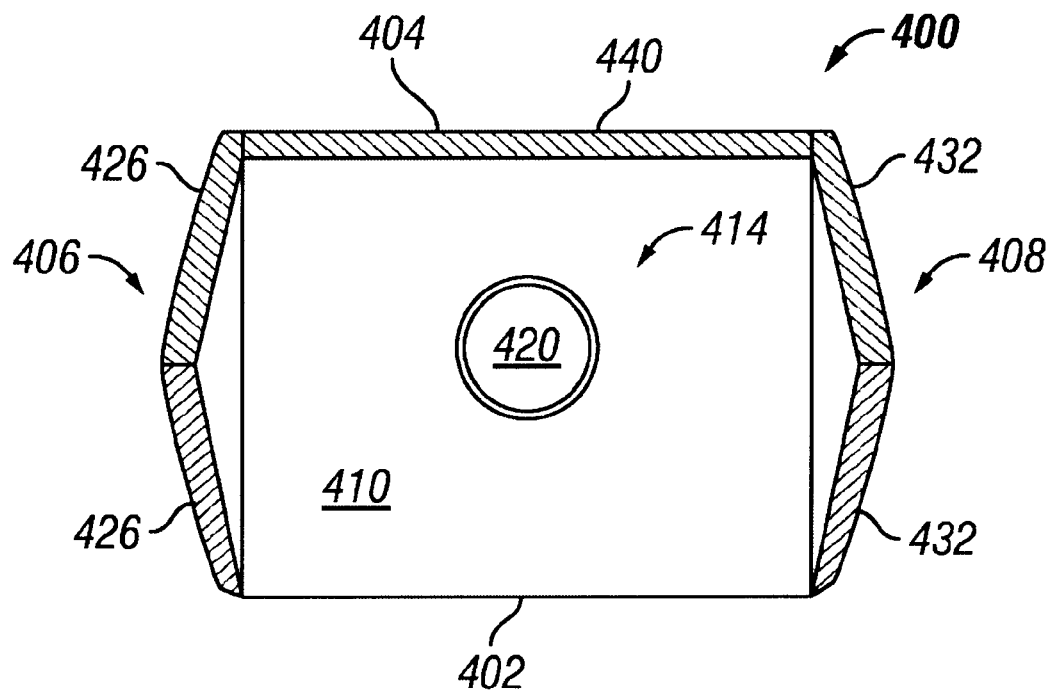
FIG. 54 is a top plan view of the standup bag of FIG. 49.
Figure 55:
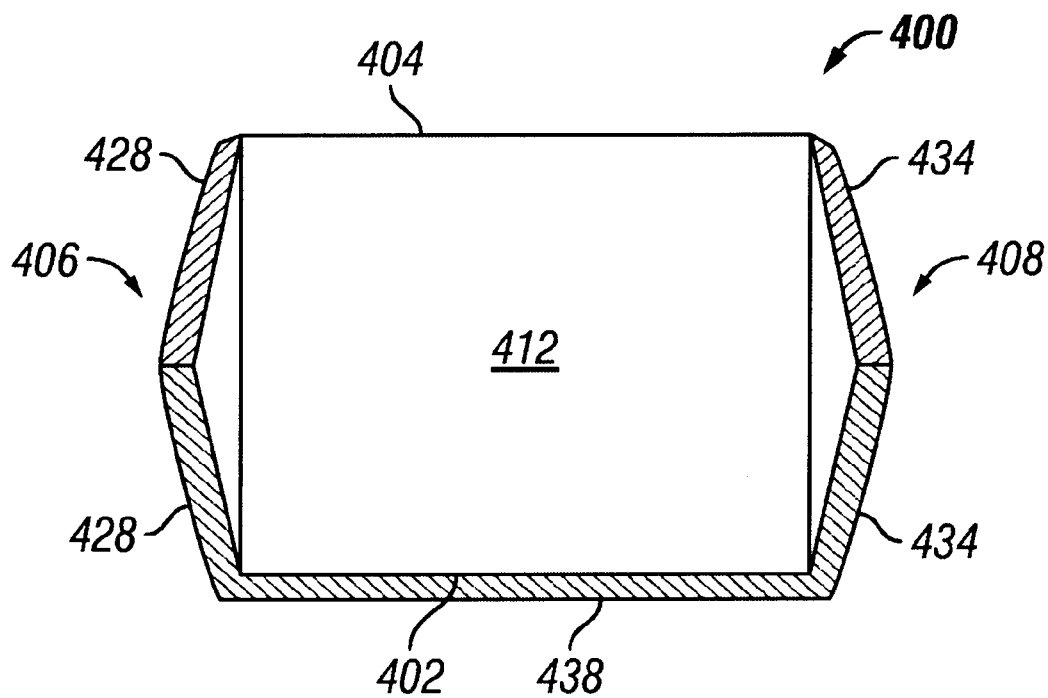
FIG. 55 is a bottom plan view of the standup bag of FIG. 49.
Figure 56:
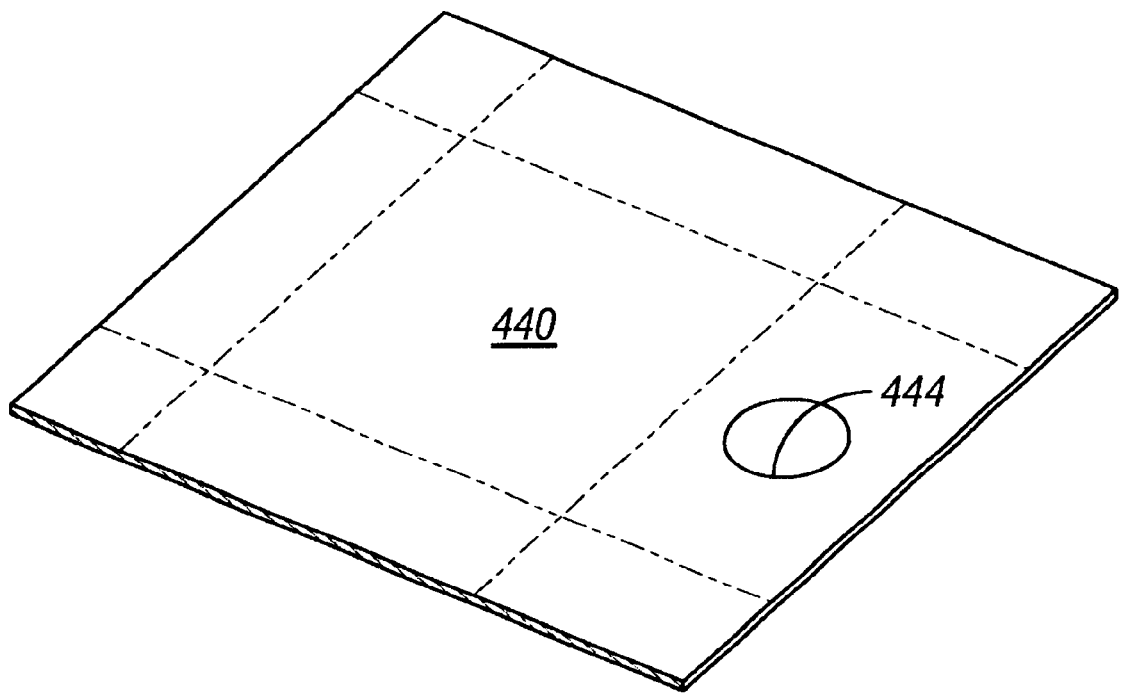
FIGS. 56–65 show the steps for forming the standup bag of FIG. 49.
Figure 57:
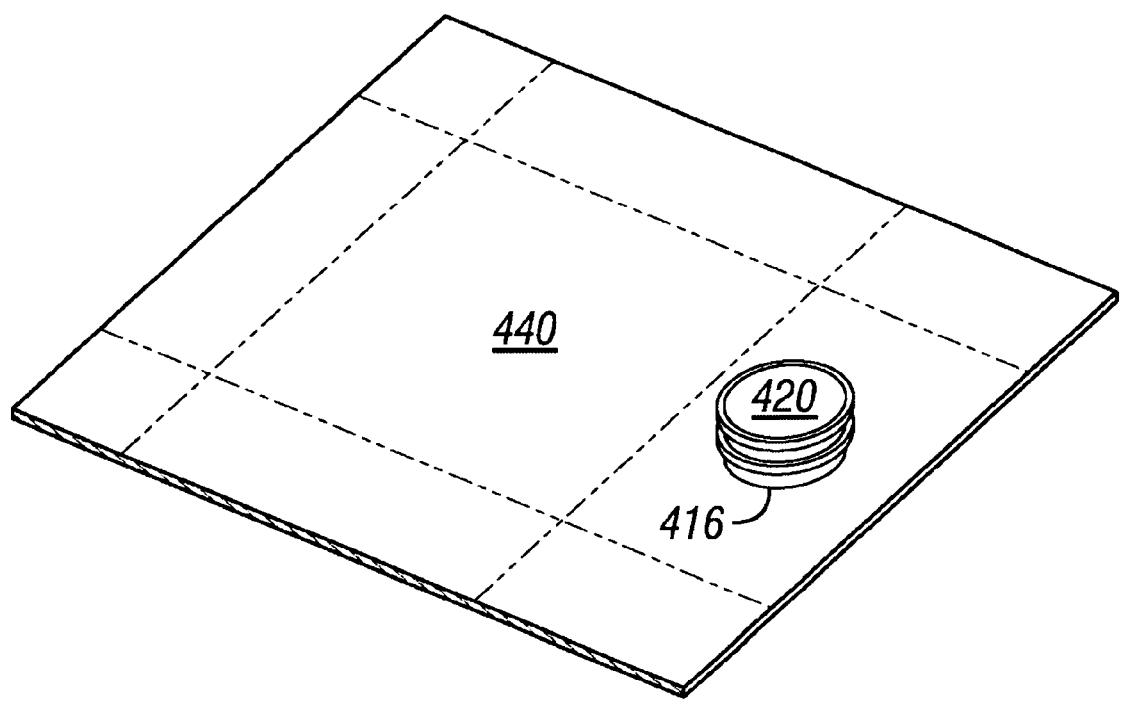

The top wall 410 has a through-hole, and a fitment 414 having a spout body 416 and a cap 420. The front wall 402, portions of the side walls 406, 408, and the top wall 410 are formed from a first sheet (not shown), while the rear wall 404, portions of the concave shaped side walls 406, 408, and the bottom wall 412 are formed from a second sheet (not shown). In particular, the first side wall 406 includes upper heat seals 426 which extend from upper corners of the first side wall and join to form a V-shaped seal when viewed from the side as shown in FIG. 53. The first side wall 406 further includes lower heat seals 428 which extend from lower corners of the first side wall 406 and join to form an inverted V-shaped seal. The V-shaped seals are joined together by a concave shaped heat seal 430 to form a contour structure. Similarly, the second side wall 408 includes upper heat seals 432 and lower heat seals 434 which form V-shaped seals as shown in FIG. 52, and each of the V-shaped seals are joined by a concave shaped heat seal 436. Referring to FIGS. 49 and 50, a heat seal 438 extends along the bottom edge of the front wall 402 from one of the lower heat seals 428 of the first side wall 406 to one of the lower heat seals 434 of the second side wall 408. In a similar fashion, a heat seal 440 extends along the top edge of the rear wall 404 from one of the upper heat seals 426 of the first side wall 406 to one of the upper heat seals 432 of the second side wall 408 as shown in FIGS. 49 and 51.

With such a configuration, the flexible sheets are rigidified by the flowable substance exerting pressure against the walls 402, 404, 406, 408, 410, 412. The rigidity of the bottom corners of the standup bag 400 is further enhanced by providing concave shaped side walls 406, 408 such that the standup bag 400 remains rigid and well defined as a result of the flowable substance exerting pressure against the corner region. The pressure exerted against the walls 402, 404, 406, 408, 410, 412 creates a flat and stable base at the bottom to allow the bag 400 to stand solid and stable on a level surface, even when partially filled. As a result, relatively thin and flexible sheet material may be used. Furthermore, the concave side walls 406, 408 allow a user to more easily grasp the standup bag 400, and the concave side walls 406, 408 are distinctly shaped for marketing purposes.

Figure 58:
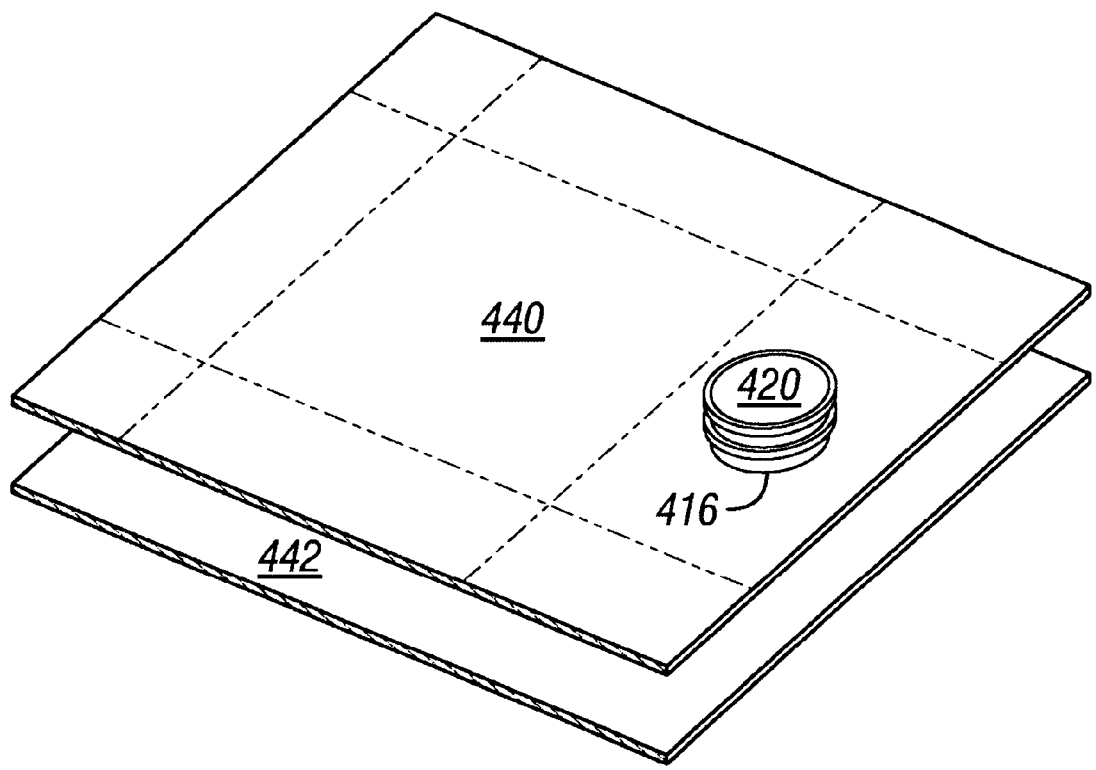
Figure 59:
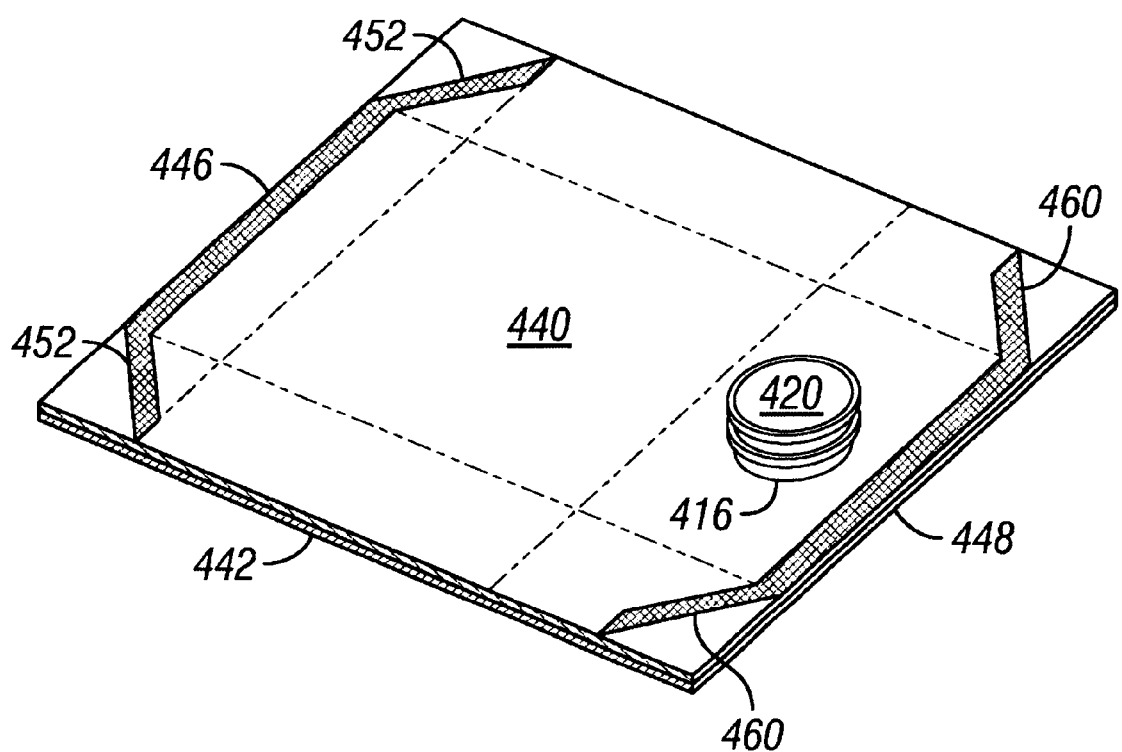

Referring to FIGS. 56–66, the standup bag 400 can be formed by providing a first rectangular sheet 440 and a second rectangular sheet 442. Each of the sheets 440, 442 can be single layer, two layers, three layer or more layers of material. A hole 444 is punched in the first rectangular sheet 440 to define the through-hole (see FIG. 56), and the spout body 416 is fitted up through the through-hole (see FIG. 57), wherein the lower flange is sealed to the first rectangular sheet 440 to form the seal ring. Referring to FIG. 58, the first sheet 440 is positioned above the second sheet 442. Referring to FIG. 59, the sheets 440, 442 are secured together at the bottom portion by forming a first U-shaped seal 446 extending from one side of the sheets 440, 442 to an opposite side of the sheets 440, 442 and are further secured together at a top portion by forming a second U-shaped seal 448 extending from one side of the sheets 440, 442 to the opposite side of the sheets 440, 442.

Figure 60:
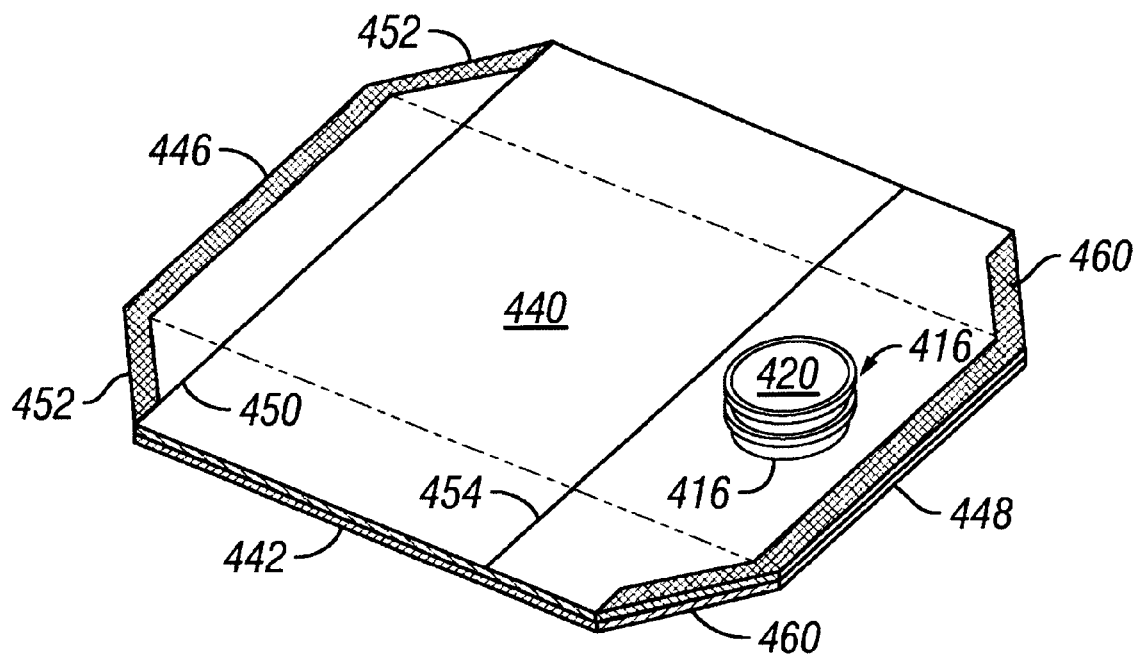
Figure 61:
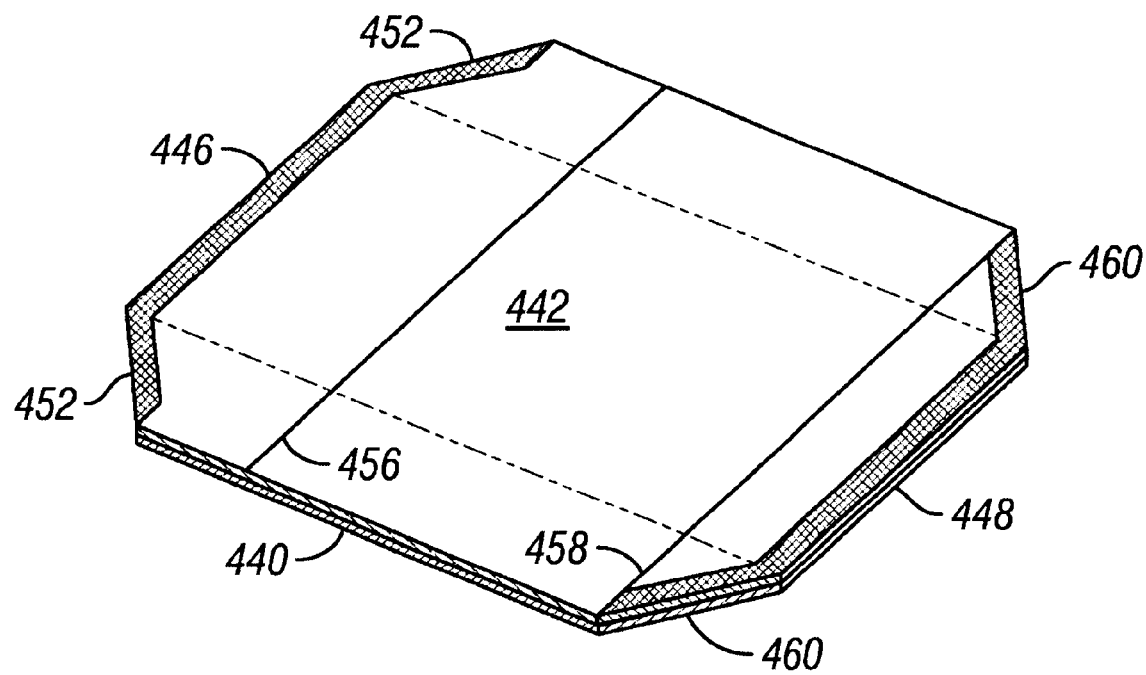

Referring to FIG. 60, four corner portions of the sheets 440, 442 are removed by trimming along end segments of the first 446 and second U-shaped seal 448. A first fold 450 is formed near the bottom portion of the first sheet 440 and extends from one side of the first sheet 440 to the opposite side of the first sheet 440. The first fold 450 abuts end segments 452 of the first U-shaped seal 446. A second fold 454 is formed near the top portion of the first sheet 440 and extends from one side of the first sheet 440 to the opposite side of the first sheet 440. Referring to FIG. 61, a third fold 456 is formed near the bottom portion of the second sheet 442. The third fold 456 extends from one side of the second sheet 442 to the opposite side of the second sheet 442. A fourth fold 458 is formed near the top portion of the second sheet 442 and extends from one side of the second sheet 442 to the opposite side of the second sheet 442, wherein the fourth fold 458 abuts end segments 460 of the second U-shaped seal 448.

Figure 62:
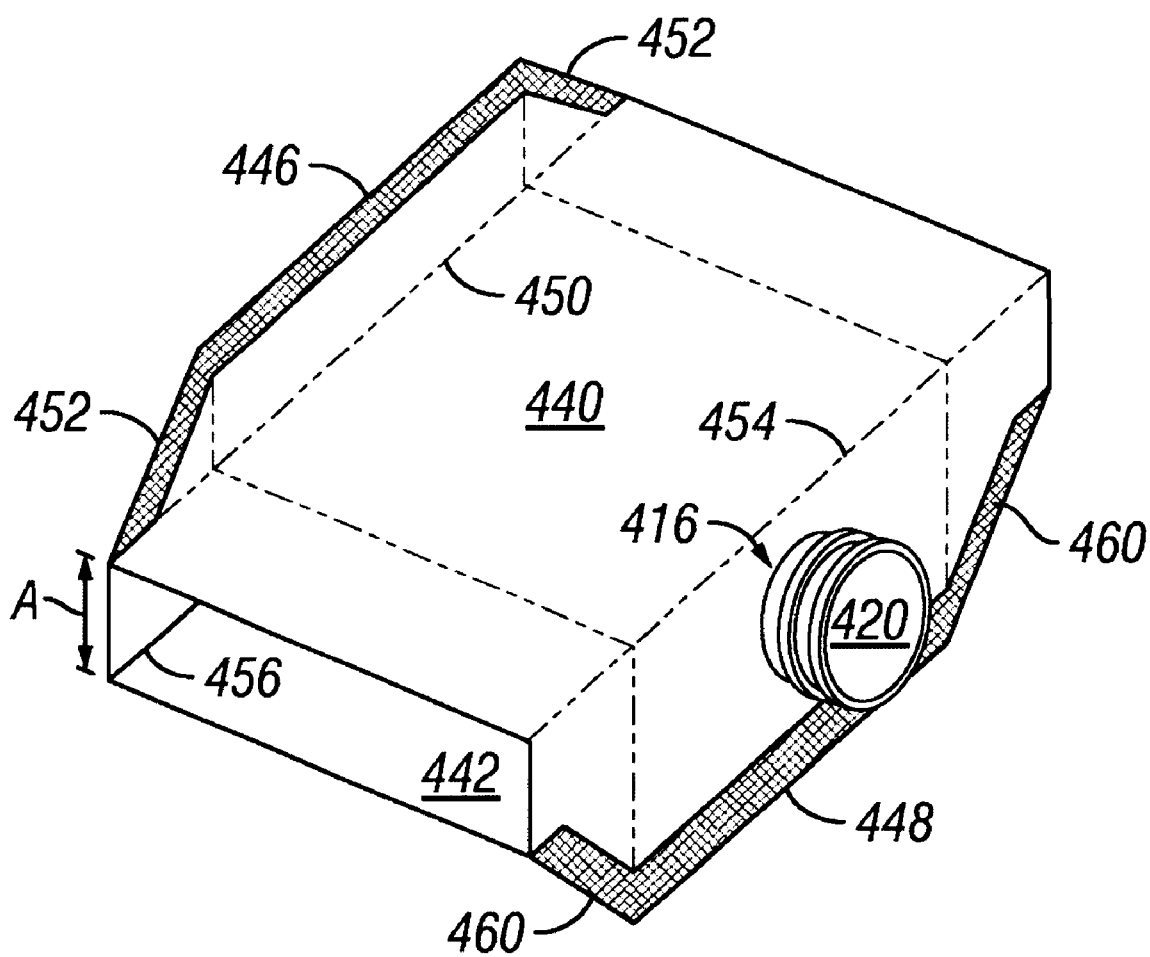
Figure 63:
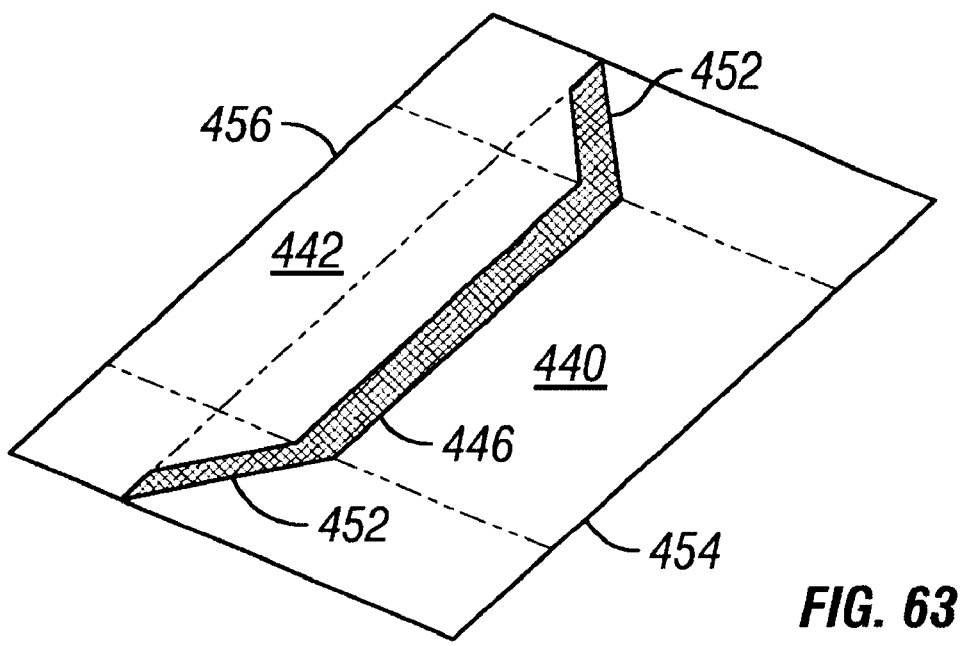

Referring to FIG. 62, the sheets 440, 442 are folded approximately ninety degrees at the first 450, second 454, third 456, and fourth fold 458 such that mid-portions of the first 440 and second sheet 442 are separated from each other by a distance A. Referring to FIG. 63, the sheets 440, 442 are further folded at the first 450, second 454, third 456, and fourth fold 458 from approximately ninety degrees to one hundred eight degrees to form a rectangularly shaped assembly.

Figure 64:
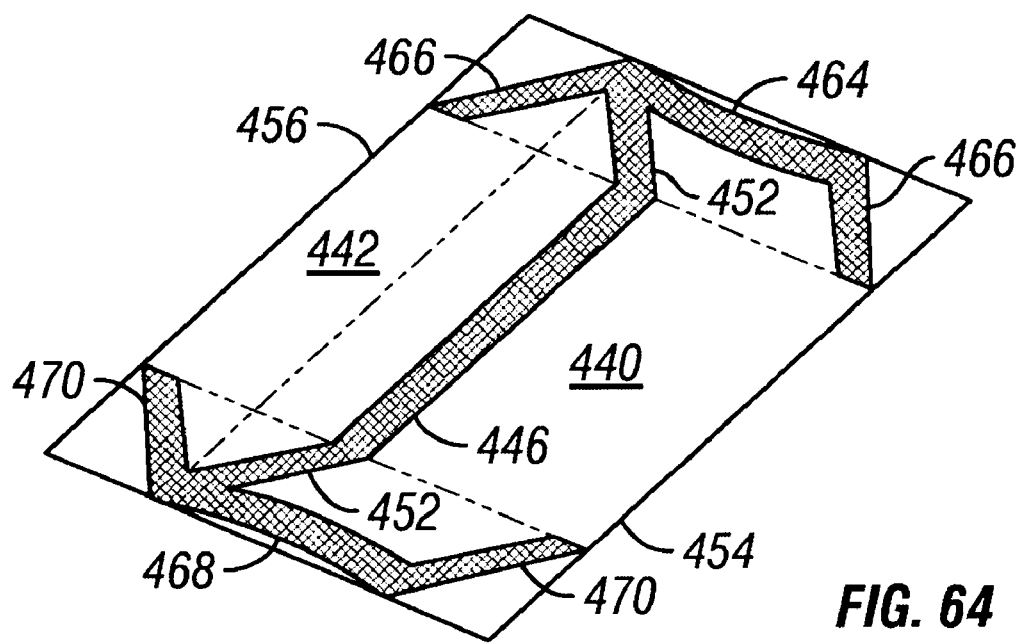
Figure 65:
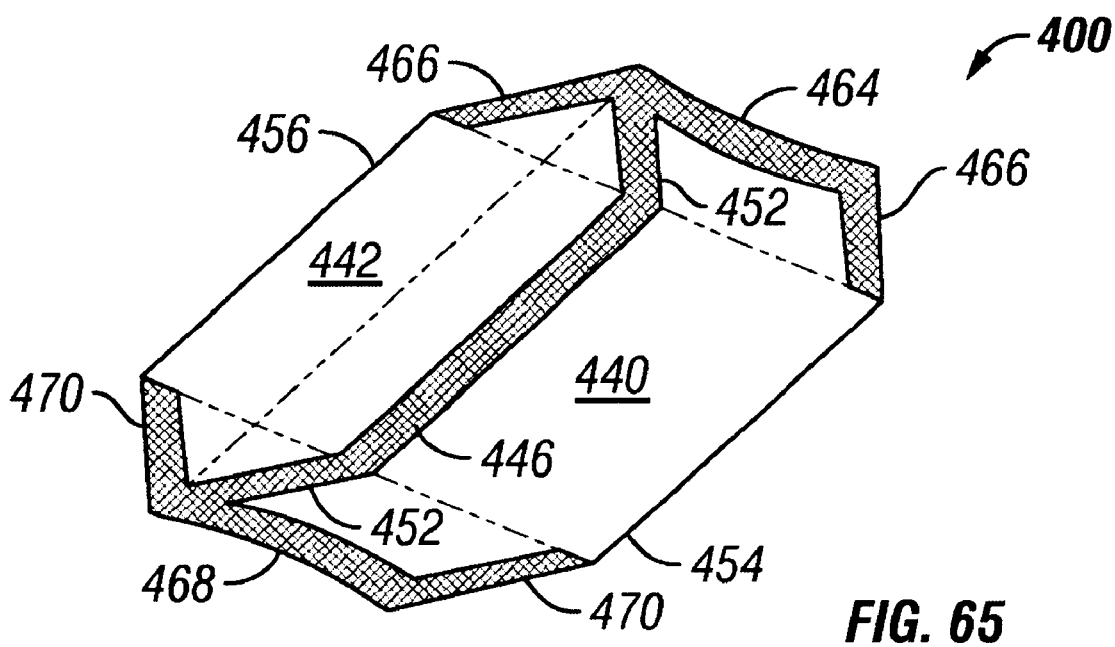
Figure 66:
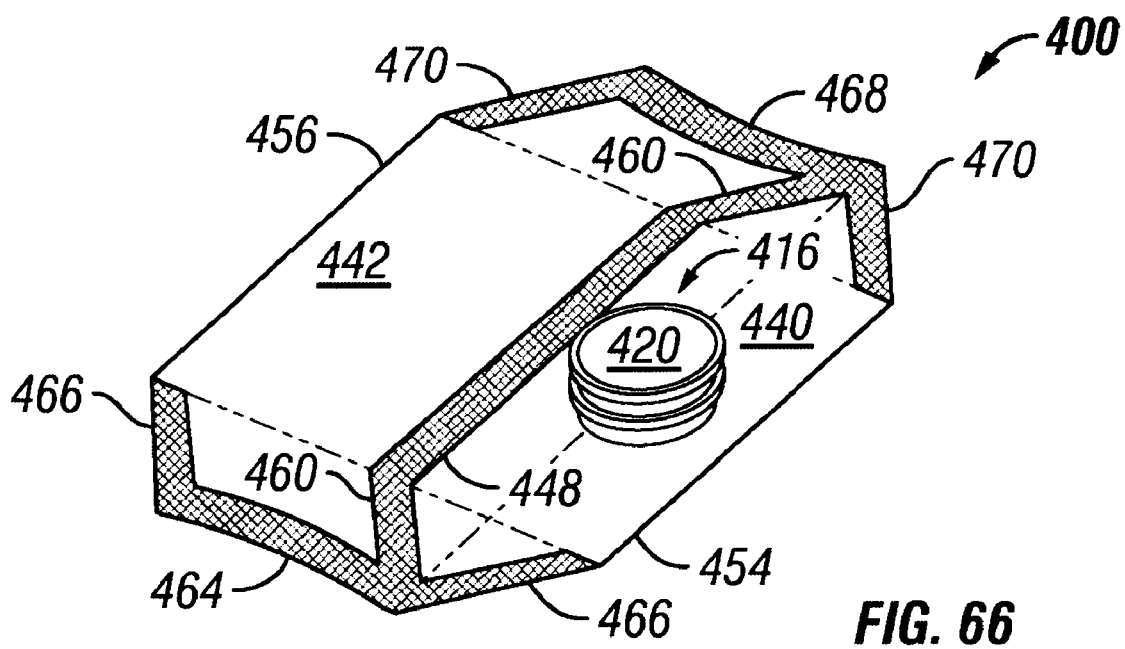
FIG. 66 is a fully formed standup bag of FIG. 49 in a collapsed state.

Referring to FIG. 64, the sides of the sheets 440, 442 are secured together by a first curved seal 464 having end segments 466 and a second curved seal 468 having end segments 470. As shown in FIG. 65, four corner portions of the rectangularly shaped assembly are removed by trimming along the end segments 466, 470 of the first 464 and second curved seal 468, and mid portions of the rectangularly shaped assembly are removed by trimming along the mid portions of the first 464 and second curved seal 468. The standup bag 400 is now fully formed and may be shipped to a filling station in the collapsed state as shown in FIG. 66. After the bag 400 is filled with the flowable substance, dispensing may be accomplished in one of four basic ways: uncapping and discharging contents; attaching one or more standup bags 400 to a pumping system; activating a small volume, use-demand closure often referred to as a dispensing valve; or slashing at least one wall and dispensing the contents.

Referring to FIGS. 72–76, the standup bags of the present invention may include at least one integrated handle 700 that are useful for transporting and/or dispensing from the standup bags. It is contemplated that a one handle or a two handle configuration may be provided with the standup bag. The handles may be integral with the material of the standup bag. In an alternate embodiment, at least one handle may be attached to the completed bag by heat sealing, impulsed sealing, ultrasonic sealing, RF sealing, or by other techniques known to those skilled in the art. In another embodiment, at least one handle may be attached to the completed bag by adhesives such as, but not limited to, hot melt adhesives.

Figure 72:
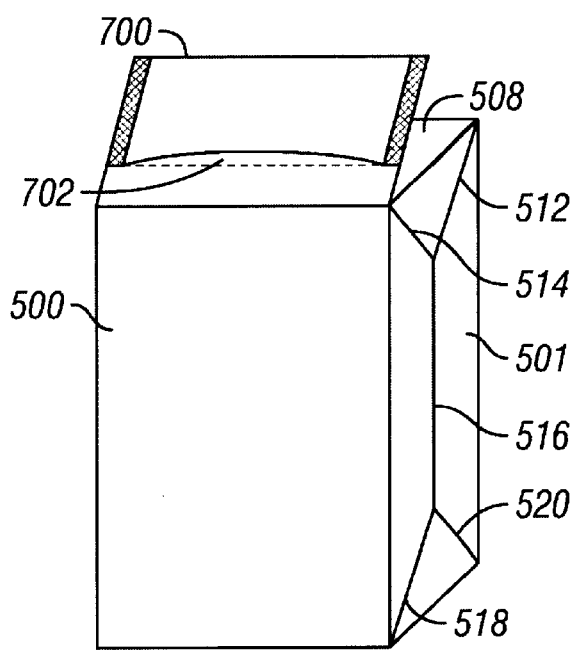
FIG. 72 is a perspective view of a flexible bag of the present invention having a fitment and a handle.
Figure 72A:
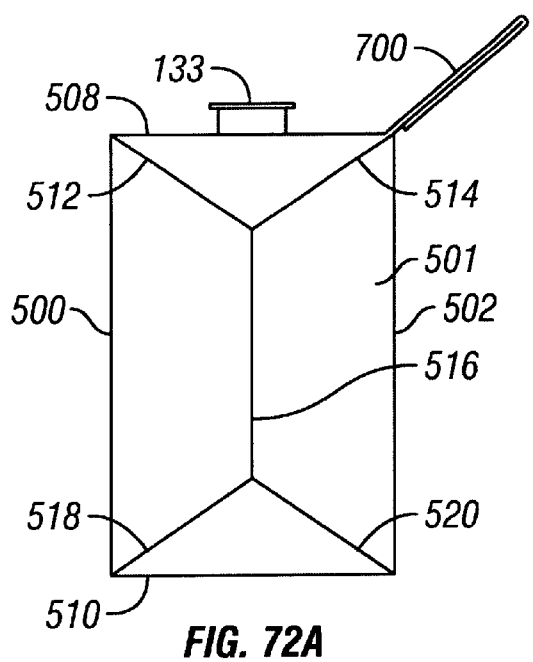
FIG. 72A is a plan view of one side of the flexible bag of FIG. 72.
Figure 72B:
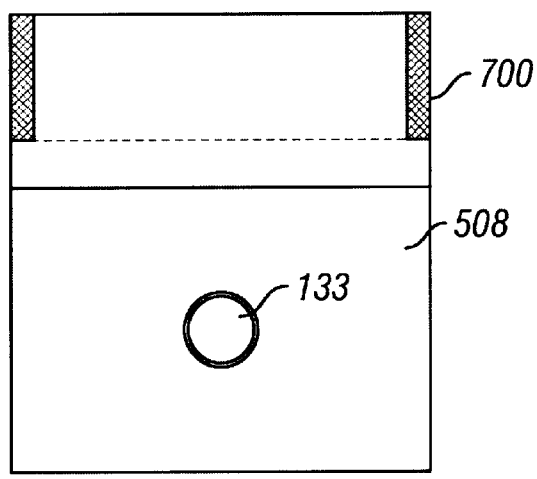
FIG. 72B is a top view of the flexible bag of FIG. 72.
Figure 73:
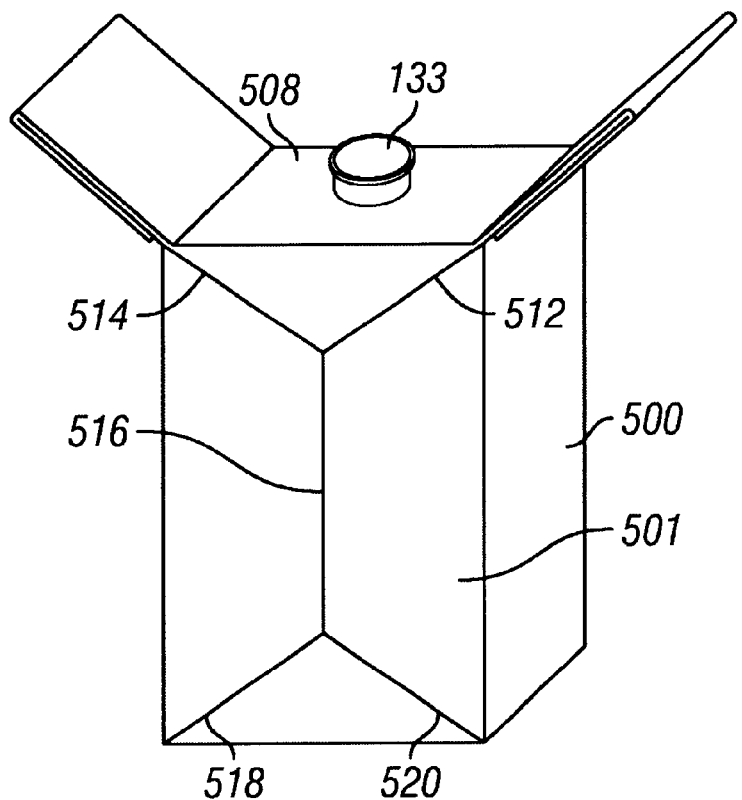
FIG. 73 is a perspective view of a flexible bag of the present invention having a fitment and two handles.
Figure 73A:
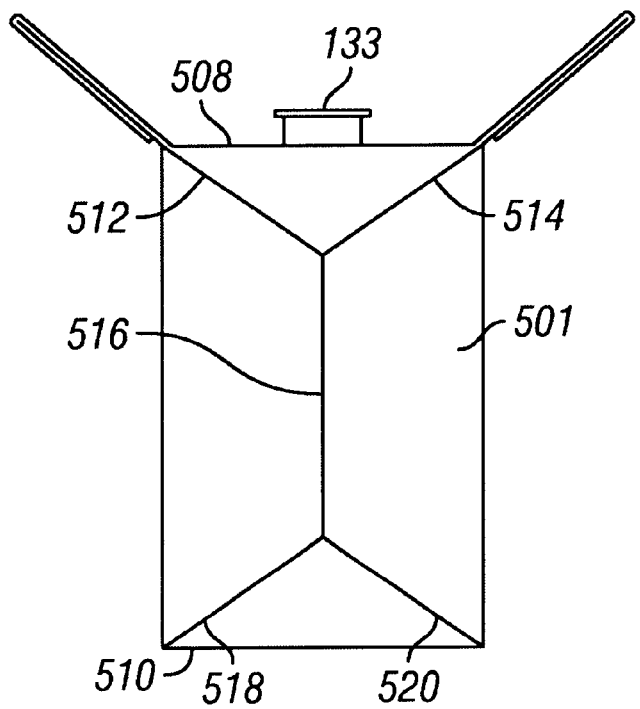
FIG. 73A is a plan view of one side of the flexible bag of FIG. 73.
Figure 74:
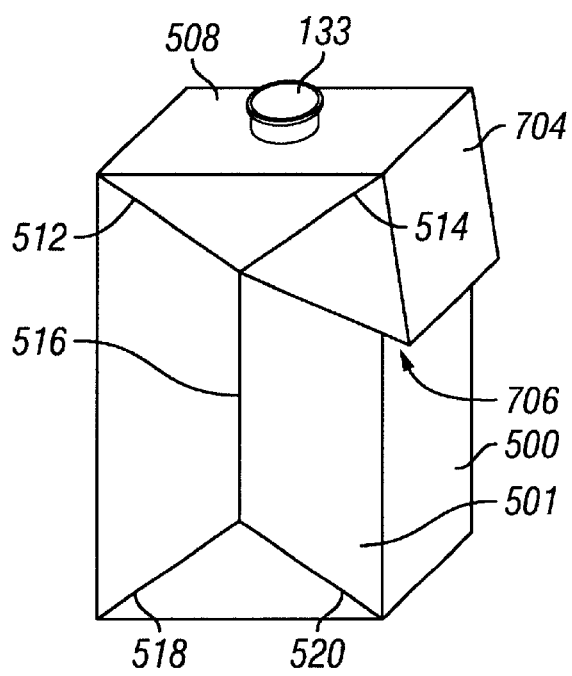
FIG. 74 is a perspective view of an alternate embodiment of a flexible bag of the present invention in the form of a standup bag having a fitment and one handle.
Figure 74A:
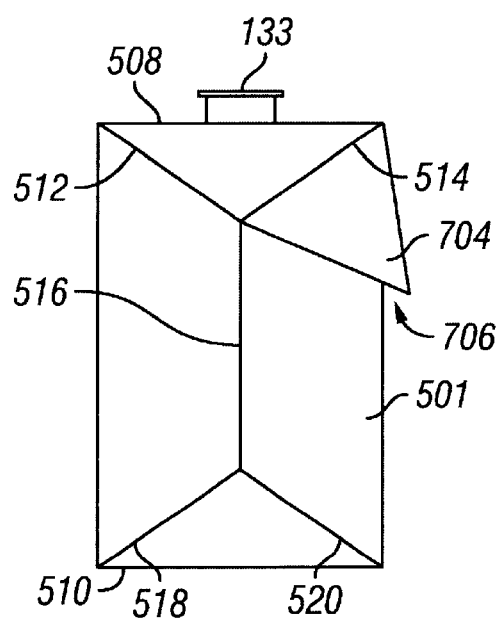
FIG. 74A is a plan view of one side of the flexible bag of FIG. 74.
Figure 75:
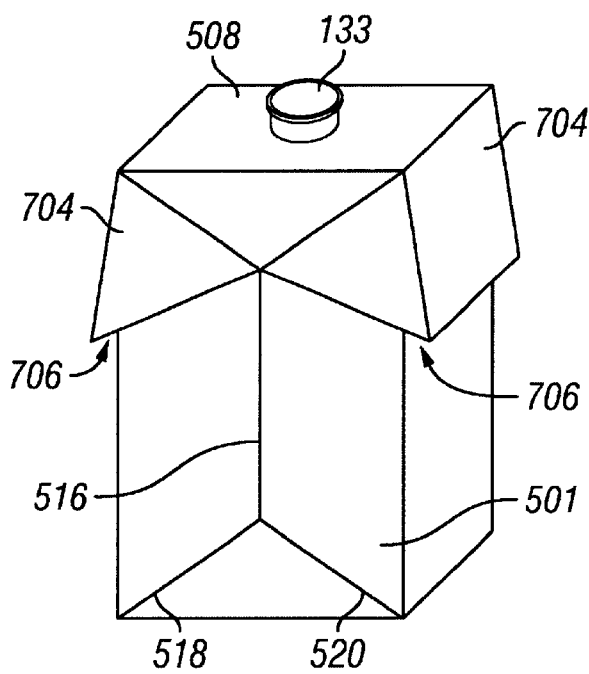
FIG. 75 is a perspective view of an alternate embodiment of a flexible bag of the present invention having a fitment and two handles.
Figure 75A:
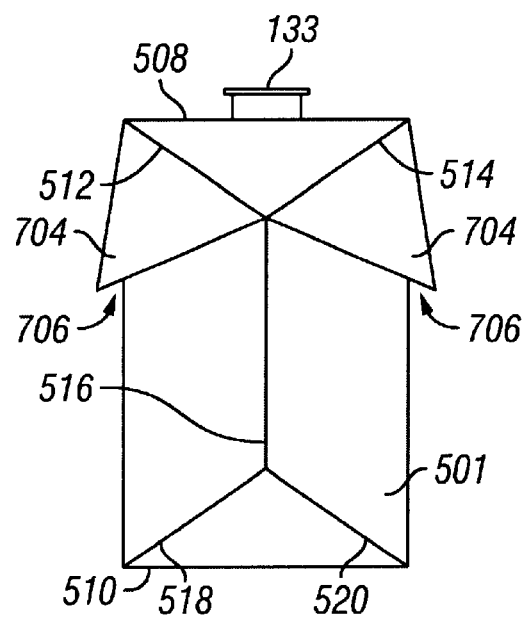
FIG. 75A is a plan view of one side of the flexible bag of FIG. 75.

Referring to FIGS. 72 and 74, two embodiments of the one handle configuration is shown. In FIG. 72, the integrated handle is an extension of the heat seal that extends across the edge of the top wall. The additional material of the heat seal is folded over upon itself and welded to form a recess 702 or pocket that facilitates an individual's ability to lift, carry, or transport the standup bag. Another handle embodiment is shown in FIGS. 74 and 74A. The handle 704 is flush with the walls of the bag rather than a member that extends away from the body of the bag. A recess 706 or pocket is formed between the handle material and a wall of the bag. The additional material is folded and the handle is welded to the bag at the same welds that comprise one side of the V-shaped seal as shown in FIGS. 74 and 74A. Those skilled in the art will appreciate that the standup bags may also include two integrated handles as shown in FIGS. 73, 75, and 76.

FIG. 78 is a standup bag template for making a standup bag from at least one sheet of material. For example, one sheet of material can be cut to a similar shape of the template. The front, back, top and bottom walls correspond to sections F, H, E, G. A side wall is formed by combining sections A, B, C, and D together as shown in FIG. 78A. The template as shown in FIG. 78 includes two handles 704 that are integrated members of the standup bag. Those skilled in the art will appreciate that the same template may be used to form a standup bag having one handle by simply removing one handle from the template.

Moreover, as shown in FIGS. 72–76, the integrated handles or grasping members are on the same side of the standup bag as the fitment. It is also contemplated that the grasping members 704 may be provided on the a side opposite the fitment 725 as shown in FIG. 77.

Figure 76:
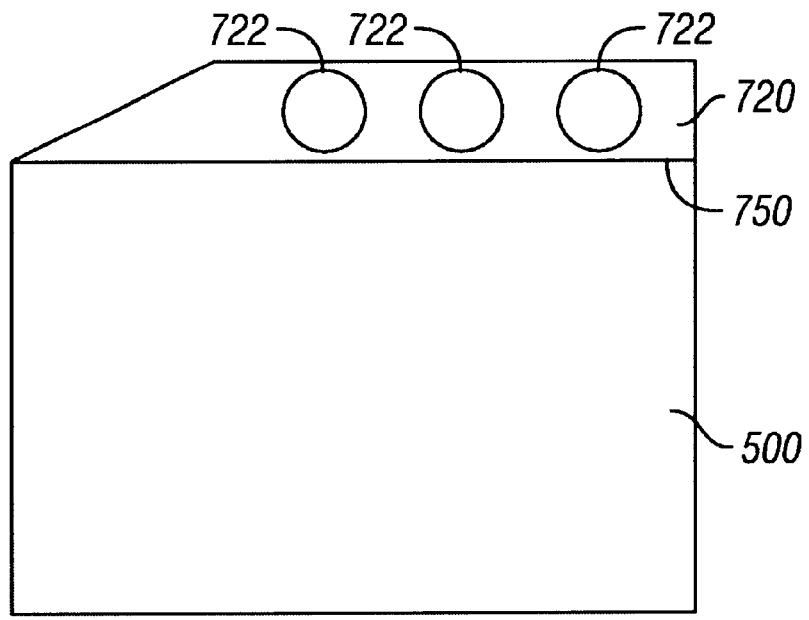
FIG. 76 is a plan view of one side of an alternate embodiment of a flexible bag of the present invention in the form of a standup bag having a fitment and two handles.
Figure 76A:
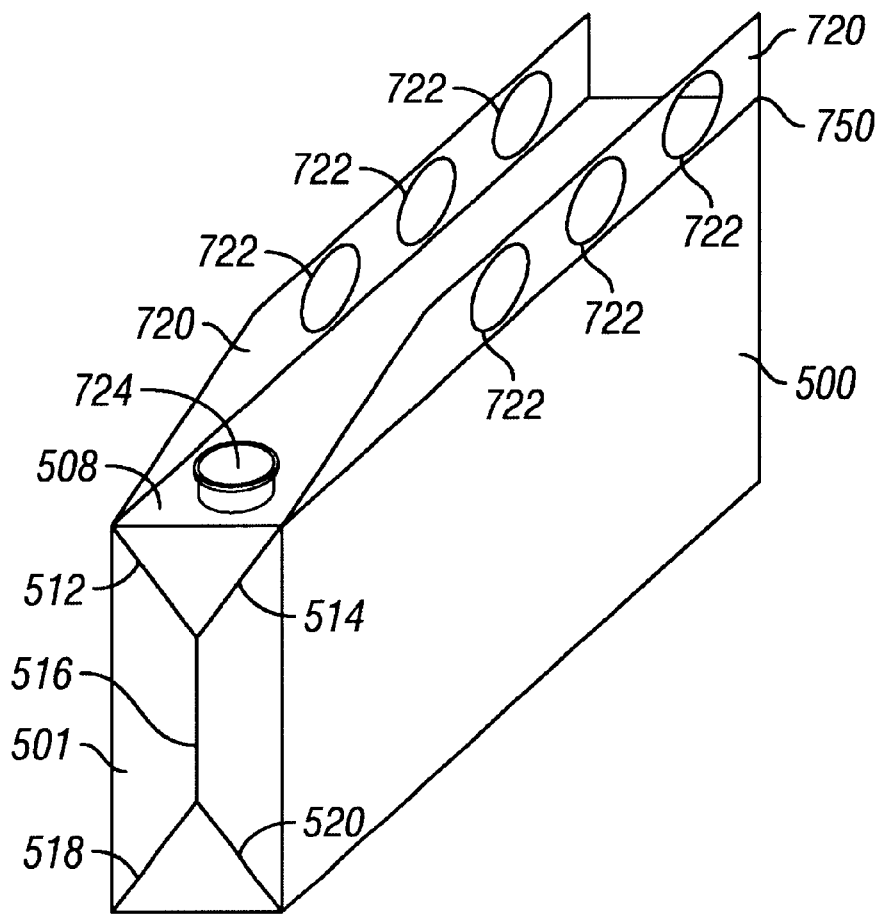
FIG. 76A is a perspective view of the flexible bag of FIG. 76.

FIGS. 76 and 76A illustrates another two handle configuration where the two handles 720 are adjacent to the bag fitment 724. The handles extend from the welds 750 and further include at least three finger holes 722. When the double handles are pulled together, bag rigidity is increased which facilitates the emptying of the bag. This feature is important when emptying a collapsing container.

Figure 87:
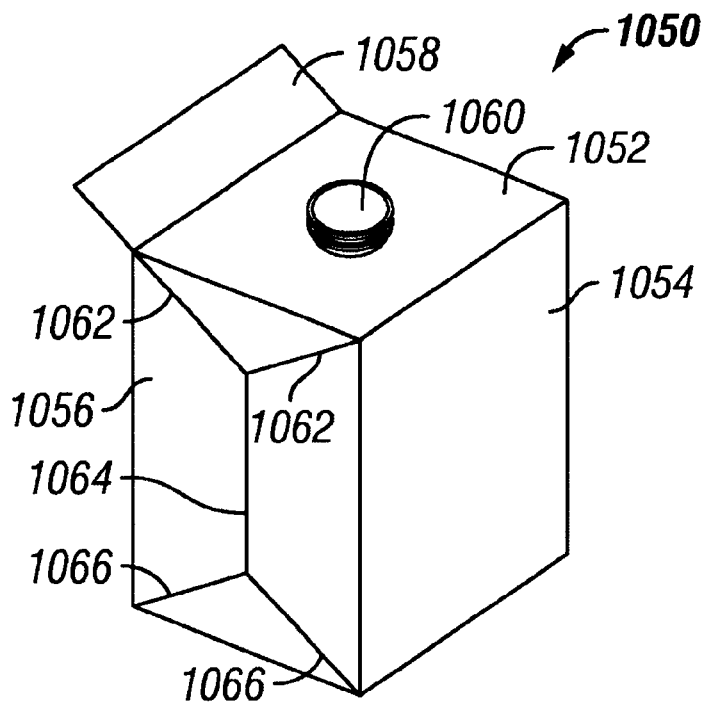
FIG. 87 is a perspective view of an alternate embodiment of the standup bag of the present invention having a planar handle.

FIGS. 87–88B illustrate other embodiments of a standup bag with at least one planar handle. The standup bag comprises a front wall 1054, a back wall (not shown), side walls 1056, a top wall 1052, and a bottom wall (not shown). The standup bag also includes a fitment 1060 that may be located on any walled surface or placed along any heat seal. As shown in FIGS. 87–88B, the fitment 1060 is located on the top wall 1052. Referring back to FIG. 87, a planar handle 1058 is provided on the standup bag. The planar handle may be integral with the bag or the handle may be attached after the bag is formed. Referring to FIGS. 88A and 88B, the standup bag includes two handles 1058, 1068. The two handle configuration allows an individual to grasp the standup bag and empty the contents more easily as shown in FIG. 88B.

Additionally, the planar handle 670 of the standup bag may be reinforced as shown in FIG. 77A. The standup bag includes handle 670 has an opening 682 which is adapted to allow the handle to be fully grasped. The reinforced handles also includes a reinforcement member 684 that strengthens the handle and allows for greater user comfort when carrying the standup bag. The reinforcement member 684 may be attached to the distal portion 686 of the handle opening. The reinforcement member 684 may be attached to the handle after the handle has been formed or may be integral with the handle. In the integral confirmation, the handle is cut to form a flap. The flap of material is then manipulated and rolled as shown in FIG. 77B to form the reinforcement member 684. By either method of forming this reinforced handle, the reinforcement member may be then attached to the handle by heat sealing, impulsed sealing, ultrasonic sealing, RF sealing, or other sealing methods known in the art.

Figure 79A:
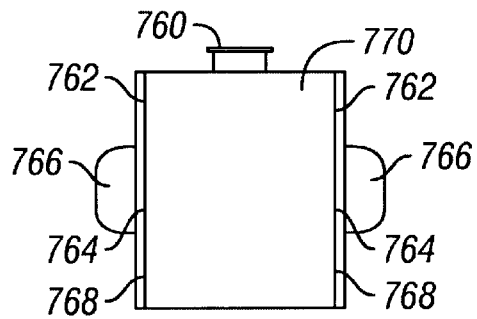
FIG. 79A is a front plan view of an alternate embodiment of the flexible bag of the present invention in the form of a standup bag having handles.
Figure 79B:
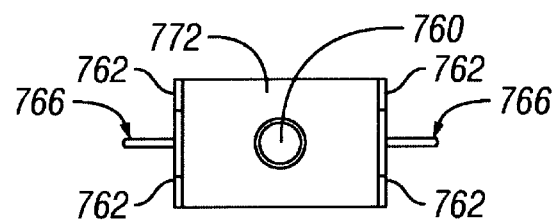
FIG. 79B is a top plan view of the flexible bag of FIG. 79A.
Figure 79C:
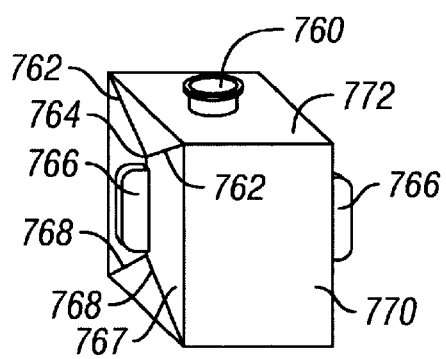
FIG. 79C is a perspective view of the flexible bag of FIG. 79A.
Figure 79D:
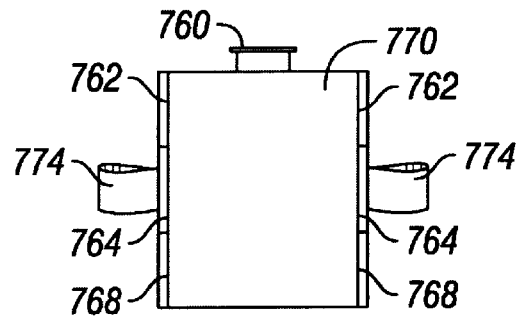
FIG. 79D is a front plan view of an alternate embodiment of the flexible bag of the present invention in the form of a standup bag having handles.
Figure 79E:
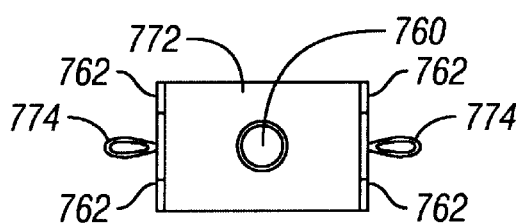
FIG. 79E is a top plan view of the flexible bag of FIG. 79D.
Figure 79F:
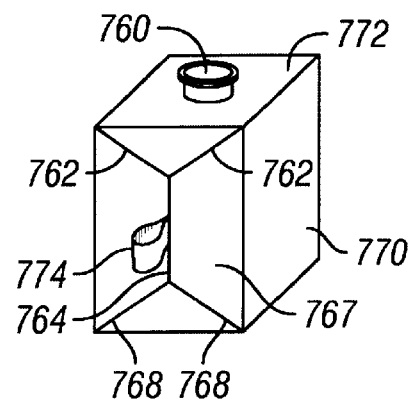
FIG. 79F is a perspective view of the flexible bag of FIG. 79D.

Referring to FIGS. 79A and 79D, other handle embodiments are illustrated. The handle are integral or attached to the standup bag. The standup comprises a front wall 770, a top wall 772, bottom wall (not shown), and side walls 767. The side walls include upper heat seals 762 and lower heat seals 768 connected by a longitudinal heat seal 764. The handles 766, 774 are extensions of the longitudinal heat seals 764. The handles may be planar 766 as shown in FIG. 79A or in a looped configuration 774 as shown in FIG. 79D. Those skilled in the art will appreciate that a plurality of these handles may be provided on the standup bags of the present invention. That is, at least one heat seal may have a handle 766, 774 extending therefrom.

Figure 85A:
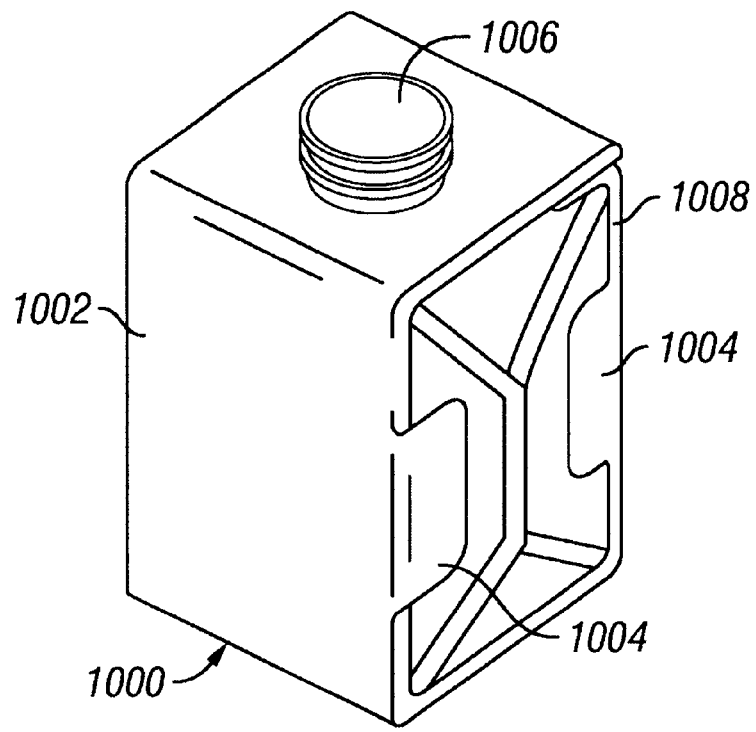
FIG. 85A is a perspective view of the standup bag of the present invention having a panel overlay.
Figure 85B:
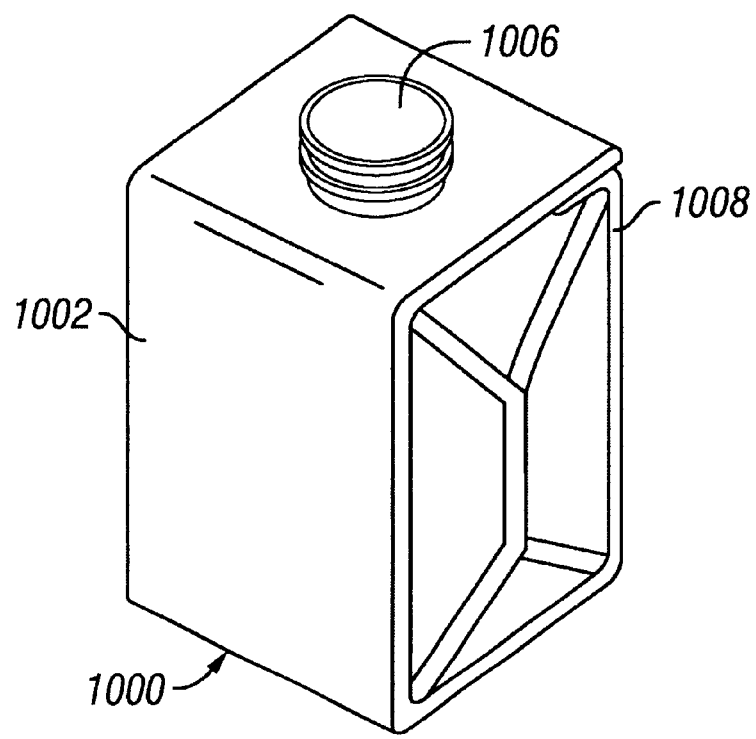
FIG. 85B is a perspective view of an alternate embodiment of the standup bag of the present invention having a panel overlay.

FIGS. 85A–F illustrates another embodiment of the standup bag 1000 where at least one panel 1002 is disposed upon at least one surface of the bag. The panel 1002 may be made of a plurality of materials such as, but not limited to, heavy stock paper, cardboard, or corrugated cardboard. The panel 1002 may be bonded or otherwise affixed to the surface of the bag as shown in FIGS. 85C–F. The panel 1002 may also be wrapped around the bag and affixed to itself as shown in FIGS. 85A–B. Furthermore, the panel 1002 may be attached to the bag by both bonding the panel surfaces to the bag in combination with bonding the panels to itself. Referring back to FIG. 85A, the panel is wrapped around four contiguous sides of the standup bag. That is, one continuous panel 1002 covers the top, back, bottom, and front walls. In another embodiment, the panel may cover any four contiguous sides of the standup bag such as the top, bottom, and both side walls. In yet another embodiment, the front, back, and both side walls may be covered by the panel.

Figure 85C:
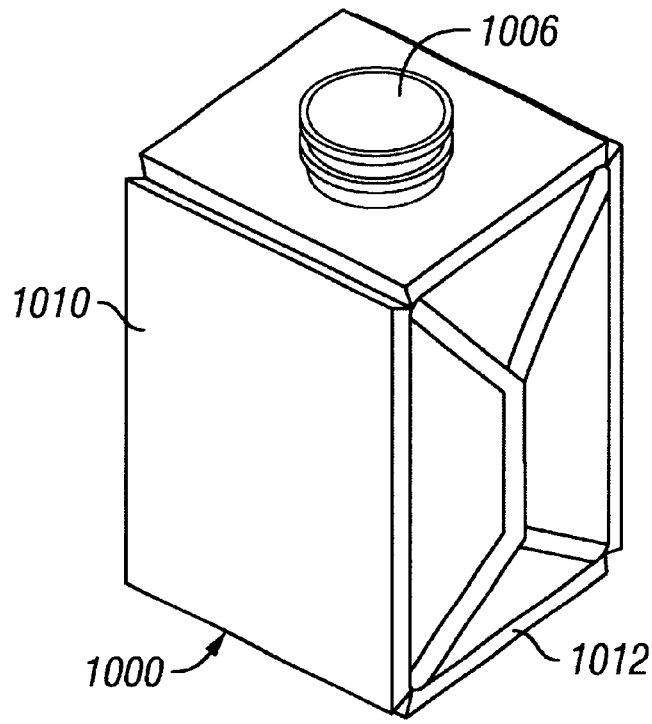
FIG. 85C is a perspective view of an alternate embodiment of the standup bag of the present invention having a panel overlay.
Figure 85D:
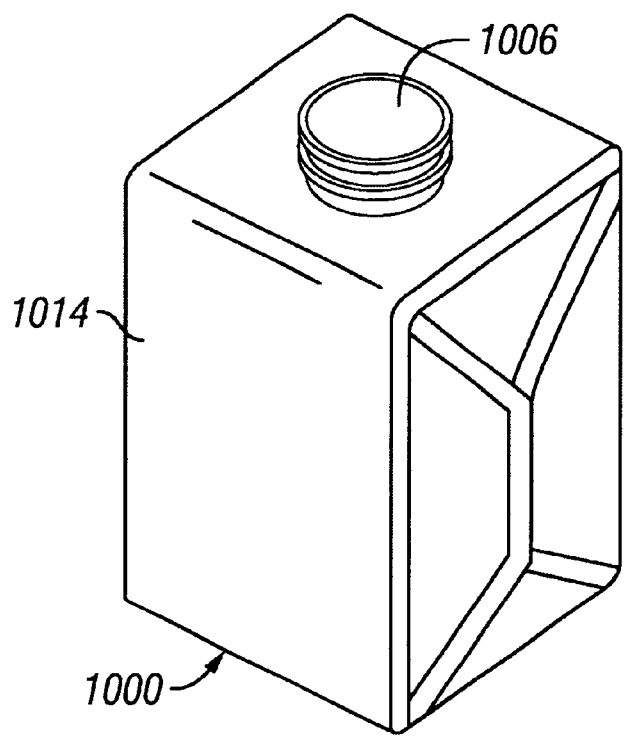
FIG. 85D is a perspective view of an alternate embodiment of the standup bag of the present invention having a panel overlay.
Figure 85E:
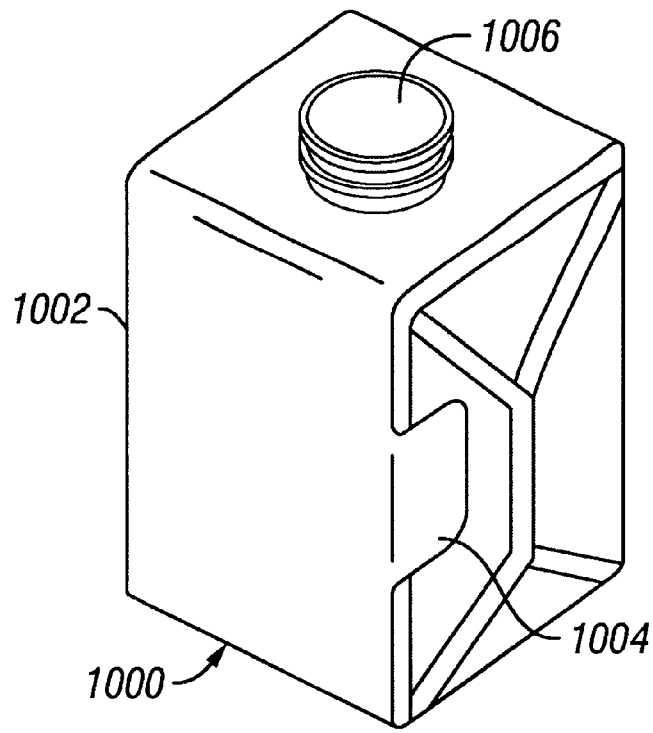
FIG. 85E is a perspective view of an alternate embodiment of the standup bag of the present invention having a panel overlay.
Figure 85F:
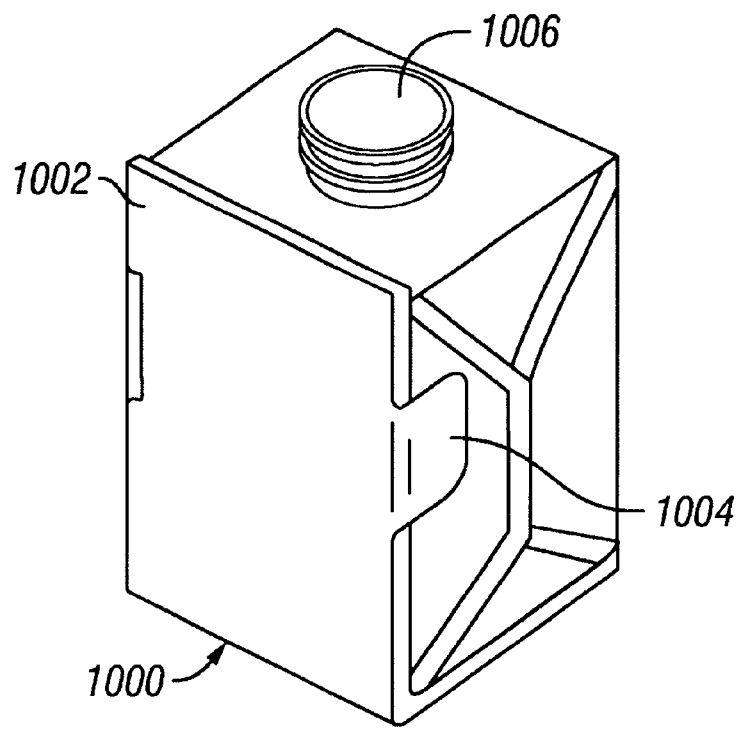
FIG. 85F is a perspective view of an alternate embodiment of the standup bag of the present invention having a panel overlay.

Referring back to FIG. 85A, the panel 1002 may include grasping members 1004. The grasping members 1004 may be integral with the panel as shown in FIGS. 85A, 85E, and 85F. However, the grasping members may be attached to the panels after the panel has been affixed to the bag. Moreover, the panels may not include the grasping members as shown in FIGS. 85B, 85C, and 85D. Referring back to FIG. 85A, the panel 1002 includes a through-hole that accommodates the fitment 1006. Furthermore, FIG. 85A shows an overlapping portion 1008 of the panel that allows the panel 1002 to affixed to itself. The combination of the bonded panel and the fitment fitted through the through-hole affixes the panel to the standup bag. However, it is contemplated that the panel may be bonded to the bag by adhesives commonly used in the art.

FIGS. 85C–F are alternate embodiments where at least one panel 1002 is attached to two surfaces of the standup bag. The panels may be bonded to the surface by adhesives or other means known by those skilled in the art. FIG. 85C shows two panels 1010, 1012 that have been bonded to a side wall and the bottom wall of the standup bag. FIG. 85D shows another embodiment where the top wall and a side wall have a panel 1014 coupled thereto. The panel 1014 includes a through-hole adapted to receive the fitment 1006. The standup bag of FIG. 85E includes a panel 1002 that covers the top wall and one side wall. The panel 1002 also includes at least one grasping member 1004 integral or affixed to the panel. FIG. 85F is an alternate embodiment of the standup bag where the panel 1002 covers the bottom wall and one side wall.

Those skilled in the art will appreciate that one to six panels may be coupled to the various surfaces of the standup bag of the present invention. The panels may be fashioned in such a combination to cover at least one surface of the standup bag. The panels that have been coupled to the standup bags are useful for forming continuous graphics or labels. Additionally, the panels may provide additional rigidity to the standup bag when filled with a flowable substance. Moreover, the panels may be useful for grasping or holding a standup bag.

Figure 86:
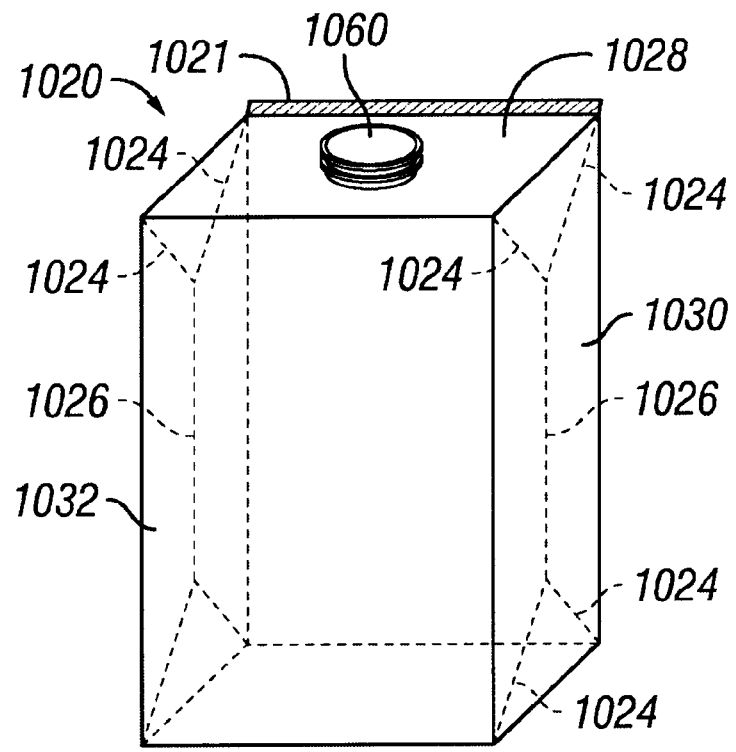
FIG. 86 is a perspective view of an alternate embodiment of the standup bag of the present invention having one outer heat seal.

FIG. 86 illustrates yet another embodiment of the present invention. The bag 1020 as shown in FIG. 86, only has one weld 1021 located on the outer surface of the bag. The oblique welds 1024 and the longitudinal welds 1026 are on the inner surface of the bag. The bag as shown in FIG. 86 is formed according to the methods of the present invention, and the bag 1020 is turned inside-out prior to making the final weld.

In another embodiment of the standup bag, a plurality of walls may have different wall thickness. For example, one side wall may be made from a sheet material having a thicker gauge as compared to the other walls of the standup bag. The thicker wall material would increase the rigidity of the bag and therefore improve the handling stability of the bag. Thus, depending on the bag volume, intended use, or other physical or functional parameter, a plurality of walls may be made from a thicker gauge material.

Figure 90:
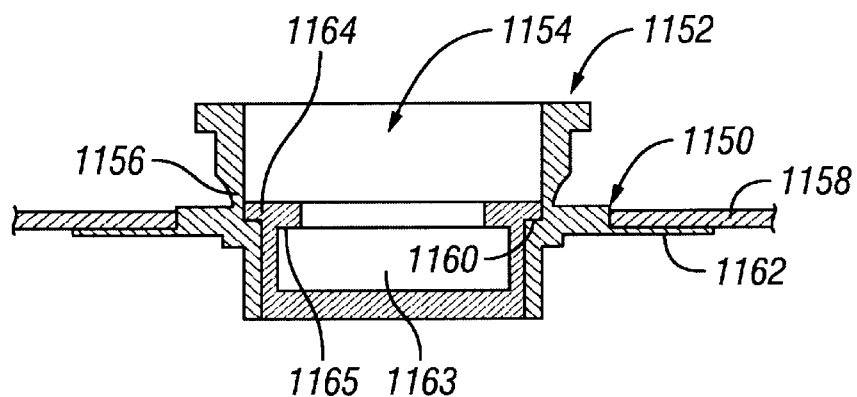
FIG. 90 is a side view of a fitment that may be provided with the standup bag of the present invention.

FIG. 90 illustrates another embodiment of the fitment 1150 that may be included with the standup bag of the present invention. The fitment 1150 is an internal fitment where the main body of the fitment located within the bag rather than on the surface of the bag. The fitment 1150 is a cylindrical structure having a flange 1162 extending from the periphery of the cylinder. The flange is adapted to allow for the attachment of the fitment 1150 to the bag material 1158. On the inner surface of the fitment, an annular recess 1160 is provided to engage a flange 1164 disposed on the plug 1154. The plug also contains a recess 1163 and flange 1165. The flange 1165 is adapted to allow filler equipment to remove and insert the plug 1154 from the fitment. The fitment 1150 also includes a carrier 1152 that extends away from the main body of the fitment.

The carrier 1152 facilitates the moving and filling of the standup bag of the present invention. The carrier 1152 includes an undercut 1156 around the perimeter of the fitment body. The carrier 1152 may be broken off the fitment 1150 at the undercut 1156. The carrier 1152 may be broken off the fitment 1150 during the process of reinserting the plug 1154. Additionally, it is contemplated that the carrier may be broken off any time after the standup bag has been filled.

Figure 91:
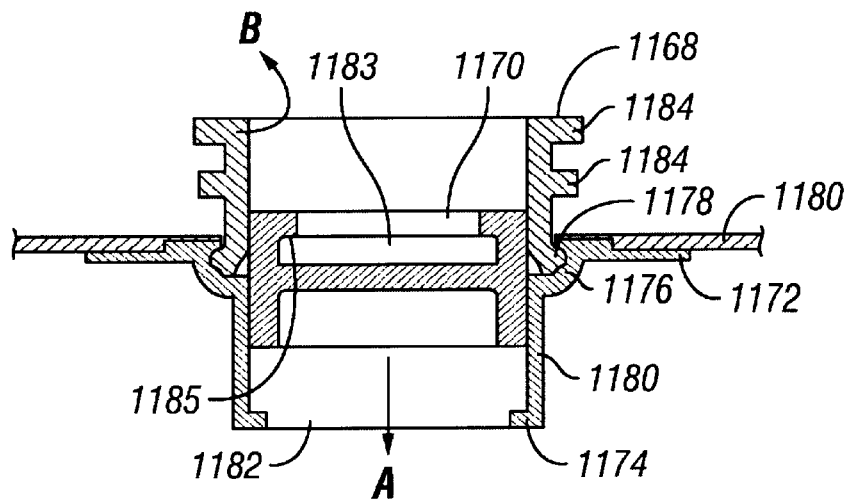
FIG. 91 is a side view of an alternate embodiment fitment that may be provided with the standup bag of the present invention.
Figure 92:
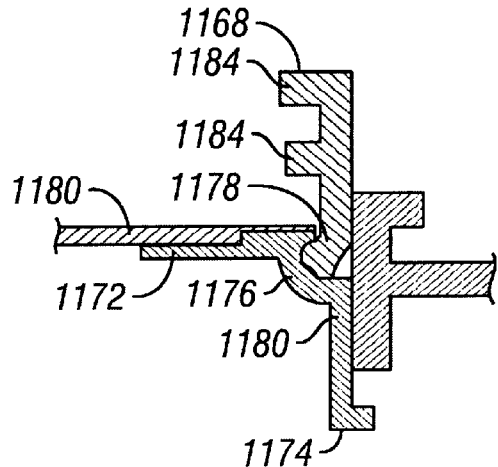
FIG. 92 is an enlarged view of a portion the fitment of FIG. 91.

Another embodiment of an internal fitment is illustrated in FIGS. 91–92. The fitment 1166 comprises a spout body 1180, spout flange 1172, and a carrier 1168. The spout body is a cylindrical structure where the body 1180 is located within the standup bag. Referring back to FIG. 91, at one end of the spout body 1180, a flange 1172 is provided which is adapted to attach to the standup bag material. The flange may be attached to the bag material by various welding methods such as heat sealing, impulsed sealing, ultrasonic sealing, RF sealing, or other techniques that would be apparent to those skilled in the art. At the opposite end of the spout body, a ridge 1174 protrudes into the lumen 1182 of the spout. The ridge is adapted to stop the plug 1170 from being pushed through the spout body into the standup bag. The plug 1170 is a cylindrical disk capable of sealing the lumen 1182 of the spout. The plug 1170 includes a recess 1183 and a ridge 1185 that are adapted to receive filling fixtures (not shown) so that the plug 1170 may be removed or inserted into the spout body 1180.

Referring now to FIG. 92, an enlarged side view of the internal fitment of FIG. 91 is illustrated. In particular, the junction between the carrier 1168 and the spout body 1180 is shown. The spout body 1180 includes an annular groove 1176 which is adapted to receive bulbous end 1178 of the carrier 1168. The carrier 1168 also includes a plurality of flanges 1184 that circumferentially extend away from the carrier. The flanges are adapted to be grasped by fixtures and other components associated with bag filling devices. Those skilled in the art will appreciate that the number, size, and location of the flanges may be adjusted or modified to suit the needs of the filling device (not shown).

The carrier 1168 may be removed from the fitment when the standup bag is recapped. That is, when the plug is pushed into the spout body and contacts the spout ridge 1174, the carrier 1168 may be separated from the spout body. Referring back to FIG. 92, the plug 1170 is in a position that prevents the carrier 1168 from being removed. In particular, the plug is positioned so that the carrier 1168 cannot be compressed to a smaller diameter. Accordingly, there is insufficient clearance to allow the carrier to be removed from the annular groove 1176. However, once the plug 1170 clears the carrier 1168, the carrier 1168 may be compressed and detached from the fitment 1166. Once removed, the carrier 1168 may also be recycled or reused in the filling process.

Figure 93:
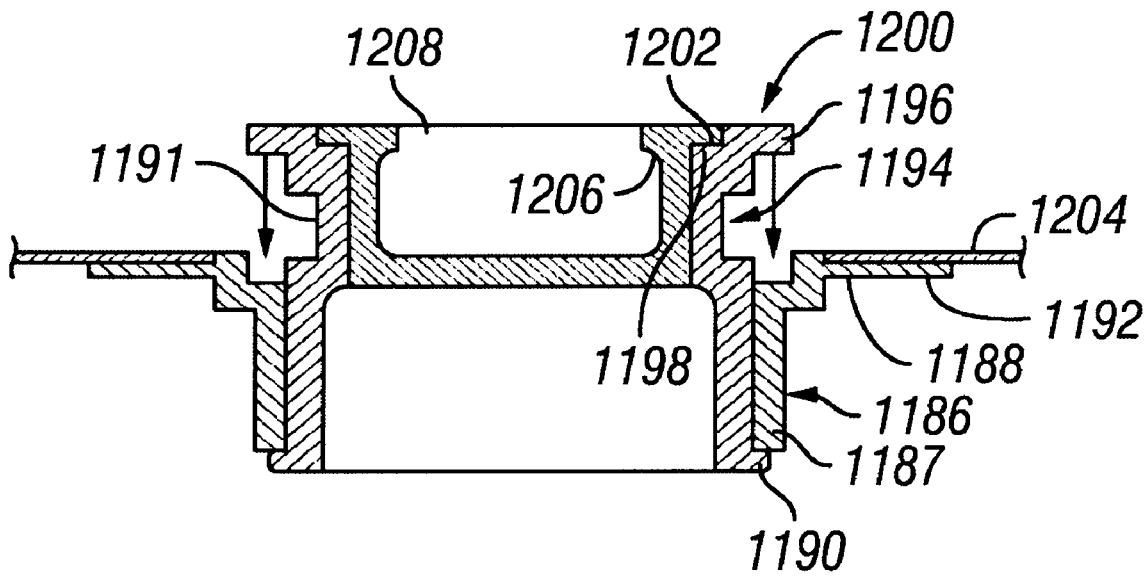
FIG. 93 is a side view of an alternate embodiment fitment that may be provided with the standup bag of the present invention.

FIG. 93 illustrates yet another embodiment of an internal fitment that may be integrated with the standup bag of the present invention. The fitment 1186 comprises a spout body 1187, a sleeve member 1194, and a plug 1200. The spout body 1187 is a cylindrical body having a lumen. The spout body 1187 also includes a flange 1188 that is adapted to attach to the standup bag material. The flange 1188 may be attached to the bag material by various welding methods such as, but not limited to, heat sealing, impulsed sealing, ultrasonic sealing, RF sealing, or other techniques that would be apparent to those skilled in the art. The spout body 1187 also includes an annular recess 1192 that is adapted to receive the sleeve flange 1198.

In FIG. 93, the sleeve 1194 is slidably engaged with the fitment 1186. The fitment 1186 includes a plurality of flanges 1190, 1196, at least one recess 1191, and an annular ledge 1198. The flanges 1190, 1196 radiate from the exterior surface of the sleeve 1194. The lower flange 1190 is adapted to prevent the sleeve 1194 from being pulled out the spout body 1187. Additionally, a plurality of recesses 1191 may be provided on the exterior surface of the sleeve 1194. As shown in FIG. 93, the recess 1191 provides a point of engagement for the filling fixtures (not shown). Those skilled in the art will appreciate that more than one recess may be provided on the exterior surface of the sleeve. The annular ledge 1198 is disposed on the inner surface of the sleeve 1194. The ledge 1198 is adapted to engage the flange 1202 of the plug 1200. The plug 1200 is a disk-shaped member that is adapted to seal the lumen of the spout. The plug 1200 includes an annular flange 1206 and a recess 1208 that are adapted to receive a filling fixture (not shown).

Figure 94:
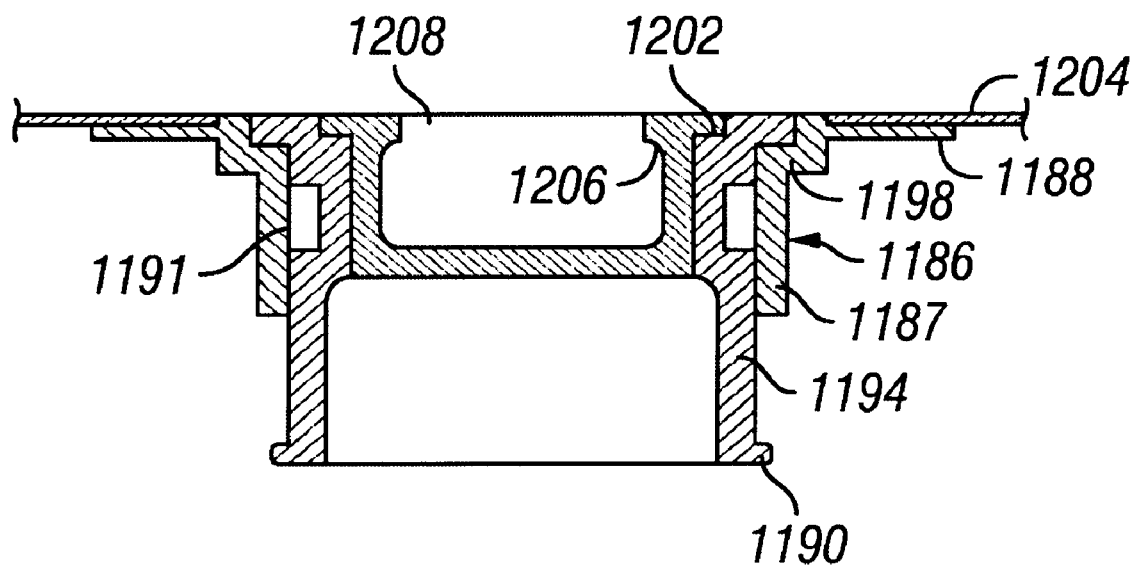
FIG. 94 is a side view of the fitment of FIG. 93 in a locked position.

As shown in FIG. 93, the sleeve 1194 is in a first position where the sleeve 1194 protrudes from the spout body 1186 away from the surface 1204 of the standup bag. In this position, the flange 1196 and recess 1191 are exposed such that they may be engaged by the filling fixture. After the bag has been filled, the bag is recapped by inserting the plug 1200 into the lumen of the sleeve 1194. A first axial force is applied to the plug 1200 until the plug flange 1202 engages the annular ledge 1194 of the sleeve. A second axial force is then applied the plug 1200 which causes both the sleeve 1194 and plug 1200 to be inserted into the bag until the flange 1196 engages the annular groove 1192 of the spout body 1186 as shown in FIG. 94. In particular, FIG. 94 illustrates the second position where the flange 1196 engages the annular groove 1192 of the spout body 1186. In the second position, the sleeve 1194 is flush with the spout body 1186 and bag surface 1204.

Figure 95:
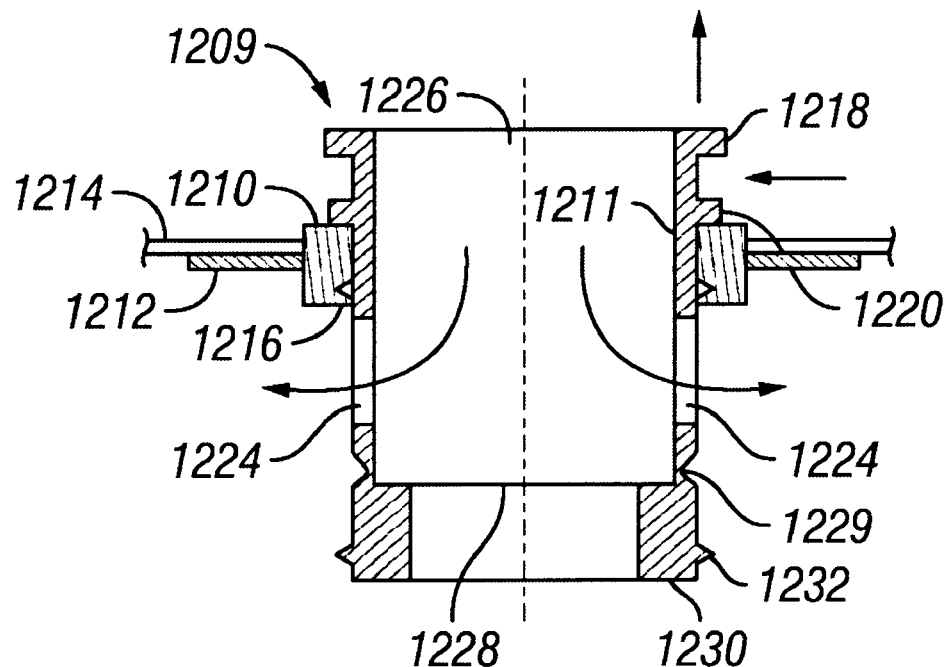
FIG. 95 is a side view of an alternate embodiment fitment that may be provided with the standup bag of the present invention.

Referring to FIG. 95, another embodiment of a fitment 1209 comprising a spout body 1210 and a spout sleeve 1211. The spout body 1210 is a cylindrical structure having a lumen 1226 and at least one flange 1212 that radiates away from the exterior surface of the body 1210. As shown in FIG. 95, the spout body 1210 includes one flange 1212. The flange 1212 is adapted to attach the spout body 1210 to the standup bag material. The flange 1212 may be attached to the bag material by various welding methods such as, but not limited to, heat sealing, impulsed sealing, ultrasonic sealing, RF sealing, or other techniques known by those skilled in the art. Additionally, the spout body 1210 includes an annular groove 1216 that is adapted to receive an annular ridge 1232.

Figure 96:
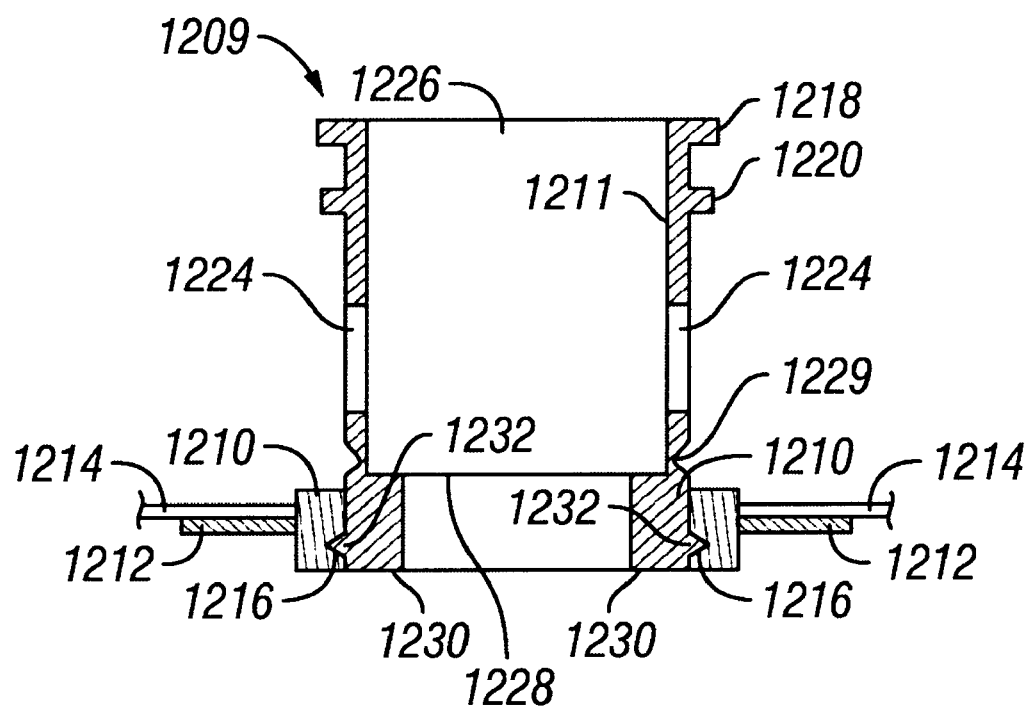
FIG. 96 is a side view of the fitment of FIG. 95 in a closed position.

The fitment 1209 also includes a sleeve member 1211 that slidably engages the spout body 1210. The sleeve member 1211 is a cylindrical structure that is open at one end and is closed at a second end by a bottom surface 1228. The bottom surface may be made from a foil, plastic, or other like material. At least one port 1224 is disposed about the circumference of the sleeve above the bottom surface 1228 of the sleeve. Below the bottom surface 1228, a locking member 1230 having an annular ridge attached to the sleeve 1211. Those skilled in the art will appreciate that the locking member 1230 and the sleeve member 1211 may be integral with the sleeve or the locking member 1230 be attached to the sleeve. At the open end of the sleeve, at least one annular flange 1218 radiates away from the exterior surface of the sleeve 1211. As shown in FIGS. 95–96, the sleeve has two flanges 1218, 1220. The flanges 1218, 1220 are adapted to facilitate the manipulation and movement of the standup bag during the filling process.

As shown in FIG. 95, the sleeve is in a first position. In the first position, the sleeve protrudes into the standup bag. In this position, the ports 1224 are in communication with the interior of the standup bag. Thus, in the first position, a flowable substance may be introduced or removed from the standup bag. FIG. 96 shows the sleeve in a second position where the interior of the bag is sealed. In this second position, the locking member 1230 and the annular ridge 1232 are mutually engaged with the spout body 1210 and the annular groove 1216. As a result, the sleeve 1211 extends outwardly from surface 1214 of the standup bag. In the second position, the sleeve 1211 may be separated from the locking member 1230 at the undercut 1229 thereby forming a fitment substantially flush with the bag surface.

Figure 97:
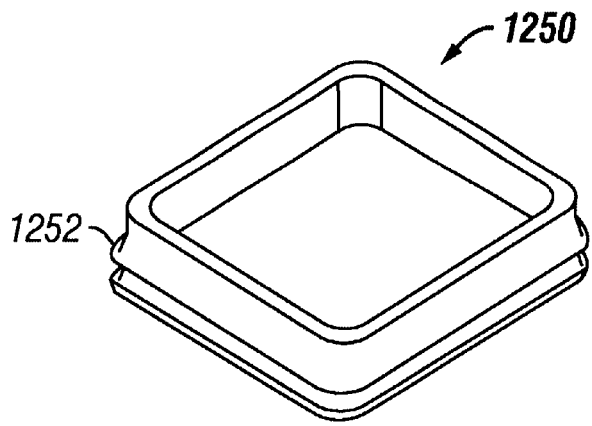
FIG. 97 is a perspective view of an alternate embodiment fitment that may be provided with the standup bag of the present invention.
Figure 97A:
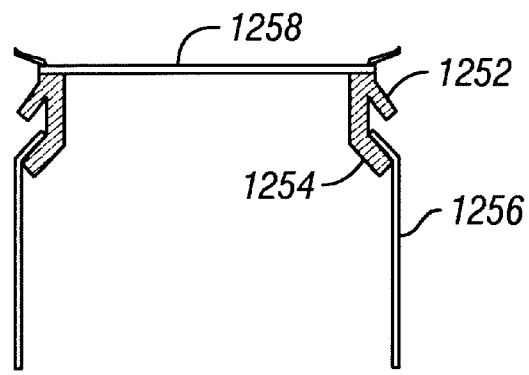
FIG. 97A is a cross-sectional view of the fitment of FIG. 97.

FIG. 97 illustrates yet another embodiment of a fitment of the present invention. The fitment 1250 comprises at least one flange 1252 extending from the perimeter of the fitment and a retaining member 1254. The flange 1252 may extend obliquely away from the perimeter of the fitment as shown in FIG. 97A. However, those skilled in the art will appreciate that the retaining member may extend perpendicularly from the perimeter of the fitment.

Figure 97B:
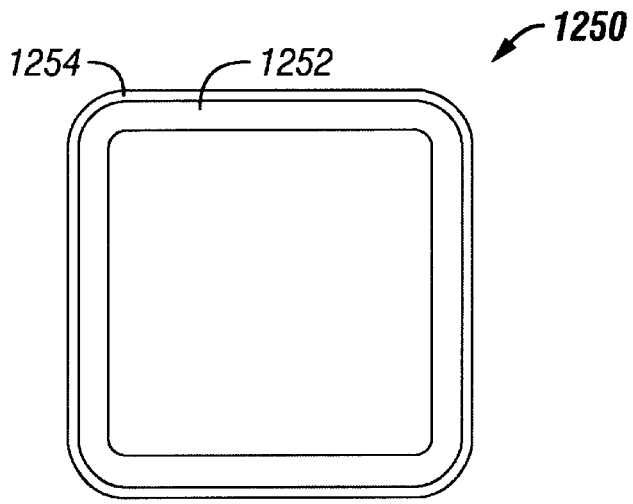
FIG. 97B is a top view of the fitment of FIG. 97.

In FIGS. 97–97B, the fitment has a square shape, but it is contemplated that the fitment may be any shape including, but not limited to, a circle, rectangle, triangle, pentagon, or the like. At one end of the fitment, the flange 1252 is adapted to be grasped by the filling fixture (not shown). Additionally, the opening of the fitment is adapted to be enclosed by a foil 1258 or a cap. The cap may be made from material such as, but not limited to, polycarbonate, polyethylene, ABS, or the like.

Referring back to FIG. 97, at the end of the fitment opposite the flange 1252, a retaining member 1254 extends from the perimeter of the fitment. The retaining member 1254 is adapted to provide a surface that permits the bag material 1256 to be attached to the fitment 1250. Those skilled in the art will appreciate that the fitment may be attached to the bag material by various methods known in the art such as, but not limited to, heat sealing, impulsed sealing, ultrasonic sealing, RF sealing, or other techniques known by those skilled in the art.

Figure 98:
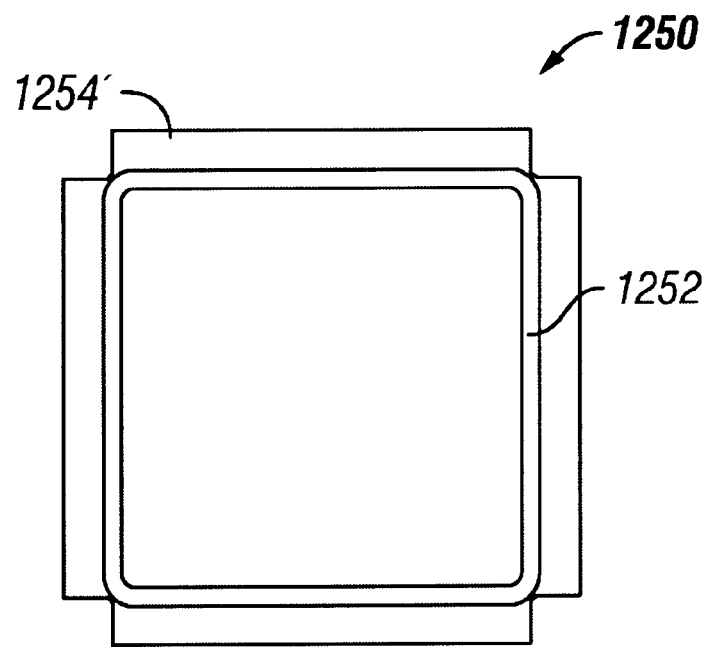
FIG. 98 is a top view of an alternate embodiment fitment that may be provided with the standup bag of the present invention.

FIG. 98 illustrates another embodiment of the retaining member 1254' where the retaining member is not a continuous structure about the perimeter of the fitment. As compared to FIGS. 97–98, the retaining member is a continuous structure. Furthermore, as shown in FIG. 97A, the retaining member extends obliquely from the perimeter of the fitment. However, those skilled in the art will appreciate that the retaining member may extend perpendicularly from the perimeter of the fitment. Furthermore, as those skilled in the art will appreciate, the fitments of the present invention, as illustrated in FIGS. 90–98, may be adapted so that the fitments attached to a completed bag by a fin seal.

Figure 101:
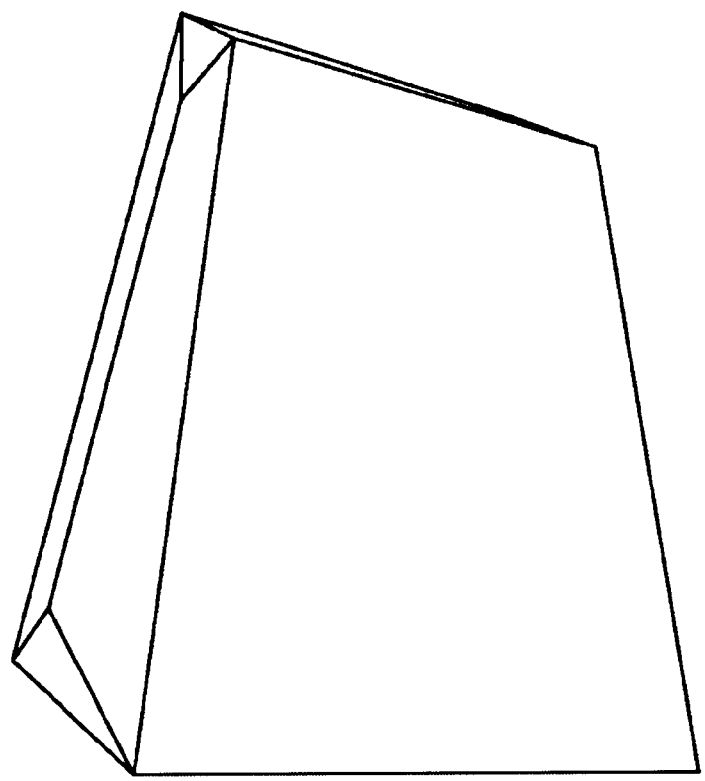
FIG. 101 is front plan view of an alternate embodiment of the standup bag of the present invention.

The present invention also discloses a method of making standup bags having various shapes. According to this method, the standup bags may have differing shapes and sizes, but the bags still may be folded in a substantially flat configuration and are still self-standing when filled with a flowable substance. FIG. 101 illustrates an example of a standup bag designed by the method of the present invention. While the bag illustrated in FIG. 101 may have an unconventional shape, the bag includes: a front wall, a back wall, a top wall, a bottom wall, and at least one contour structure.

Figure 89A:
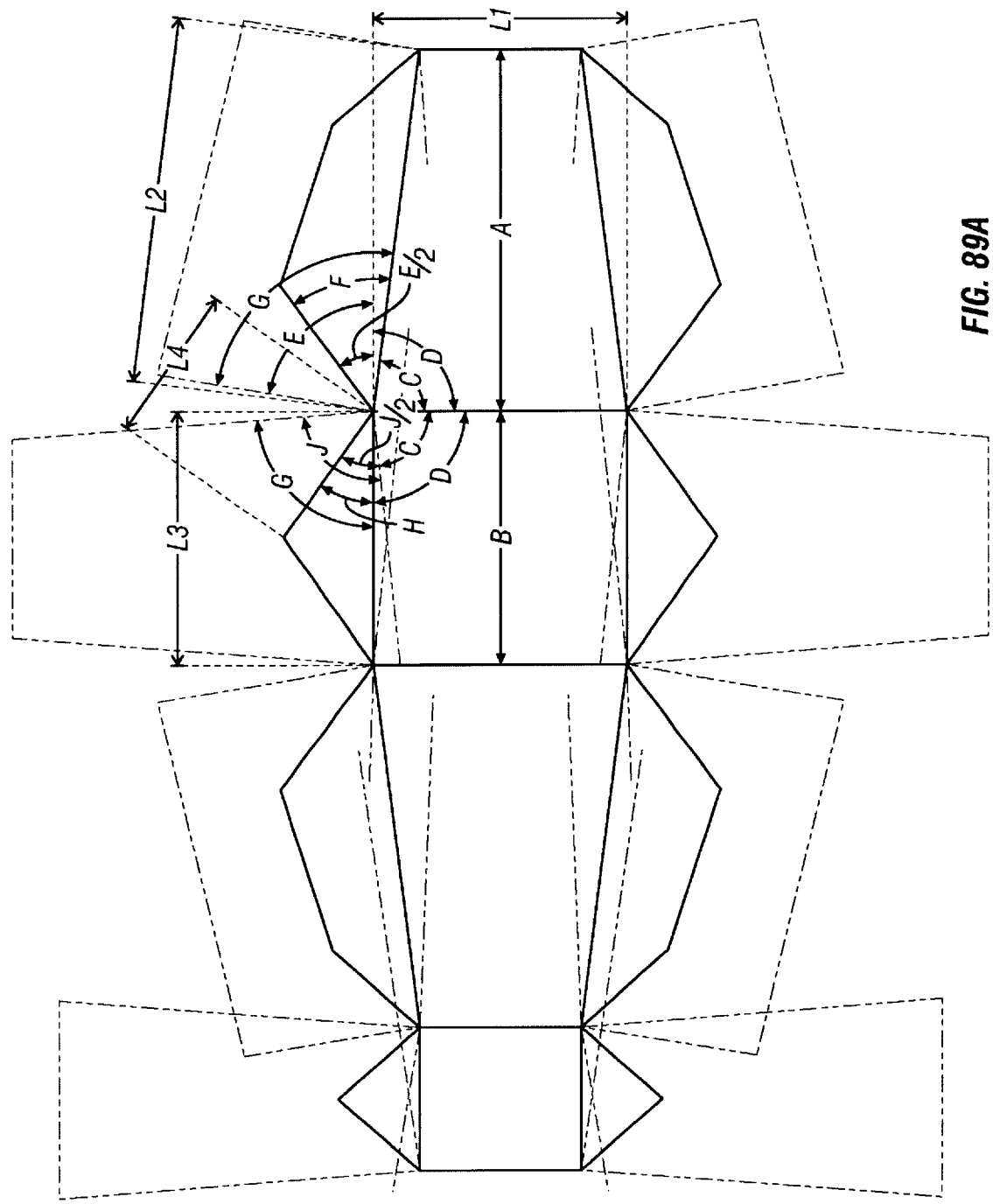
FIG. 89A is a template of the standup bag of FIG. 89.

In order to make a flexible bag that may be substantially flat when empty and self-standing when filled with a flowable substance, the angles C, D, G that comprise a corner of the front, bottom, and side walls, respectively, are selected. These angles C, D, G collectively form a corner of the bag as shown in FIG. 89A. The remaining angles that comprise the a corner of the standup bag are calculated by the following formulas:

$$J = G + D - C \tag{I}$$

$$E = G + C - D \tag{II}$$

$$H = (J/2) + (C - D) \tag{III}$$

$$F = (E/2) + (D - C) \tag{IV}$$

Formulas (III) and (IV) may be simplified as follows:

$$H = ((G + C - D)/2) \tag{III}$$

$$F = ((G + D - C)/2) \tag{IV}$$

An algorithm that comprises formulas (I)–(IV) is then applied to each corner of the standup bag to design the overall shape of the bag. The size of the bag is determined by choosing the width (L1), height (L2), and depth (L3) of the bag as shown in FIG. 89A. Once the angles of the each corner are determined, the shape of the contour structure may be determined. That is, for instance, once angles F, H are determined, the position of one of heat seals that comprise the V-shaped heat seal may also be determined. Likewise, the corresponding angles that comprises the opposite corner of the dictate the position of the other heat seal that comprises the V-shaped heat seal. This process is then repeated to determine the upper V-shaped seal. The longitudinal heat seal is the line that connects the vertices of the V-shaped profiles.

In closing, it is to be understood that the embodiments of the invention disclosed herein are illustrative of the principles of the present invention. Other modifications that may be employed are within the scope of the invention; thus, by way of example, but not of limitation, alternative configurations of the flexible bag may be utilized. Accordingly, the present invention is not limited to that precisely as shown and described in the present invention.

We claim:

1. A method of making a six sided standup bag comprising the steps of:

(a) positioning a first sheet of material on a second sheet of material, each of the first and second sheets of material having a first side edge and a second side edge opposing the first side edge, a top edge and a bottom edge;

(b) securing the first sheet of material to the second sheet of material by forming a first seal proximate the first side edge and a second seal proximate the second side edge, each of the first and second seals including a central region and end segments extending toward the respective top and bottom edges;

(c) creating a first fold on the first sheet of material, the first fold substantially corresponding to the first side edge and spaced apart therefrom;

(d) creating a second fold on the second sheet of material, the second fold substantially corresponding to the second side edge and spaced apart therefrom;

(e) rotating the first side edge away from the first fold and rotating the second side edge away from the second fold, to, in turn, substantially expose the first fold at a first end and a second fold at a second end;

(f) forming a third seal extending from the first fold to the second fold, the third seal having a portion thereof corresponding to the top edge of the first and second sheets of material, and end segments sealing portions of the first sheet on either side of the first fold; and (g) forming a fourth seal extending from the first fold to the second fold, the fourth seal having a portion thereof corresponding to the bottom edge of the first and second sheets of material and end segments sealing portions of the second sheet on either side of the second fold, to, in turn, substantially form a standup bag, that, upon filling renders a substantially six sided bag.

2. The method of claim 1 wherein the first seal, second seal, third seal, and fourth seal are substantially U-shaped seals.

3. The method of claim 1 further comprising the step of attaching a fitment to one of the first and second sheets of material prior securing the first edge to the second edge.

4. The method of claim 1 further comprising the step of placing a fitment between the edges of the first seal, the second seal, or the third seal.

5. The method of claim 1 further comprising the step of forming at least one integrated handle on the standup bag.

6. The method of claim 1 further comprising the step of attaching at least one handle to the standup bag.

7. The method of claim 1 wherein the third seal comprises:

a central region extending from the end segment of the first seal to the end segment of the second seal substantially proximate the top edge;

opposing end segments extending from the central region on opposing sides thereof, the opposing end segments extending to the first fold and the second fold, respectively.

8. The method of claim 1 wherein the fourth seal comprises:

a central region extending from the end segment of the first seal to the end segment of the second seal substantially proximate the bottom edge;

opposing end segments extending from the central region on opposing sides thereof, the opposing end segments extending to the first fold and the second fold, respectively.

9. The method of claim 1 wherein the shape of the first seal, second seal, third seal and fourth seal is substantially uniform.

10. The method of claim 1 wherein the end segments of each of the first seal, the second seal, the third seal and the fourth seal are substantially identical and oblique relative to the respective central region from which they emanate at substantially similar angles relative thereto.

* * * * *